US012730435B2

(12) United States Patent
Tanaka et al.

(10) Patent No.: US 12,730,435 B2
(45) Date of Patent: Sep. 8, 2026

(54) INDUSTRIAL WIRELESS SYSTEMS, PRIMARY WIRELESS NODE, AND SECONDARY WIRELESS NODE

(71) Applicant: KEYENCE CORPORATION, Osaka (JP)

(72) Inventors: Seiya Tanaka, Osaka (JP); Ryosuke Tsujikawa, Osaka (JP)

(73) Assignee: KEYENCE CORPORATION, Osaka (JP)

(*) Notice: Subject to any disclaimer, the term of this patent is extended or adjusted under 35 U.S.C. 154(b) by 281 days.

(21) Appl. No.: 18/659,805

(22) Filed: May 9, 2024

(65) Prior Publication Data

US 2024/0427315 A1 Dec. 26, 2024

(30) Foreign Application Priority Data

Jun. 20, 2023 (JP) ................................ 2023-101161

(51) Int. Cl.
*G05B 19/418* (2006.01)
*H04W 24/08* (2009.01)
*H04W 76/10* (2018.01)

(52) U.S. Cl.
CPC ........ *G05B 19/4185* (2013.01); *H04W 24/08* (2013.01); *H04W 76/10* (2018.02); *G05B 2219/15117* (2013.01)

(58) Field of Classification Search
None
See application file for complete search history.

(56) References Cited

U.S. PATENT DOCUMENTS 10,678,233 B2 * 6/2020 Cella .................. G05B 19/0425
2014/0351591 A1 * 11/2014 Kodama ............... H04W 12/08 713/168

(Continued)

FOREIGN PATENT DOCUMENTS

JP 2014-22981 A 2/2014
JP 2014-164598 A 9/2014

OTHER PUBLICATIONS

Related co-pending application: U.S. Appl. No. 18/659,742, filed May 9, 2024, counterpart Japanese Patent Application No. 2023-087650.

(Continued)

*Primary Examiner* — Faiyazkhan Ghafoerkhan
(74) *Attorney, Agent, or Firm* — WHDA, LLP

(57) ABSTRACT

An industrial wireless system includes a primary wireless node wire-connected to a first industrial device and a secondary wireless node wirelessly connected to the primary wireless node, and mediates data communication between a second industrial device and the first industrial device. The primary wireless node has a communication port that is wire-connected to the first industrial device, a communication port that wirelessly communicates with the mobile device, and a communication port that wirelessly communicates with the secondary wireless node. A first wireless network is constructed for wireless communication between the mobile device and the primary wireless node. A second wireless network is constructed for wireless communication between the secondary wireless node and the primary wireless node. The first wireless network uses a first radio frequency band. The second wireless network uses a higher second radio frequency band.

23 Claims, 64 Drawing Sheets

(56) References Cited

U.S. PATENT DOCUMENTS

| | | | | |
|---|---|---|---|---|
| 2019/0324434 | A1* | 10/2019 | Cella | G05B 19/0425 |
| 2023/0150333 | A1* | 5/2023 | Hirani | B60G 17/06<br>701/37 |
| 2024/0092135 | A1* | 3/2024 | Randall | B60G 17/08 |
| 2024/0427315 | A1* | 12/2024 | Tanaka | H04W 24/08 |

OTHER PUBLICATIONS

Related co-pending application: U.S. Appl. No. 18/659,861, filed May 9, 2024, counterpart Japanese Patent Application No. 2023-101162.

* cited by examiner

NOTIFICATION

| APPLICATION NAME | NOTIFICATION CONTENT | NUMBER OF OCCURRENCES | OCCURRENCE DATE AND TIME |
|---|---|---|---|
| OPERATION RECORD ANALYSIS | ANALYSIS REPORT IS CREATED | 1 | 2021/4/5 15:19:35 |
| TIMING MONITORING | ALARM HAS OCCURRED | 4 | 2021/4/5 15:18:21 |
| | | | |

DISPLAY

109

100
PROJECT EDITING
101
REPLAY MODE
102
107
104
PROJECT
INPUT PORTION
OUTPUT PORTION
PROCESSING PORTION STATE
1
2
3
4
5
6
7
8
9
10
UNIT CONFIGURATION
[0] BASE UNIT
[1] EXTENSION UNIT
ANALYSIS REPORT
103
PROGRAM
SCAN MODULE
INPUT PORTION
OUTPUT PORTION
PROCESSING PORTION STATE
00001
R000
R001
MR001
00002
R002
R003
MR002
00003
00004
105a
106a

FIG. 12
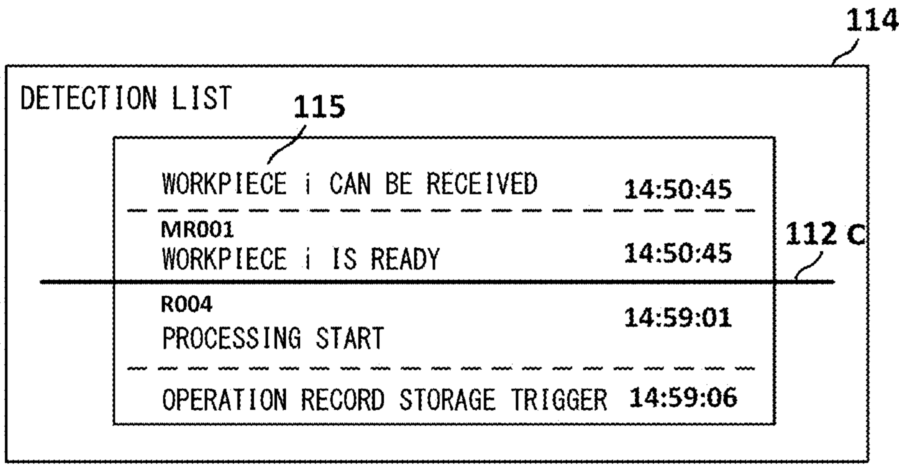
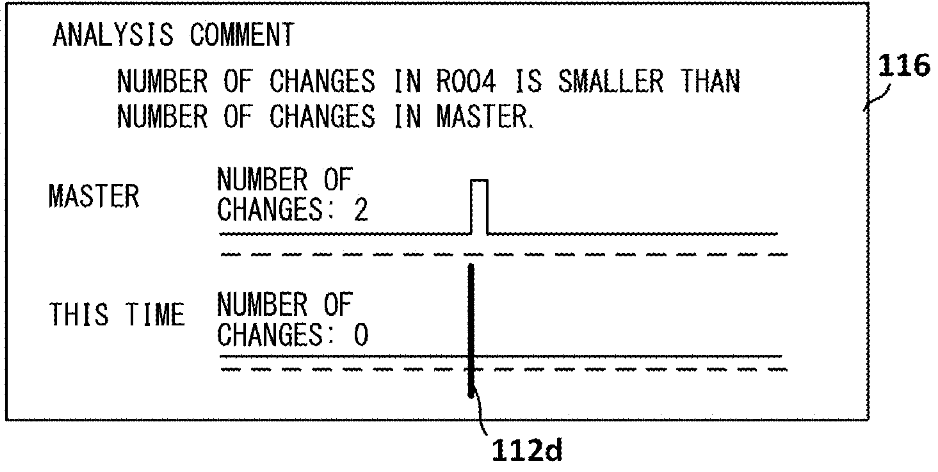

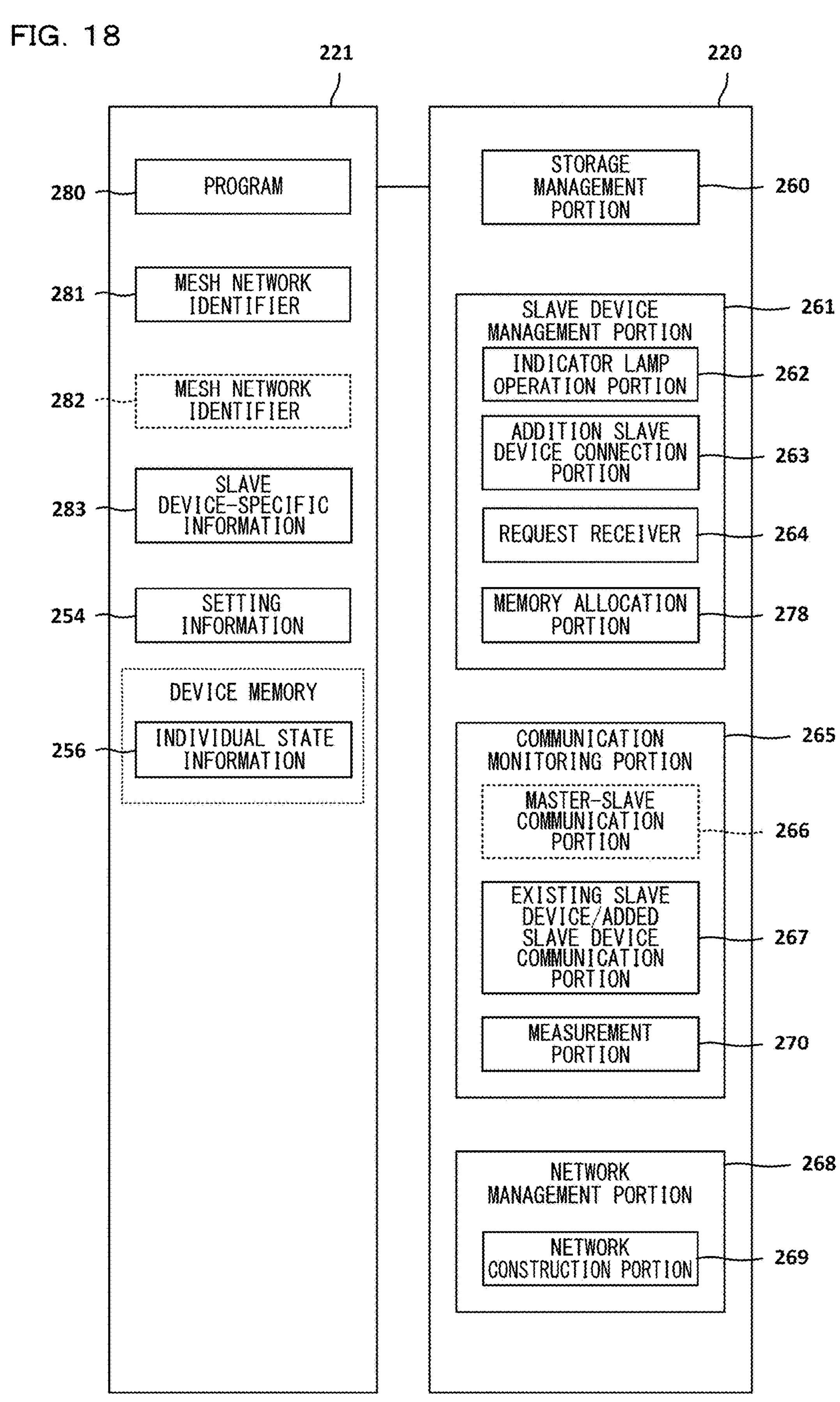
FIG. 18
221
220
280
PROGRAM
281
MESH NETWORK IDENTIFIER
282
MESH NETWORK IDENTIFIER
283
SLAVE DEVICE-SPECIFIC INFORMATION
254
SETTING INFORMATION
DEVICE MEMORY
256
INDIVIDUAL STATE INFORMATION
STORAGE MANAGEMENT PORTION
260
SLAVE DEVICE MANAGEMENT PORTION
261
INDICATOR LAMP OPERATION PORTION
262
ADDITION SLAVE DEVICE CONNECTION PORTION
263
REQUEST RECEIVER
264
MEMORY ALLOCATION PORTION
278
COMMUNICATION MONITORING PORTION
265
MASTER-SLAVE COMMUNICATION PORTION
266
EXISTING SLAVE DEVICE/ADDED SLAVE DEVICE COMMUNICATION PORTION
267
MEASUREMENT PORTION
270
NETWORK MANAGEMENT PORTION
268
NETWORK CONSTRUCTION PORTION
269

FIG. 29
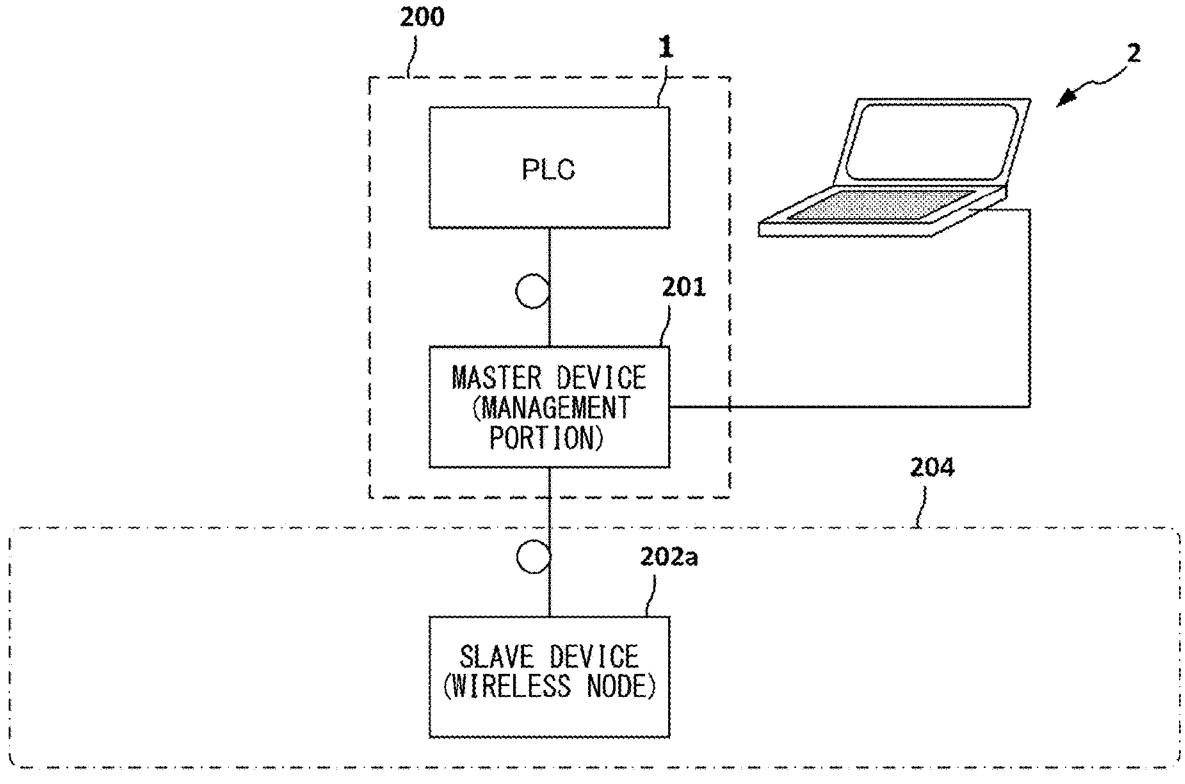
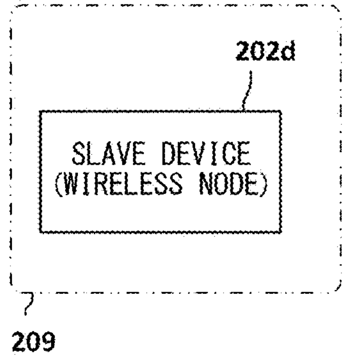

FIG. 30
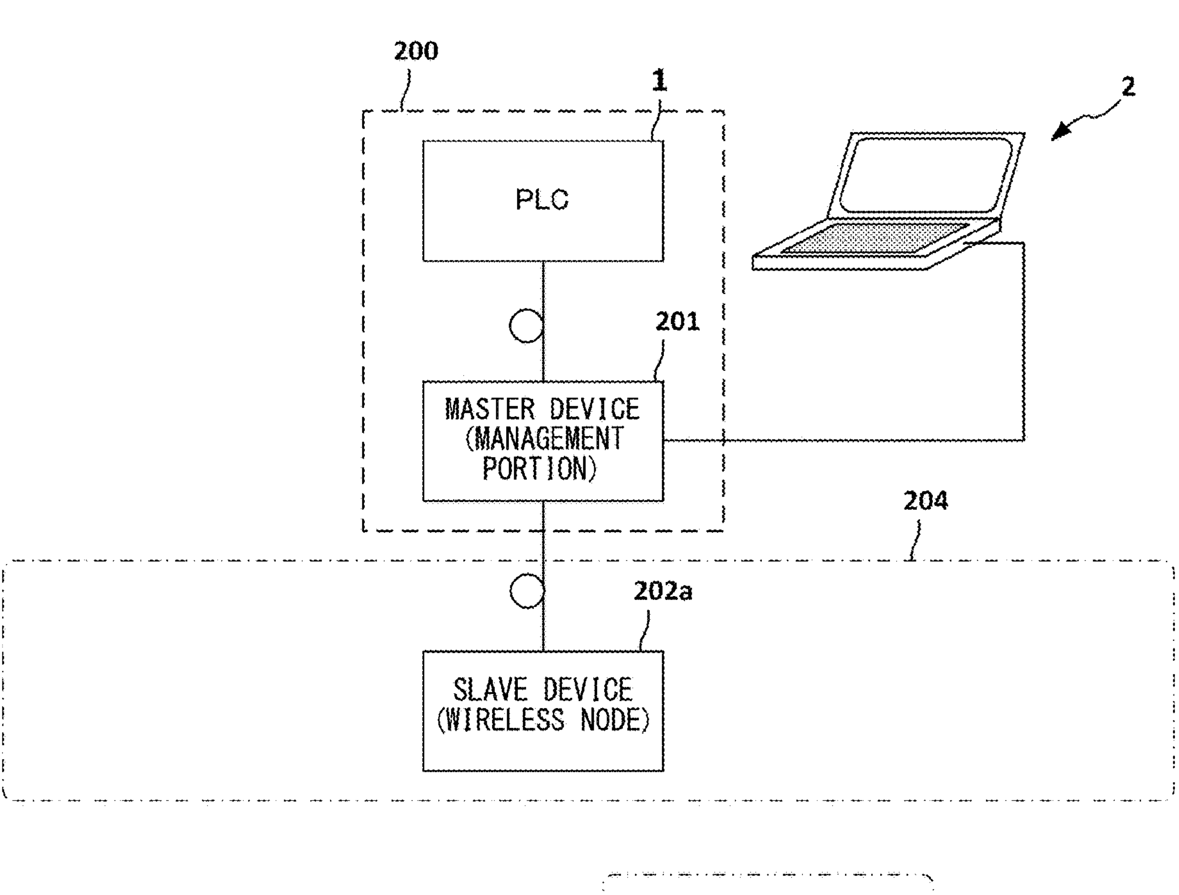
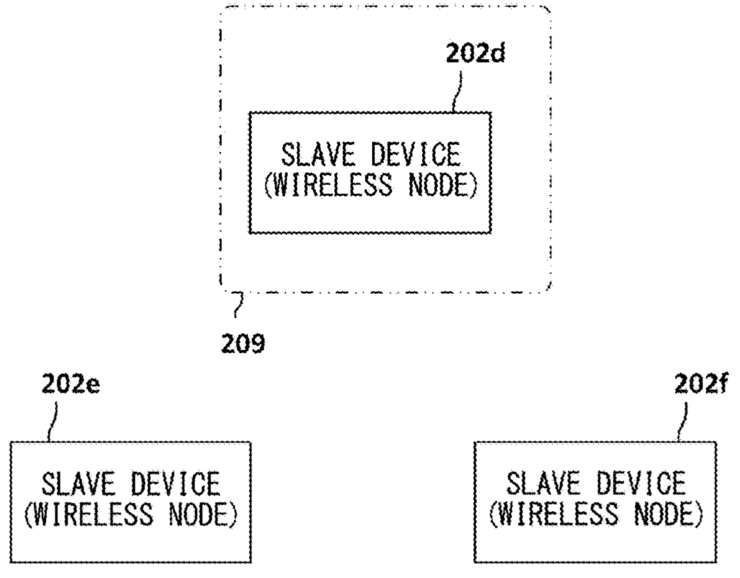

INDUSTRIAL WIRELESS SYSTEMS, PRIMARY WIRELESS NODE, AND SECONDARY WIRELESS NODE

CROSS-REFERENCE TO RELATED APPLICATIONS

The present application claims foreign priority based on Japanese Patent Application No. 2023-101161, filed Jun. 20, 2023, the contents of which are incorporated herein by reference.

BACKGROUND OF THE INVENTION

1. Technical Field

The invention relates to an industrial wireless system, a primary wireless node and a secondary wireless node.

2. Description of the Related Art

A plurality of industrial devices such as machine tools are installed in a factory, and the plurality of industrial devices are controlled by a programmable logic controller (PLC). By connecting the plurality of industrial devices or the plurality of PLCs by a wireless mesh network, it is possible to maintain the industrial network in the factory even if the layout of the industrial devices in the factory is changed.

The wireless mesh network selects an appropriate single-hop or multi-hop communication path in consideration of a radio wave state between a plurality of nodes constituting the network, and secures good communication quality (JP 2014-22981 A).

By the way, the PLC can acquire various data from another PLC or the like, and can display various information on the display device. For example, the PLC may periodically collect various types of data from industrial devices or other PLCs via a wireless mesh network. The data collected by the PLC may be reproduced by a display device wire-connected to the PLC. This data is reproduced in real time or reproduced as operation record data (history) acquired in the past. By adopting a wireless mesh network instead of the conventional wired connection, a degree of freedom in installation of the PLC, various other industrial devices, sensors, and the like is improved.

On the other hand, the display device that displays the data collected by the PLC is still wired to the PLC. Therefore, it is required to connect the PLC and a mobile device functioning as the display device to the wireless network. In this case, the wireless node connected to the wireless mesh network requires a setting for communicating with other wireless nodes and another setting for communicating with the mobile device, and the user has been required to have advanced setting knowledge.

In addition, when a mobile device as a display device joins a wireless mesh network constructed by a plurality of wireless nodes connected to a PLC or an industrial device, the wireless mesh network is congested, and a delay or loss may occur in data collection by the PLC. In this case, monitoring of the PLC is hindered.

SUMMARY OF THE INVENTION

Therefore, an object of the invention is to smoothly display data on a mobile device while suppressing a delay in data transfer in an industrial wireless system.

The invention provides, for example, a primary wireless node in an industrial wireless system that includes at least the primary wireless node wire-connected to a first industrial device that collects data and one or more secondary wireless nodes wire-connected to a second industrial device that sends the data toward the first industrial device and wirelessly connected to the primary wireless node, and mediates data communication between the second industrial device that sends the data and the first industrial device that collects the data, the primary wireless node including:

a wired communication port that is wire-connected to the first industrial device;

a first wireless communication port that wirelessly communicates with a mobile device corresponding to the first industrial device;

a second wireless communication port that wirelessly communicates with the one or more secondary wireless nodes;

a construction portion that constructs a first wireless network for wireless communication between the mobile device connected via the first wireless communication port and the primary wireless node, and constructs a second wireless network for wireless communication between the one or more secondary wireless nodes connected via the second wireless communication port and the primary wireless node; and a transfer portion that transfers data transmitted from the second industrial device and received via the one or more secondary wireless nodes, the second wireless network, and the second wireless communication port to the first industrial device via the wired communication port, and transfers monitoring information of the second industrial device or the second wireless network transmitted from the first industrial device and received via the wired communication port to the mobile device via the first wireless communication port, in which a first radio frequency band is used in the first wireless network, a second radio frequency band is used in the second wireless network, and the second radio frequency band is a higher frequency band than the first radio frequency band.

According to the invention, it is possible to smoothly display data on a mobile device while suppressing a delay in data transfer in an industrial wireless system.

BRIEF DESCRIPTION OF THE DRAWINGS

FIG. 8 is a diagram for explaining a notification dialog;

FIG. 12 is a diagram for explaining an analysis report;

FIG. 18 is a diagram for explaining functions of the slave device;

FIG. 29 is a diagram for explaining an example in which a plurality of wireless slave devices are collectively added;

FIG. 30 is a diagram for explaining an example in which a plurality of wireless slave devices are collectively added;

DETAILED DESCRIPTION

Figure 1:
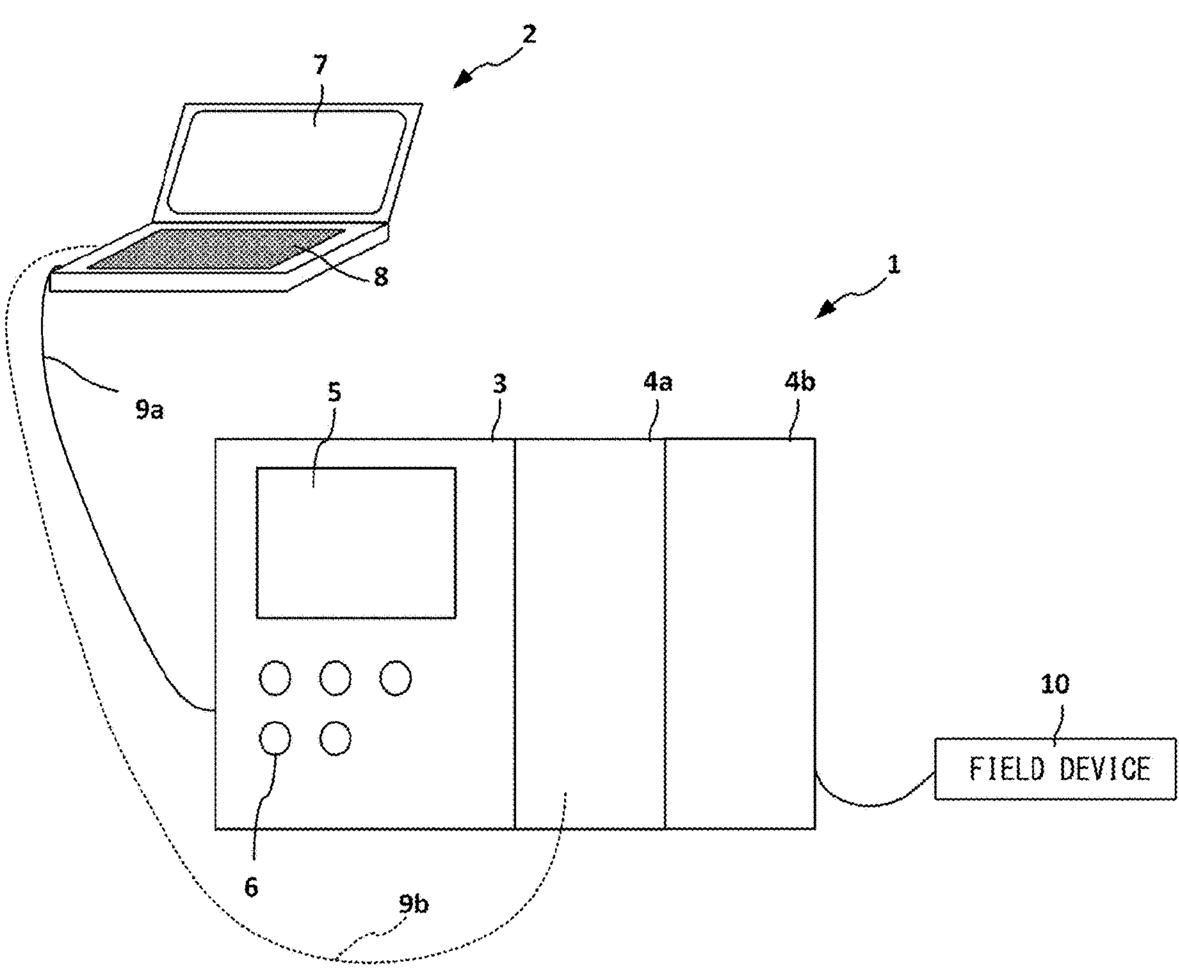
FIG. 1 is a diagram for explaining a PLC system.

Hereinafter, embodiments will be described in detail with reference to the accompanying drawings. Note that the following embodiments do not limit the invention according to the claims, and all combinations of features described in the embodiments are not necessarily essential to the invention. Two or more features of the plurality of features described in the embodiments may be arbitrarily combined. In addition, the same or similar configurations are denoted by the same reference numerals, and redundant description will be omitted.

A programmable logic controller (PLC) is a controller that controls industrial machines such as manufacturing devices, conveyance devices, and inspection devices in factory automation. The PLC controls various extension units and controlled devices by executing a user program such as a ladder program created by a programmer. In order to monitor the operation of the PLC, it has been proposed that data held by the PLC is collected, and the data is monitored by a computer (PC) or an HMI (human interface: display device) connected to the outside of the PLC (JP 2019-016325 A).

The user creates a user program with a programming support device and transfers the user program to the PLC. The PLC actually executes the user program to manufacture various products. Here, when a user program is created, a rare event that has not been assumed occurs, and thus the manufacturing line may stop. Although the manufacturing line is not stopped, an event requiring attention may occur.

On the other hand, when a predetermined event occurs, the PLC reads the device values collected before and after the occurrence time from a buffer and records the device values. This may be referred to as an operation record (operation log). A data utilization unit may analyze this record to create an analysis report and provide it to a Web browser external to the PLC. Here, if the operation log can be reproduced together with the analysis report, not only the user can easily understand the contents of the analysis report but also can easily find the cause of the occurrence of the predetermined event. Therefore, the analysis report and the operation log need to be associated with each other. If the analysis report and the operation log are not associated with each other, it would be difficult for the user to specify the operation log corresponding to the analysis report. Therefore, an object of some of the following embodiments is to appropriately hold the relationship between the operation record and the analysis result in the PLC.

<System Configuration>

First, in order to enable a person skilled in the art to better understand a programmable logic controller (PLC, which may be simply referred to as a programmable controller), a configuration of a general PLC and an operation thereof will be described.

FIG. 1 is a conceptual diagram illustrating a configuration example of a PLC system according to an embodiment of the invention. As illustrated in FIG. 1, the PLC system includes a PC 2 that edits a user program such as a ladder program, and a PLC 1 that integrally controls various industrial machines installed in a factory or the like. The PC is an abbreviation for personal computer. The user program may be created using a graphical programming language such as a flowchart-format motion program such as a ladder language or a sequential function chart (SFC), or may be created using a high-level programming language such as C language. Hereinafter, for convenience of description, the user program executed by a base unit 3 is assumed to be a ladder program. The PLC 1 includes a base unit 3 in which a CPU is built, and one or a plurality of extension units 4. One or a plurality of extension units 4 are detachable from the base unit 3.

The base unit 3 includes a display portion 5 and an operation portion 6. The display portion 5 can display an operation status or the like of the base unit 3 or the extension unit 4 attached to the base unit 3. The display portion 5 switches the display content according to the user's operation content on the operation portion 6. The display portion 5 normally displays a current value (device value) stored in a device in the PLC 1, error information generated in the PLC 1, and the like. The device is a name (symbol) indicating a storage area on a memory provided to store a device value (device data), and may be referred to as a device memory. The device value is information indicating an input state from the input device, an output state to the output device, and states of an internal relay (auxiliary relay), a timer, a counter, a data memory, and the like set on the user program. The type of the device value includes a bit type and a word type. The bit device stores a 1-bit device value. The word device stores a 1-word device value.

The extension unit 4 is provided to extend the function of the PLC 1. A field device (controlled device) 10 corresponding to the function of the extension unit 4 may be connected to the extension unit 4, so that each field device 10 is connected to the base unit 3 via the extension unit 4. The field device 10 may be an input device such as a sensor or a camera, or may be an output device such as an actuator. Further, a plurality of field devices may be connected to one extension unit 4.

For example, an extension unit **4*b* may be a positioning unit that drives a motor (field device 10) to position a workpiece, or may be a counter unit. The counter unit counts signals from an encoder (field device 10**) such as a manual pulser.

An extension unit **4*a* collects symbol values from symbols (devices, variables, etc.) in the base unit 3, analyzes the symbol values, and creates an analysis report including an analysis result. The extension unit 4*a* may include a Web server that provides an analysis report to the external PC 2. The base unit 3 may also be referred to as a CPU unit. In the present embodiment, an example in which the extension unit (analysis unit) 4*a* includes a collection portion that collects symbol values will be described. However, the collection portion may be provided in the base unit 3 or may be provided in another extension unit. In addition, the extension unit 4*a* may function as an analysis device that analyzes collected data according to an instruction from the base unit 3 or a predetermined timing. In the present embodiment, an example in which the extension unit 4*a* functions as an analysis device will be described. However, there is no intention to limit the invention. The base unit 3 may function as an analysis device, or an external device such as the PC 2 may function as an analysis device. The system including the PLC 1 and the PC 2** may be referred to as a programmable logic controller system.

The PC 2 is a computer operated mainly by a programmer. The PC 2 may be referred to as a programming support device (monitoring device). The PC 2 is, for example, a portable notebook type or tablet type personal computer or smartphone, and is an external computer including a display portion 7 and an operation portion 8. The external computer is a computer outside the PLC 1. A ladder program, which is an example of a user program for controlling the PLC 1, is created using the PC 2. The created ladder program is converted into a mnemonic code in the PC 2. The PC 2 is connected to the base unit 3 of the PLC 1 via a communication cable **9*a* such as a universal serial bus (USB) cable. However, the communication cable 9*a* may be a network cable or the like similar to a communication cable 9*b*. The PC 2** may be a programmable indicator screen set by a user. In this case, the screen displaying the analysis result and the like may be set by the user. The programmable indicator may be equipped with a Web browser function, and an analysis result or the like may be displayed by the Web browser function.

Although not illustrated in FIG. 1, the operation portion 8 of the PC 2 may include a pointing device such as a mouse connected to the PC 2. The PC 2 may be detachably connected to the base unit 3 or the extension unit **4*a* of the PLC 1 via the communication cable 9*b* other than the USB cable. The communication cable 9*b* may be a so-called LAN cable. The PC 2 may be connected to the base unit 3 of the PLC 1 by wireless communication without using the communication cables 9*a* and 9*b***.

<Programming Support Device>

Figure 2:
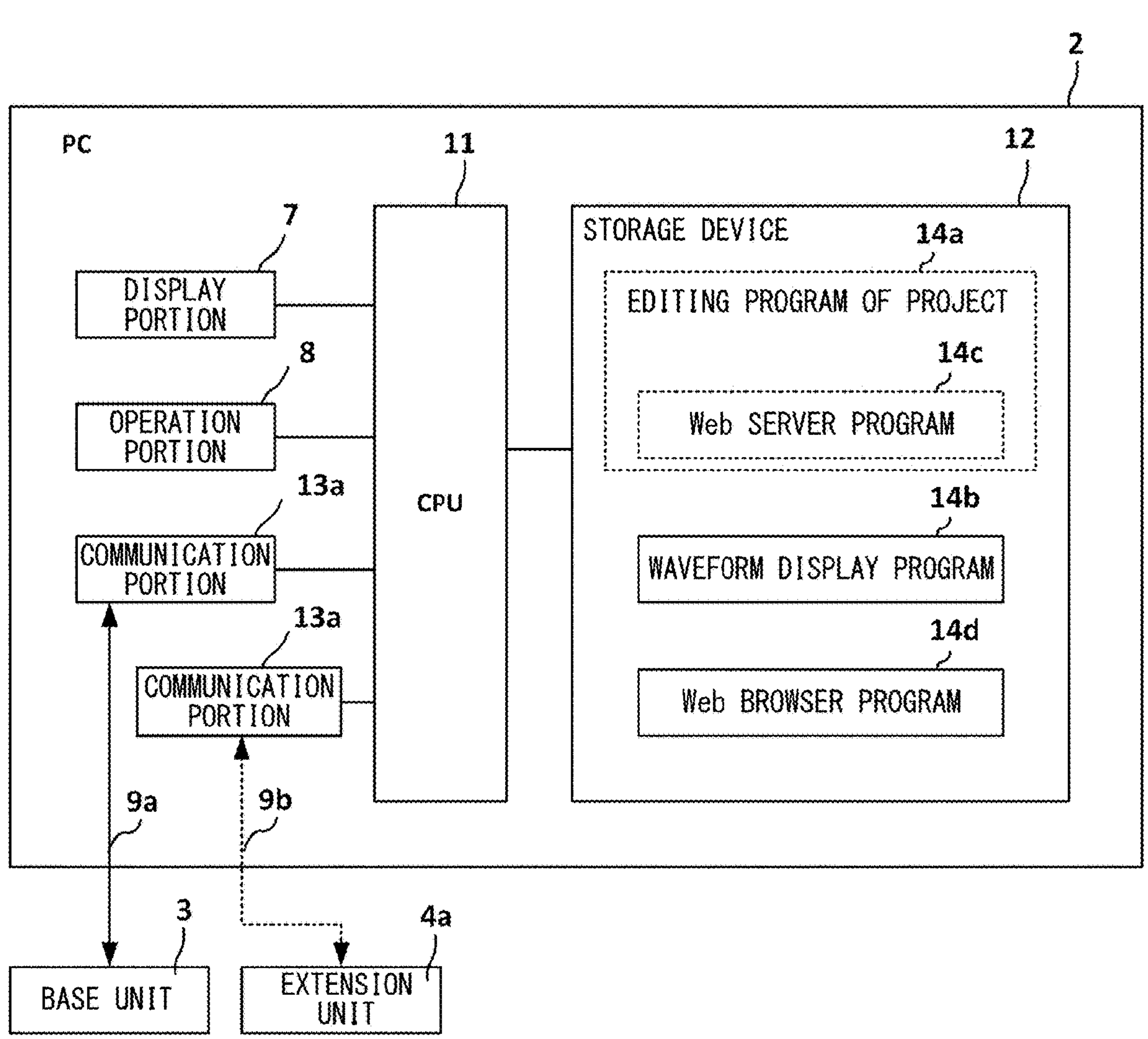
FIG. 2 is a diagram for explaining hardware of a PC.

FIG. 2 is a block diagram for explaining an electrical configuration of the PC 2. As illustrated in FIG. 2, the PC 2 includes a CPU 11, a display portion 7, an operation portion 8, a storage device 12, and communication portions **13*a* and 13*b*. The display portion 7, the operation portion 8, the storage device 12, and the communication portions 13*a* and 13*b* are electrically connected to the CPU 11. The storage device 12** includes a RAM, a ROM, an HDD, and an SSD, and may further include a detachable memory card. CPU is an abbreviation for central processing unit. ROM is an abbreviation for read-only memory. RAM is an abbreviation for random access memory. HDD is an abbreviation for hard disk drive. SSD is an abbreviation of solid state drive.

The user of the PC 2 causes the CPU 11 to execute a project editing program 14*a* stored in the storage device 12, and edits the project data through the operation portion 8. That is, the PC 2 is an engineering tool and also functions as a programming support device. The project data includes one or more user programs (example: ladder program), configuration information of the base unit 3 and the extension unit 4, and the like. The configuration information is information indicating connection positions of the plurality of extension units 4 with respect to the base unit 3 and functions (example: communication function and a positioning function) provided in the base unit 3, information indicating functions (example: photographing function) of the extension unit 4, and device allocation information. Here, the editing of the project data includes creation and change (re-editing) of the project data. The user reads the project data stored in the storage device 12 as necessary, and changes the project data using the project editing program 14*a*. The communication portion 13*a* communicates with the base unit 3 via the communication cable 9*a*. The CPU 11 transfers the project data to the base unit 3 via the communication portion 13*a*. The communication portion 13*a* includes a communication circuit or the like capable of executing communication conforming to the USB standard. The communication portion 13*b* communicates with the extension unit 4*a* via the communication cable 9*b*. The communication portion 13*b* includes a network communication circuit. A Web server program 14*c* is implemented as a part of the project editing program 14*a*. A Web browser program 14*d* receives an analysis report in which the extension unit 4*a* is described in a Web format via the communication portion 13*a* and displays the analysis report on the display portion 7. The Web browser program 14*d* may request the Web server program 14*c* to provide the analysis report. The Web server program 14*c* may access the extension unit 4*a* via the communication portion 13*a* and the base unit 3, acquire the analysis report, and transfer the analysis report to the Web browser program 14*d*.

<PLC>

Figure 3:
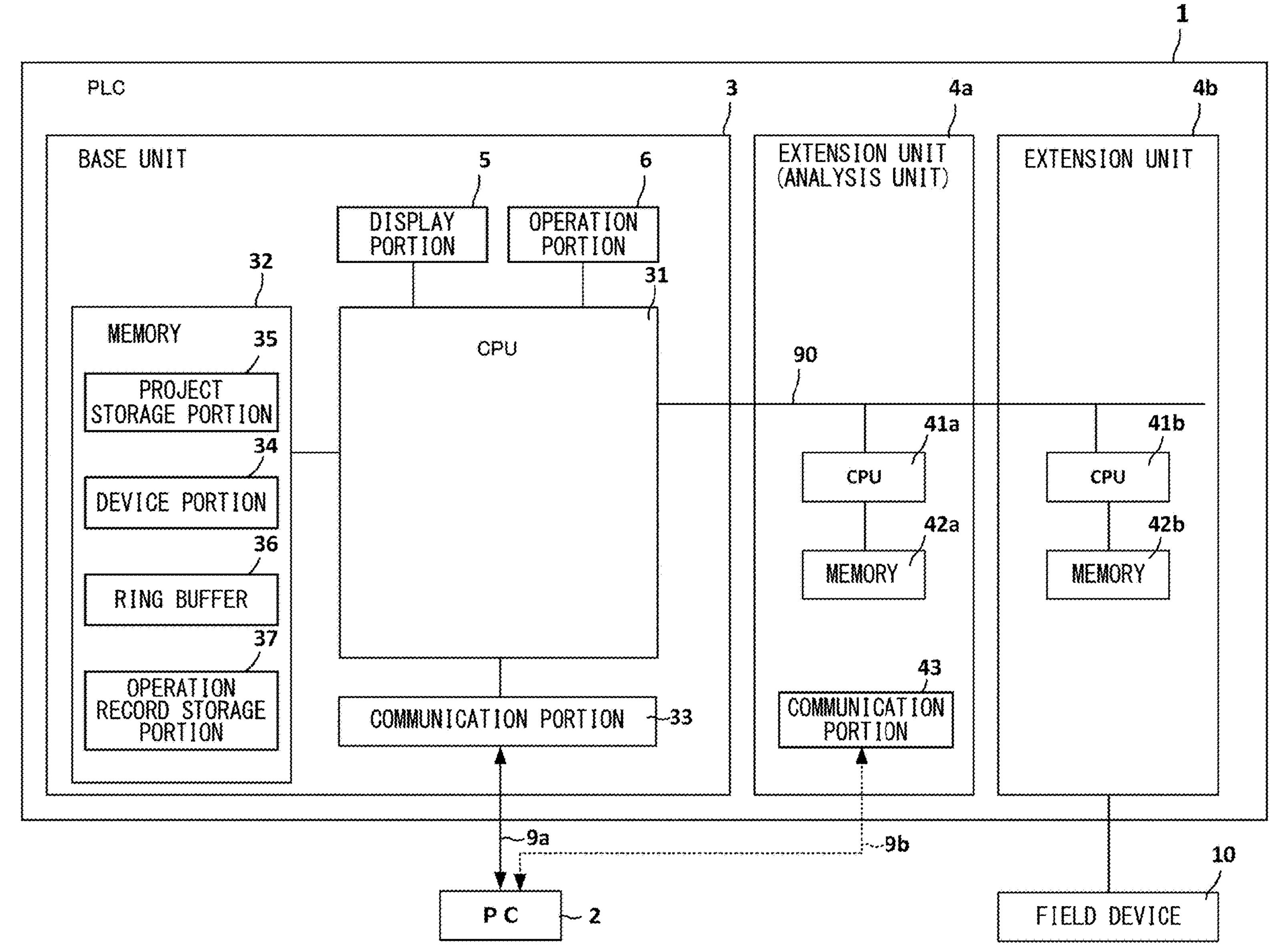
FIG. 3 is a diagram for explaining hardware of a PLC.

FIG. 3 is a block diagram for explaining an electrical configuration of the PLC 1. As illustrated in FIG. 3, the base unit 3 includes a CPU 31, a display portion 5, an operation portion 6, a storage device 32, and a communication portion 33. The display portion 5, the operation portion 6, the storage device 32, and the communication portion 33 are electrically connected to the CPU 31. The storage device 32 may include a RAM, a ROM, a memory card, and the like. The storage device 32 includes a plurality of storage areas such as a device portion 34, a project storage portion 35, a ring buffer 36, and an operation record storage portion 37. The device portion 34 includes a bit device, a word device, and the like, and each device stores a device value. The project storage portion 35 stores the project data transferred from the PC 2. The ring buffer 36 periodically collects and stores the device value from the device portion 34. When a predetermined event occurs, the operation record storage portion 37 stores an event record including a device value collected around the occurrence time (before the occurrence time, after the occurrence time, or before or after the occurrence time) and the collection time thereof. The event means, for example, that an alarm condition or a caution condition set for each device is satisfied. The alarm condition is, for example, a condition under which the control operation of the manufacturing line by the PLC 1 should be stopped. The caution condition is, for example, a condition of a device value that the administrator should pay attention to the control operation of the manufacturing line by the PLC 1. A CPU 41 transmits the event record to the PC 2 in response to the request from the PC 2. Further, the CPU 31 may provide the device value to the PC 2 in real time. The storage device 32 also stores a control program executed by the CPU 31 of the base unit 3. As illustrated in FIG. 3, the base unit 3 and the extension unit 4 are connected via a unit internal bus 90 which is a type of extension bus. Note that the communication function related to the unit internal bus 90 is mounted on the CPU 31, but may be mounted as a part of the communication portion 33. The communication portion 33 may include a serial communication circuit conforming to a USB standard or the like. The CPU 31 receives the project data from the PC 2 via the communication portion 33. Note that the ring buffer 36 and the operation record storage portion 37 described above may be provided in the extension unit 4*a* or 4*b*. In this case, the CPU 31 of the base unit 3 may read the device value periodically updated in the device portion 34 and transfer the device value to the ring buffer provided in the extension unit 4*a* or 4*b*. In addition, in a case where an operation record storage portion is provided in the extension unit 4*a* or 4*b*, when a predetermined event occurs, the CPU 31 may transfer the device value collected in the ring buffer to the extension unit 4*a* or 4*b* and store the device value. As described above, a part or all of the functions of the CPU 31 may be performed by a CPU 41*a* or a CPU 41*b*.

Here, the unit internal bus 90 will be supplementarily described. The unit internal bus 90 is a communication bus used for input/output refresh. The input/output refresh is processing of updating the device value between the base unit 3 and the extension unit 4. The input/output refresh is executed every time the ladder program is executed once (that is, for each scan).

The operation record (the device value and the collection time thereof) recorded in the operation record storage portion 37 may be a record of the operation state of the PLC 1 at a scan time level. For example, the operation record may be recording the symbol values of all the symbols related to the operation of the PLC 1 and the collection time thereof in in chronological order for each scan. For example, all symbols related to operation may be all symbols used in a user program such as a ladder program, or may be all symbols included in units of programs or units selected by a user. In this case, the symbols to be subjected to the operation record may be collectively selected in a significant unit such as units of programs or units. The symbols to be recorded for the operation record may be individually added or removed (added or deleted). For example, when a trouble occurs, an operation record in which symbol values of all symbols related to the operation of the PLC 1 and the collection time thereof are recorded in chronological order for each scan may be generated around the trouble occurrence time. It would be possible for the user to accurately grasp what has occurred at the time of occurrence of trouble even later based on the operation record. The operation record may include a lot of information to reproduce the situation at that time. When the amount of information is large, the data capacity of the operation record increases, handling (data processing or the like) of the operation record becomes difficult, and a load is applied to collection of the operation record. Therefore, the symbol to be collected can be selected by the user in units of programs or units.

Furthermore, the operation record may include time-series camera images together with the imaging time in addition to the symbol. As a result, for example, at the time of occurrence of a trouble, the user can accurately grasp what has occurred in the vicinity of the time of occurrence of the trouble even later. In particular, the inclusion of a camera image indicating a change in the appearance of the equipment in the operation record will be useful for grasping the situation. Therefore, the camera image may be recorded in conjunction with the time-series execution of the user program. A writing history from an external device such as a human machine interface (HMI) or a PC or a writing history from a PLC may be included in the operation record as a change point event. As a result, for example, the user can check in time series what kind of change point event occurred before and after the trouble occurred.

To supplement from another viewpoint, the operation record may be referred to as a generic name of data for each scan time, such as a device, a buffer memory of the extension unit 4, and a variable, which are stored in response to the satisfaction of the storage trigger condition. The operation record may include video data acquired by the extension unit (camera unit) for each frame, the video data being stored in response to the satisfaction of the storage trigger condition. In addition, the operation record may include an event history such as an error or a device value change stored in response to the satisfaction of the storage trigger condition. Further, the operation record may include a ladder program (project data) executed when the storage trigger condition is satisfied. By including the project data when the operation record is generated in the operation record, even if there are a plurality of versions in the project data, the situation can be reproduced by the project data actually used when the operation record is generated. The operation records may include analysis reports.

The extension unit 4 includes a CPU 41 and a memory 42. The CPU 41*b* of the extension unit 4*b* controls the field device 10 according to an instruction (device value) from the base unit 3 stored in the device. In addition, the CPU 41*b* stores the control result of the field device 10 in a device called a buffer memory. The control result stored in the device is transferred to the base unit 3 by input/output refresh. In addition, the control result stored in the device may be transferred to the base unit 3 according to the read command from the base unit 3 even at a timing different from the input/output refresh. The memory 42 includes a RAM, a ROM, and the like. In particular, a storage area used as a buffer memory is secured in the RAM. The memory 42 may have a buffer that temporarily holds data (example: still image data or moving image data) acquired by the field device 10.

The CPU 41*a* of the extension unit 4*a* functioning as a data utilization unit (analysis unit) communicates with the PC 2 via a communication portion 43 and the communication cable 9*b*. The communication portion 43 includes a communication circuit that executes network communication. The CPU 41*a* executes a data utilization program stored in a memory 42*a* and analyzes the device value collected in the base unit 3 to create an analysis report including the analysis result. When an operation record analysis application is set as a data utilization application, the CPU 41*a* creates an analysis report including an analysis result by analyzing the device value collected in the base unit 3. For example, the CPU 41*a* specifies a non-normal symbol and a time when the symbol becomes non-normal by analyzing a symbol value included in the operation record data, and creates an analysis report including an analysis result in which the non-normal symbol and the time when the symbol becomes non-normal are associated with each other. The operation record data includes information for reproducing a situation around the storage event occurrence time of the operation record. Therefore, the operation record data may be managed in association with the analysis report. In addition, the operation record data includes symbol values of many symbols for reproducing a situation around the storage event occurrence time of the operation record. Therefore, the data size of the operation record data tends to be large. For example, the CPU 41*a* may read data necessary for the analysis report from the operation record data and additionally store the data as data for the analysis report in the operation record data. Here, the additional storing means, for example, that data for an analysis report created by reading data necessary for an analysis report from operation record data, copying the data, and tagging the copied data is additionally stored in the operation record data. By applying data processing such as tagging data in this manner, it is easy to create an analysis report.

The operation record data may include a camera image. In this case, by reproducing the camera image, the user can grasp the situation around the storage event occurrence time of the operation record in more detail. The analysis report may include a UI (user interface) for reproducing the camera image. The camera image has a large data size. Therefore, only necessary camera image data may be partially downloaded when a click or scroll operation is received in the UI for reproducing the camera image. For example, when creating the analysis report, the CPU 41*a* may process the camera images in accordance with the display order in the analysis report, or may generate index information indicating the correspondence relationship between the time and the storage position of the camera image. As a result, the CPU 41*a* may partially download the camera image corresponding to the display time (the time of the internal clock for reproduction) at high speed.

In a narrow sense, the analysis report means the analysis result itself, but in a broad sense, the analysis report may mean a Web application that displays the analysis result or a user interface thereof. The CPU 41*a* determines, for example, whether the device value is within a normal range, whether the timing at which the device value changes is within a normal range, and the like. Whether the timing at which the device value changes is within the normal range may be, for example, whether the length of the period during which the device value is "1" (ON) is within a normal range. In addition, it may be determined whether the number of changes in the device value in a certain process or cycle is within a normal range. In a case where the device value collected from a certain device does not satisfy a normal condition, the device may be referred to as a non-normal device because the device behaves differently from usual. The CPU 41*a* may create an analysis report in a Web format and provide the analysis report to the Web browser of the PC 2 via the communication portion 43 and the communication cable 9*b*. When the CPU 31 has a protocol conversion function, the CPU 41*a* may transmit the analysis report to the PC 2 via the unit internal bus 90, the CPU 31, the communication portion 33, and the communication cable 9*a*. The analysis report may include a graph display component, a numerical value display component, or the like. These display components are implemented by markup data (example: HTML data) describing a front-end structure, style data (example: CSS data) describing decoration, code (example: JavaScript (registered trademark) code) describing dynamic processing, and the like. HTML is an abbreviation for hypertext markup language. CSS is an abbreviation for cascading style sheet.

Figure 4:
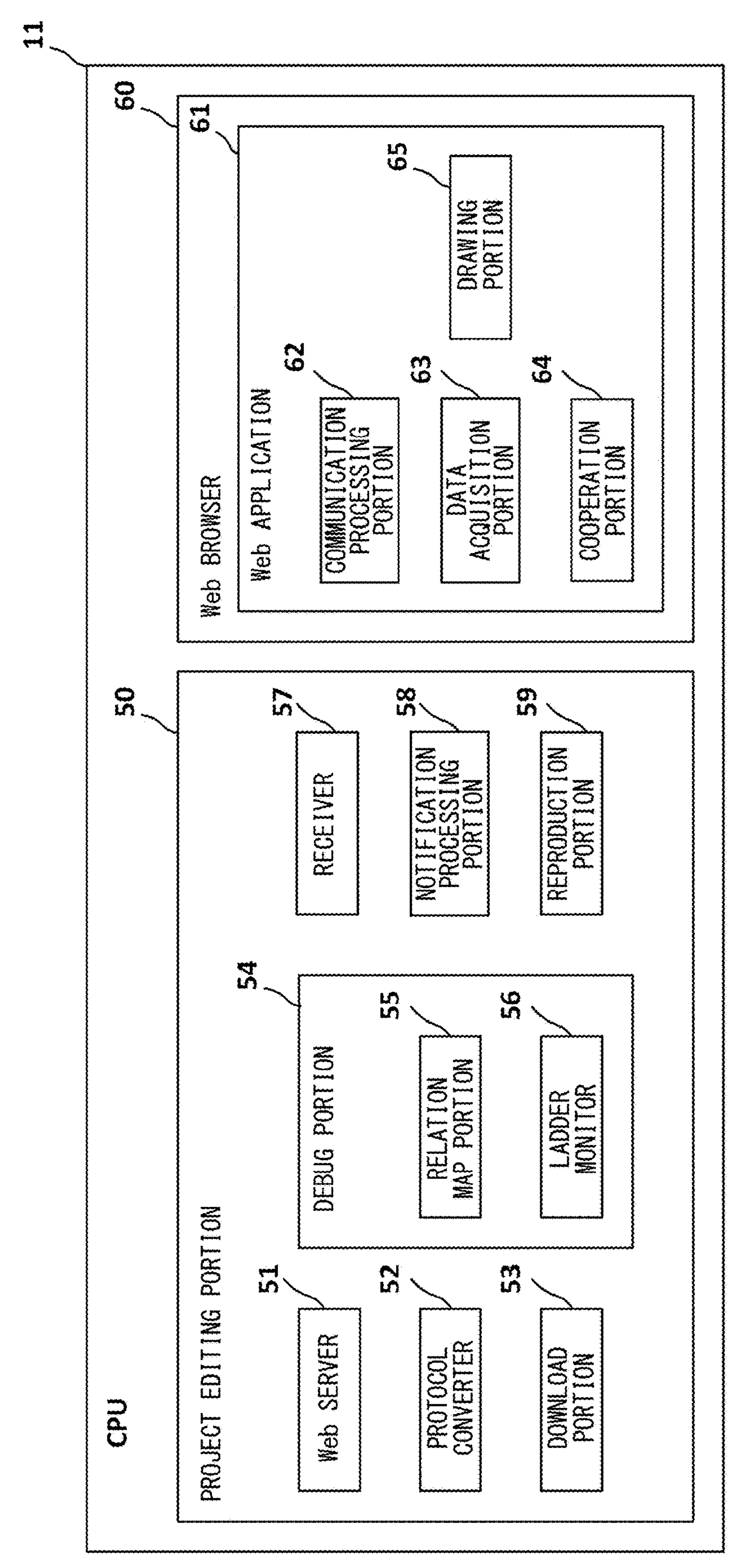
FIG. 4 is a diagram for explaining functions implemented by a CPU of a PC.

FIG. 4 is a diagram for explaining functions implemented by the CPU 11 of the PC 2. A project editing portion 50 is a function implemented by the CPU 11 executing the project editing program 14*a*. The project editing portion 50 creates project data including a user program in accordance with a user instruction input through the operation portion 8. A Web server 51 communicates with a Web browser 60 according to a hypertext transfer protocol (HTTP) to provide a display component to the Web browser 60. A protocol converter 52 converts HTTP into a predetermined communication protocol. The predetermined communication protocol is a communication protocol used for communication between the communication portion 13*a* and the communication portion 33. For example, when the Web browser 60 requests an analysis report by an HTTP request, the Web server 51 passes the HTTP request to the protocol converter 52. The HTTP request includes a uniform resource locator (URL) of the extension unit 4*a* (Web server) that is executed by the CPU 41*a* and provides the analysis report. The protocol converter 52 encapsulates the HTTP request and converts the HTTP request into a request signal (command) that can be transmitted using a predetermined communication protocol. This request signal is passed to the CPU 31 of the base unit 3, and further passed to the CPU 41*a* of the extension unit 4*a*. The CPU 41*a* returns the analysis report to the CPU 31 via the CPU 11. The Web server 51 of the CPU 11 passes the analysis report to the Web browser 60. As a result, the Web browser 60 displays the analysis report on the display portion 7.

A download portion 53 downloads an operation record and the like from the base unit 3 and stores the operation record and the like in the storage device 12. A debug portion 54 debugs the user program and displays a debugging result on the display portion 7. A ladder monitor 56 acquires a value stored in a symbol described in the user program from the operation record, and highlights the value with respect to the symbol in the user program. For example, the device value acquired from the operation record may be displayed in association with the device drawn in a ladder diagram of the ladder program. A relation map portion 55 creates a relation map indicating devices related to the non-normal devices displayed in the analysis report and displays the relation map on the display portion 7. The non-normal device is a device in which the device value does not satisfy the normal condition or the timing at which the device value changes does not satisfy the normal condition. The relation map is, for example, a UI that visually indicates a relationship between a device (input device) that affects a non-normal device and the non-normal device. The relation map may also display a relationship between a device (output device) affected by the non-normal device and the non-normal device. The debug portion 54 acquires the non-normal device and its related device by analyzing the ladder program, and creates a relation map.

A receiver 57 receives an editing operation, debug processing, and the like for the user program. A notification processing portion 58 acquires whether a notification is issued in the PLC 1 by polling and displays the acquired notification on the display portion 7. The notification is, for example, completion of creation of the analysis report. In response to a reproduction request input from the receiver 57 or a cooperation portion 64, for example, a reproduction portion 59 causes the download portion 53 to download and store the operation record in the storage device 12. The reproduction request may include, for example, identification information (example: unique identification information or a storage path name in the PLC 1) that can identify the operation record. The reproduction portion 59 reproduces the operation record stored in the storage device 12 and displays the same on the display portion 7. The reproduction portion 59 may include a ladder monitor 56 instead of the debug portion 54. Alternatively, the reproduction portion 59 may be included in the debug portion 54. The reproduction portion 59 may display the time-series device values acquired in real time from the PLC 1 in a waveform, or display the time-series device values included in the operation record in a waveform.

The Web browser 60 may display the analysis report on the display portion 7 by executing a Web application 61. The Web application 61 includes, for example, HTML data, CSS data, and java (R) script. The Web application 61 may be provided from the extension unit 4*a*. A communication processing portion 62 processes communication with the Web server 51. A data acquisition portion 63 acquires the operation record to be displayed in the analysis report from the project editing portion 50. It is assumed that the operation record is already stored in the storage device 12 by the download portion 53. The cooperation portion 64 passes designation information indicating a device or the like designated or selected by the user in the analysis report to the debug portion 54 or the like. As a result, the debug portion 54 can display the relation map of the non-normal device designated in the analysis report, or display a portion where the non-normal device is described in the ladder program. The user can easily edit the ladder program for the non-normal device. A drawing portion 65 displays the analysis report on the display portion 7. Furthermore, the cooperation portion 64 executes time management so that the reproduction time (selection time) in the analysis report is synchronized with the reproduction time of the operation record in the project editing portion 50.

Figure 5:
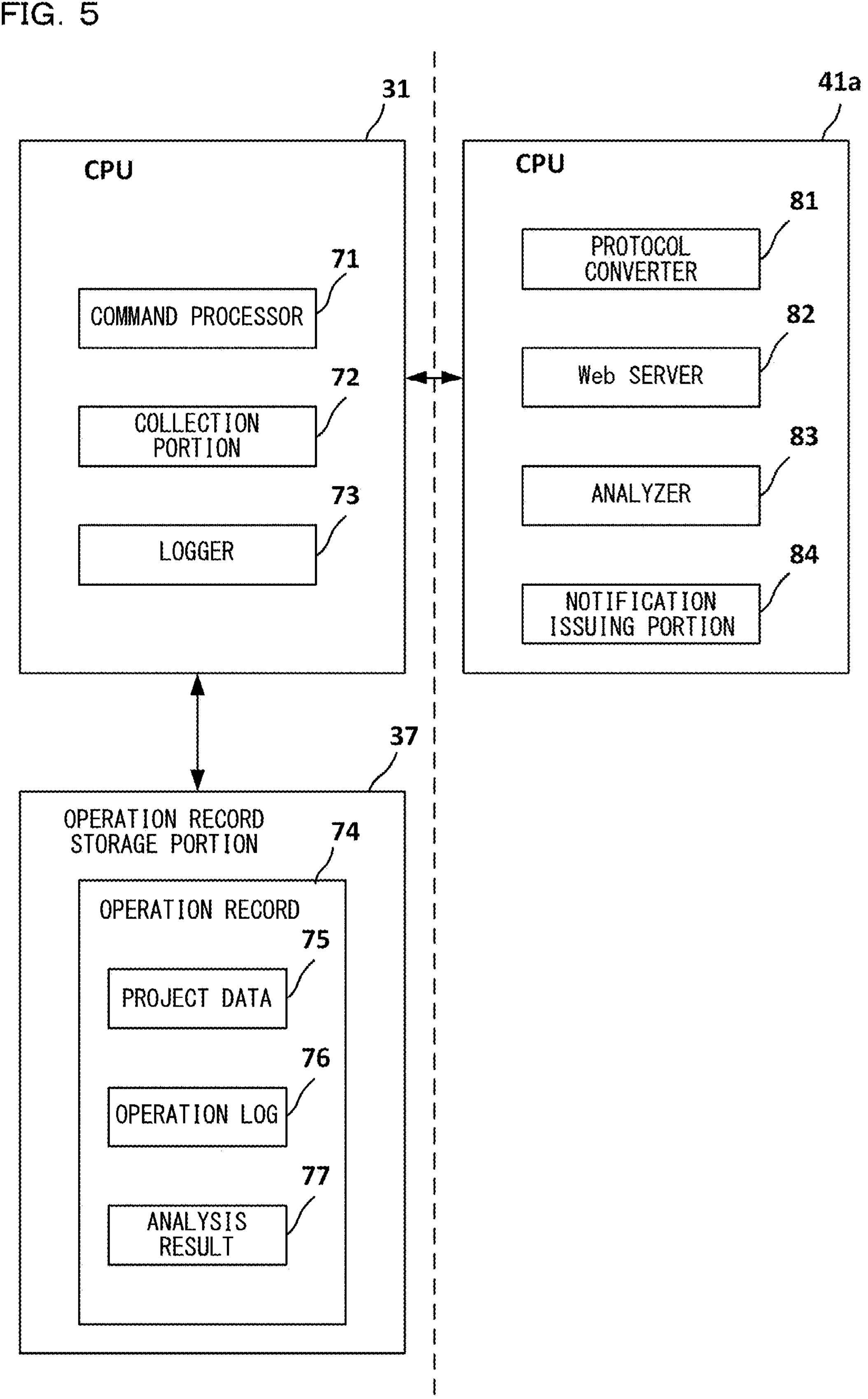
FIG. 5 is a diagram for explaining functions implemented by the CPU of the PLC.

FIG. 5 illustrates functions implemented by the CPU 31 and the CPU 41*a* executing control programs in the PLC 1. In the CPU 31, a command processor 71 interprets the command received from the PC 2 and executes processing corresponding to the interpretation result. For example, when a request signal created by encapsulating an HTTP request is received, the command processor 71 transfers the request signal to the CPU 41*a*. When a response signal to the request signal is received from the CPU 41*a*, the command processor 71 transfers the response signal to the PC 2. A collection portion 72 collects symbol values (values stored in device values and variables) from the base unit 3 and the extension unit 4*b* and stores the symbol values in the ring buffer 36. A logger 73 determines whether any error or trouble (non-normal event) has occurred in the PLC 1 based on the collected symbol value and the like. For example, the logger 73 may determine whether the collected symbol value satisfies the recording condition. When the collected symbol value satisfies the recording condition, the logger 73 stores the symbol value as an operation log 76 in an operation record 74. For example, the logger 73 creates a folder for storing the operation record 74 and stores the operation log 76 therein. The logger 73 reads project data 75 which is being executed when the operation record is created from the project storage portion 35 and stores the project data 75 in the operation record 74. Further, the logger 73 notifies an analyzer 83 that the operation record 74 has been created.

Note that the CPU 31 or the CPU 41*a* may include a setting portion for setting a control cycle to be used for generation of a learning model to be described later, analysis, and generation of an analysis report in accordance with an operator's input. The control cycle is set by designating a reference timing of the cycle. The setting of the control cycle may be referred to as a cycle setting. For example, the cycle setting includes a symbol name that defines the start timing of the cycle and rising/falling edge information of the symbol value. The cycle setting may include setting information of a cycle start timing by a symbol name defining a cycle start timing and rising/falling edge information of a symbol value, and setting information of a cycle end timing by a symbol name defining a cycle end timing and rising/falling edge information of a symbol value. The setting of the control cycle by the setting portion may be provided to the PLC 1 in a file format such as CSV, and the setting portion may read the file such as CSV to set the control cycle. For example, the control cycle set by the setting portion is used to classify devices synchronized with the cycle and add the classification information to the model as attribute information, narrow down devices to be analyzed according to the control cycle, and generate an analysis report displayed in synchronization with the control cycle. A plurality of control cycles may be set. In addition, the control cycle is not necessarily set. For example, when the possible value of the symbol value at the normal time is determined in advance, whether the symbol value is a non-normal symbol may be determined by determining whether the symbol value is the predetermined possible value.

In the CPU 41*a*, a protocol converter 81 converts the protocol of the HTTP request encapsulated and transferred from the PC 2 via the CPU 31 and takes out the HTTP request from the request signal. The protocol converter 81 encapsulates the response information transmitted from a Web server 82 in response to the HTTP request and passes the response information to the CPU 31. Even in the following description, the Web browser 60 of the PC 2 and the Web server 82 of the extension unit 4*a* can indirectly communicate with each other via the Web server 51, the protocol converters 52 and 81, the command processor 71, and the like in the PC 2. The protocol converters 52 and 81 may provide transparent tunnels (example: TCP tunnels). The Web server 82 provides the PC 2 with the analysis report created by the analyzer 83. The analyzer 83 analyzes the operation log 76 in the operation record 74, creates an analysis result 77, and passes the analysis result 77 to the logger 73. When the analyzer 83 creates the analysis result 77, the logger 73 adds the analysis result 77 to the operation record 74 including the analysis result 77 in addition to the project data 75 and the operation log 76. The operation record 74 is stored in the operation record storage portion 37. As described above, since the project data 75, the operation log 76, and the analysis result 77 when an abnormal event occurs in the PLC 1 are stored in the operation record 74 in association with each other, it is easy to accurately reproduce the state of the PLC 1 when the abnormal event occurs. For example, by visually reproducing the change in the device value on the ladder diagram, the user can easily debug the ladder program. In particular, when project data stored in the PC 2 is used, it may be difficult to accurately reproduce the state of the PLC 1 when an abnormal event occurs. This is because the project data stored in the PC 2 may not match the project data 75 executed in the PLC 1 when an abnormal event occurs. Therefore, the project data 75 executed by the PLC 1 when an abnormal event occurs is stored in the operation record 74. When the analysis result 77 is issued, a notification issuing portion 84 issues a notification. This notification is transmitted to the CPU 11.

<User Interface (UI)>

Figure 6:
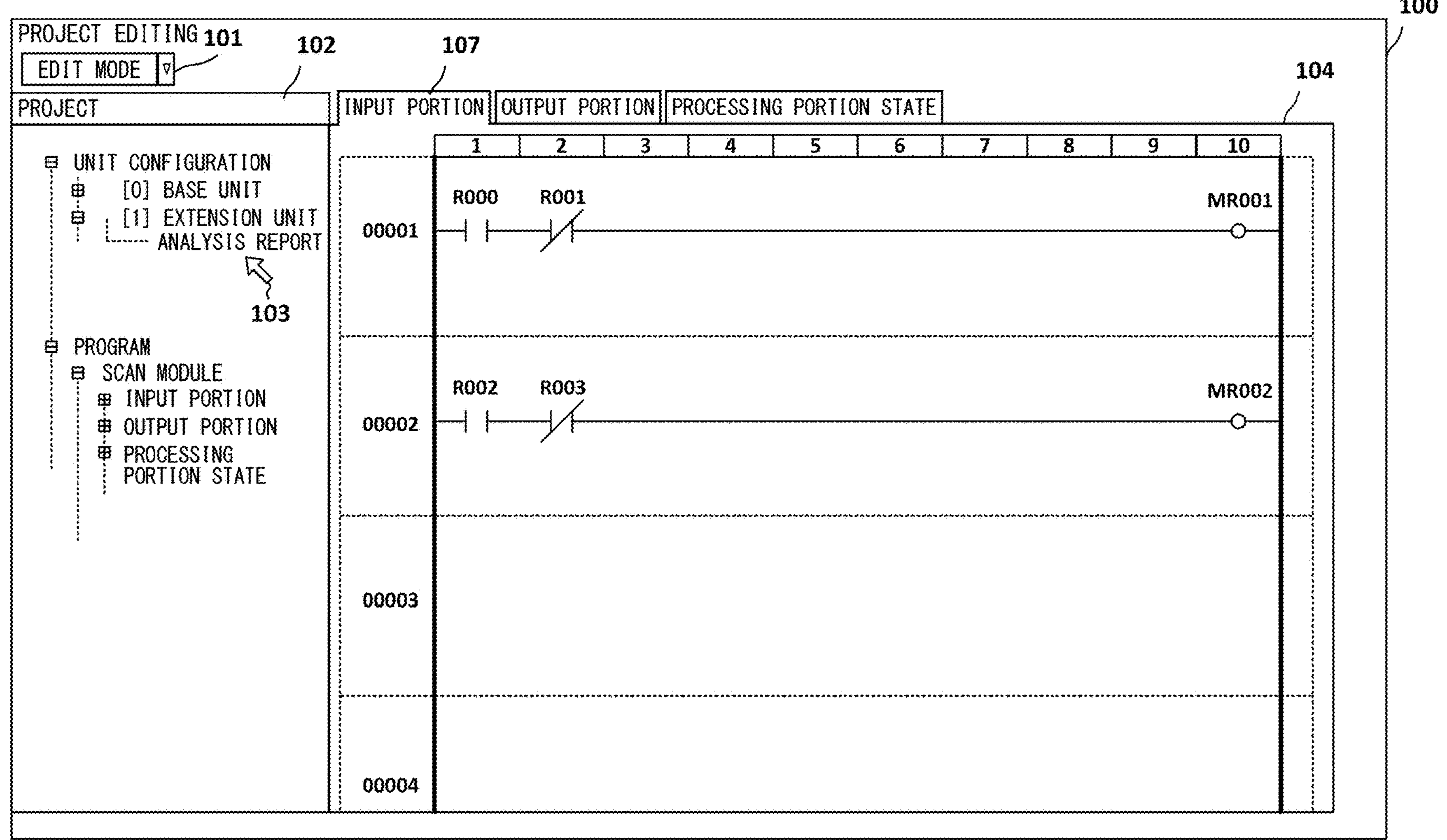
FIG. 6 is a diagram for explaining a user interface.
Figure 7:
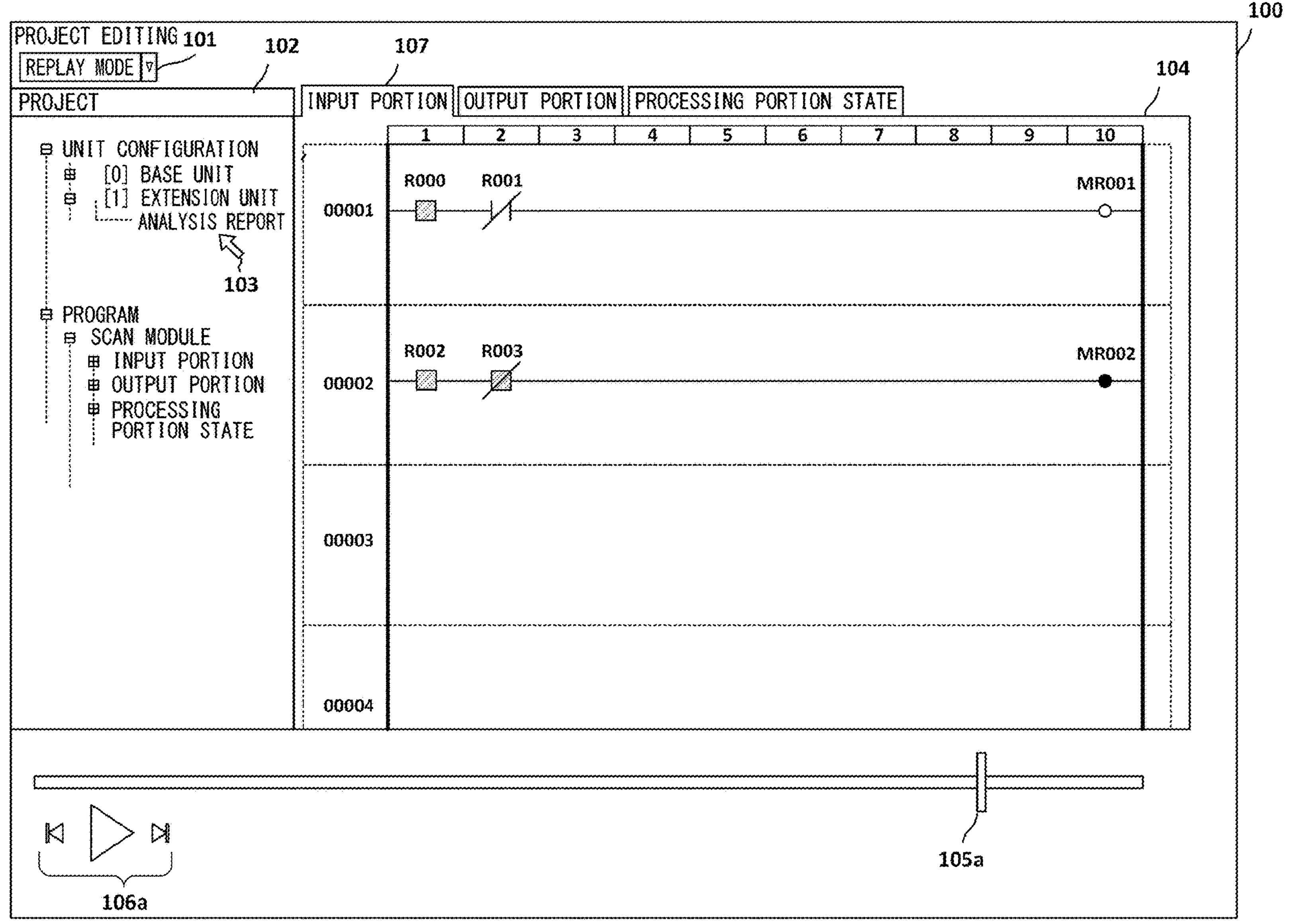
FIG. 7 is a diagram for explaining a user interface.

FIGS. 6 and 7 illustrate a UI 100 of the project editing program 14*a* displayed on the display portion 7 (the UI 100 is displayed on the display portion 7 by executing the project editing program 14*a*). A mode selection menu 101 displays a plurality of modes included in the project editing program 14*a* in a selectable manner. The plurality of modes includes an edit mode, a monitor mode, a replay mode (debug mode), and the like. The edit mode illustrated in FIG. 6 is a mode for editing the ladder program displayed in a program display area 104. A project display area 102 displays information constituting a project. Examples of the information include specification information and setting information of the base unit 3 and the extension unit 4 constituting the PLC 1, device allocation information, operation record setting information, and a ladder program. In the edit mode, the program display area 104 displays the ladder program designated in the project display area 102 in an editable manner. In FIG. 6, a ladder program having program modules named as an input portion, an output portion, and a processing portion state is displayed. In particular, a plurality of program modules can be selected by a tab 107, and in FIG. 6, the tab 107 corresponding to the input portion is selected.

The monitor mode is a mode for waiting for a notification issued by the PLC 1. When the extension unit 4*a* issues a notification indicating that the analysis result has been created, the CPU 11 displays a dialog or the like for displaying the notification on the display portion 7. The user interface of the monitor mode is basically similar to the edit mode.

FIG. 8 illustrates a notification dialog 108. The notification dialog 108 displays the name of the application or function that issued the notification, the content of the notification, the number of occurrences of the notification, the date and time of occurrence of the notification, and the like. The notification information for displaying the notification dialog 108 includes the URL of the analysis report. When a display button 109 is pressed, the CPU 11 passes the URL of the analysis report to the Web browser 60. As a result, the Web browser 60 accesses the Web server designated by the URL, acquires the display data (Web application 61) of the analysis report, and displays the analysis report.

As illustrated in FIG. 7, the replay mode is a mode for reproducing the operation record on the ladder program or displaying the operation record as a waveform. A pointer 103 moves in conjunction with a user operation on the operation portion 8, and is used to depress a button or the like or to select an object. For example, when the analysis report displayed in the project display area 102 is double-clicked by the pointer 103, the CPU 11 causes the Web browser 60 to display the analysis report.

In the replay mode, the device value included in the operation record is displayed on the ladder program in the program display area 104. In the case of a relay device (bit device), whether the device value is 0 or 1 is displayed in a visually distinguishable manner. The visually distinguishable manner includes displaying in different colors and displaying of different icons. For a word device, for example, a device value may be displayed in a decimal number. In addition, other numerical expression formats such as a hexadecimal device value may be employed.

Since the device value is time-series data that can change with time, each device value is associated with time information indicating the collected time. A seek bar 105*a* indicates the reproduction time of the device value and may be operated by the pointer 103 to designate the reproduction time. During reproduction of the operation record, the seek bar 105*a* moves from left to right in conjunction with the lapse of the reproduction time. A time designation portion 106*a* is a control object for advancing the reproduction time, returning the reproduction time, giving an instruction to start automatic reproduction, or giving an instruction to stop reproduction.

[Analysis Report]

Figure 9:
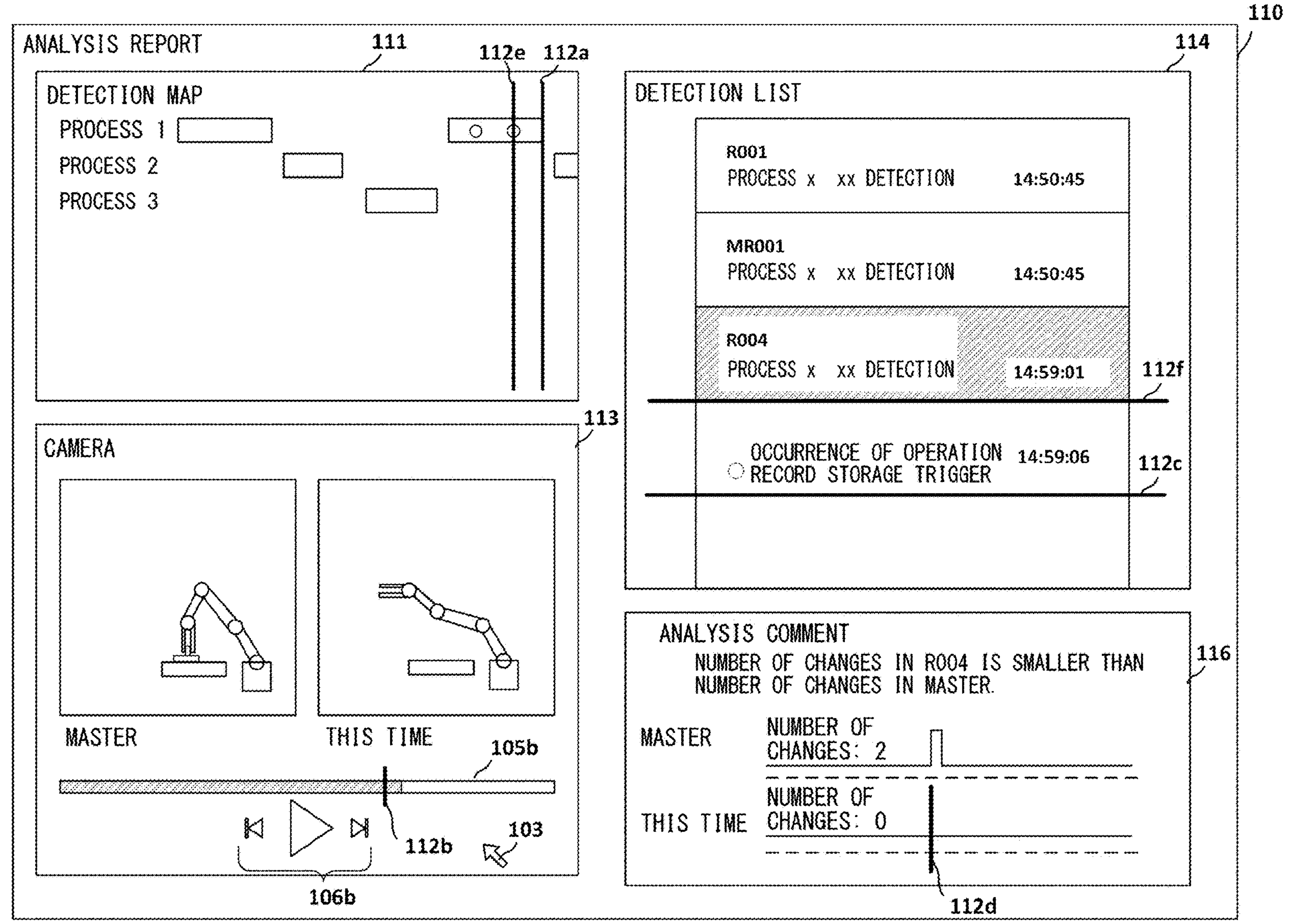
FIG. 9 is a diagram for explaining an analysis report.

FIG. 9 illustrates an analysis report 110 displayed on the display portion 7 when the Web browser 60 executes the Web application 61. Note that the analysis report 110 is displayed on the display portion 7 together with the UI 100 of the project editing program 14*a*. That is, the window of the UI 100 and the window of the analysis report 110 are displayed as different windows. However, the UI 100 and the analysis report 110 may be displayed in a single window. In addition, the analysis report 110 may be displayed on the display portion 7, or may be displayed on another display device such as a programmable indicator, a tablet, or a smartphone.

A detection map 111 displays a start timing and an end timing for each of a plurality of processes executed in the PLC 1. In general, the period from the start timing to the end timing is referred to as a cycle. In FIG. 9, a rectangle extending in the lateral direction indicates a period (cycle) during which the process is being executed. This rectangle indicates that the left is old and the right is new. A time bar 112*a* indicates a timing at which a storage trigger of the operation record data is generated. As described above, the operation record data holds data collected before the timing when the storage trigger occurs and data collected after this timing. Therefore, data is shown before and after the time bar 112*a*. On the other hand, a time bar 112*e* indicates the time during selection, and can be moved to a desired time (left and right) by a drag operation or a drag and drop operation of the user. When the user clicks a desired position on the detection map instead of dragging and dropping, the time bar 112*e* may jump to the desired position. In this way, the user can update the display of the analysis result by operating the time bar 112*c*. According to the operation of the time bar 112*e*, at least one or all of a detection list 114, an image display area 113, and an analysis comment 116 to be described later may be updated (time-synchronized) in conjunction with one another, and a corresponding analysis result may be displayed. Note that the time bars 112*a* and 112*e* may be drawn in different colors, or may be drawn in solid lines and broken lines. As a result, the discrimination of the time bars 112*a* and 112*e* is improved.

Here, two circles are described in process 1 of the detection map 111, and this indicates the timing at which the detection target device is in a state different from usual. A circle on the left side indicates a timing at which devices R001 and MR001 are in a state different from usual (14:50:45 in both cases). A circle on the right side indicates a timing (14:59:01) at which a device R004 is in an unusual state. FIG. 9 illustrates a state in which the user selects the device field of R004 in the detection list 114, and the time bar 112*e* of the detection map 111 is displayed at a position overlapping the right circle.

Figure 10:
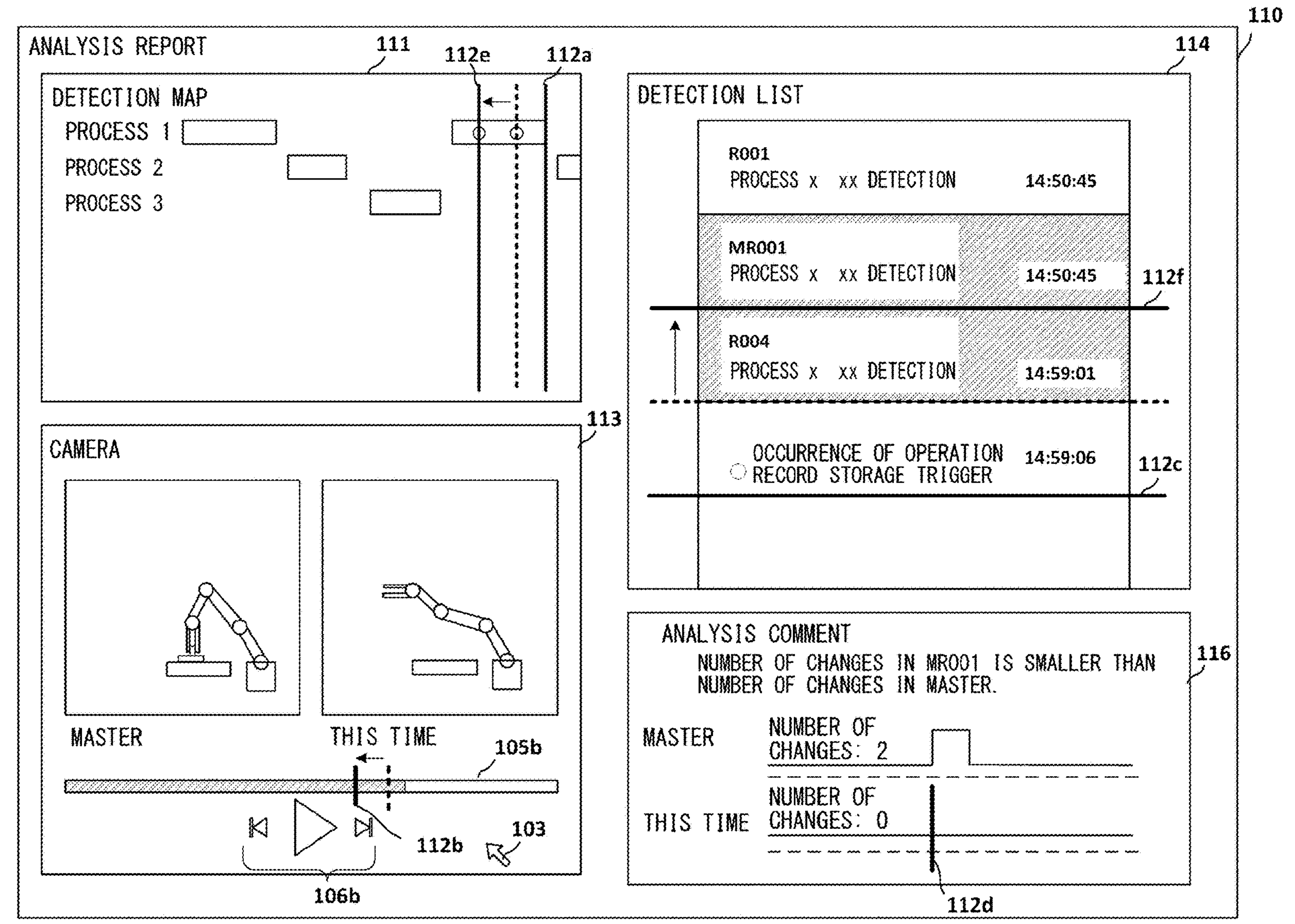
FIG. 10 is a diagram for explaining an analysis report.

The display position of the time bar 112*e* of the detection map 111 is interlocked to the device selection of the user in the detection list 114. In the state illustrated in FIG. 9, when the device field of the MR001 is selected (clicked), as illustrated in FIG. 10, the MR001 is highlighted, and the time bar 112*e* of the detection map 111 moves to a position overlapping the left circle of the two circles (the same applies to the case of selecting the device field of the R001). In addition, in accordance with the movement of the time bar 112*c*, a time bar 112*f* of the detection list also moves up by one (interlocking).

The state different from usual means, for example, that the device value deviates from the normal range, or that the timing or the number of times the device value changes deviates from the normal range. In a product manufacturing factory, the same product is mass-produced every day. That is, the same process is repeatedly executed many times. Therefore, detecting and displaying a state different from usual is very useful for improving a ladder program or reviewing production equipment. The normal range (normal condition) defining the same state (normal state) as usual may be defined by the master data or may be defined by the learning result of the device value. In the detection map 111, the rectangle indicating the process moves from right to left as time passes (as described above, the time is old on the left and new on the right).

The image display area 113 displays the camera image acquired in the PLC 1. A camera image may also be included in the operation record. In FIG. 9, the camera image of the master data and the current camera image are displayed in a comparable manner. Since the camera image is also time-series data, a seek bar 105*b* indicates the reproduction time of the camera image and moves from left to right as the reproduction time elapses. A time bar 112*b* indicates the time during the selection, and FIG. 9 indicates the timing at which the detection target device R004 is in a state different from usual. A time designation portion 106*b* is a control object for advancing the reproduction time of the camera image, returning the reproduction time, giving an instruction to start reproduction, or giving an instruction to stop reproduction. Note that the cooperation portion 64 and the reproduction portion 59 manage the reproduction time of the detection map 111, the reproduction time of the camera image, and the reproduction time on the UI 100 to be synchronized with each other. As a result, the reproduction time in the UI 100 coincides with the reproduction time in the analysis report 110.

The detection list 114 indicates a device that has entered an unusual state and a time at which the state has occurred (collection time of device values). When detecting a click on the device displayed in the detection list 114, the CPU 11 may switch the operation mode of the project editing portion 50 to the replay mode. The CPU 11 passes, to the debug portion 54, identification information of the clicked device, reproduction time information (collection time of the device value), and information (such as a storage path) for specifying the operation record to be analyzed. As a result, the mode transitions to the replay mode using the operation record to be analyzed, and at that time, the reproduction time of the analysis report 110 and the reproduction time information of the project editing portion 50 are synchronized with each other. As a result, as illustrated in FIG. 7, the operation record 74 is reproduced in association with the ladder program. Note that FIG. 7 corresponds to a display screen when the replay mode of the UI 100 is started in a state where the device R004 is selected in the detection list 114 of FIG. 9. The seek bar 105*a* in FIG. 7 indicates the time (14:59:01) at which the device R004 is in an unusual state. In addition, in the program display area 104, the states of the respective devices at this time (14:59:01) are displayed in a visually distinguishable manner. Note that the project editing portion 50 may already be operating in the replay mode before the analysis report 110 is displayed. In this case, when a non-normal device is selected in the analysis report 110, the CPU 11 may pass the time when the non-normal state (an event different from usual) occurs to the project editing portion 50, and the project editing portion 50 may read the device value synchronized with the time from the storage device 12 and display the device value on the ladder program.

In FIG. 9, a time bar 112*c* indicates the timing (14:59:06) at which the storage trigger of the operation record data is generated. As described above, the time bar 112*f* is interlocked with the time indicated by the time bar 112*e* of the detection map 111. For example, when the time bar 112*e* is moved leftward from the left circle, the time bar 112*f* moves to a position overlapping the upper end line of the device field of R001 in the detection list 114.

Figure 11:
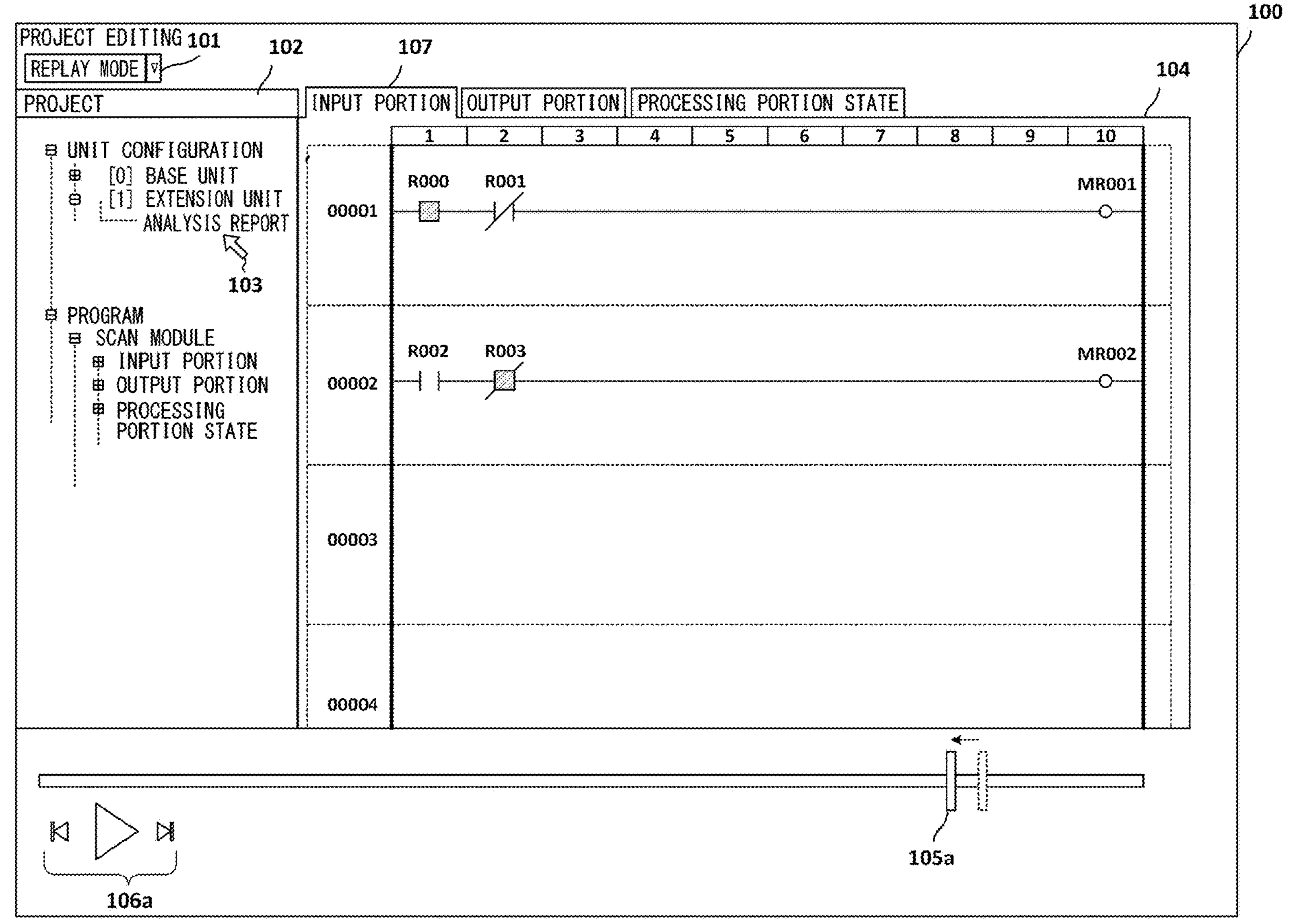
FIG. 11 is a diagram for explaining a user interface.

Here, FIGS. 10 and 11 are explanatory diagrams for explaining how the analysis report 110 (FIG. 9) and the UI 100 (FIG. 7) of the project editing program 14*a* are interlocking. As described above, FIG. 7 corresponds to a display screen when the replay mode of the UI 100 is started in a state where the device R004 is selected in the detection list 114 of FIG. 9.

As illustrated in FIG. 10, when the user selects (clicks) MR001 in the detection list 114, the time bar 112*e* moves in conjunction with the MR001 in the detection map 111. Along with the movement of the time bar 112*c*, the time bar 112*f* also moves up by one. In addition, as the time bar 112*e* moves, the time bar 112*b* in the image display area 113 also moves to the left (interlocking display). Further, the display of the analysis comment 116 to be described later is also switched according to the selection of the MR001. Details will be described later.

On the other hand, as illustrated in FIG. 11, the seek bar 105*a* moves slightly leftward (temporally forward) from FIG. 7. At this time, the seek bar 105*a* indicates the time (14:50:45) at which the device MR001 is in an unusual state. As described above, the time specified by the time bar 112*e* or the time bar 112*f* of the analysis report 110 and the reproduction time of the operation record (the time specified by the seek bar 105*a*) are displayed in synchronization by the cooperation portion 64.

Note that, in FIGS. 10 and 11, the interlocking display in a state where the UI 100 of the project editing program 14*a* is activated in advance has been described. However, for example, in a case where the UI 100 is activated in a state where the device field of the MR001 is previously selected in the detection list 114 of the analysis report 110, the UI 100 is activated in a state after the change illustrated in FIGS. 10 and 11.

Furthermore, in FIG. 10, the user selects one device from the detection list 114, but a plurality of devices may be selected. In this case, processing similar to that when the uppermost device (temporally oldest device) is selected is performed. That is, for example, when the replay mode of the UI 100 is activated in a state where both the MR001 and the R004 are selected, the UI 100 is activated in the state after the change illustrated in FIG. 11. The synchronous reproduction of time in the present specification is a concept including synchronous reproduction of a time index specified by the time bar 112*f* and a reproduction time index of an operation record. That is, instead of the time itself, the indexes indicating the time may be synchronously reproduced.

As illustrated in FIG. 12, the CPU 11 may read the name of the non-normal device and a device comment 115 from the project data and display them in the detection list 114. The device comment 115 indicates the use of the device and the like. Therefore, the user can easily understand the application of the non-normal device and the like.

The analysis comment 116 displays the comment included in the analysis result, the master data of the device selected in the detection list 114, and the time-series data of the current device value. The data displayed in the analysis comment 116 is data for one control cycle. A time bar 112*d* indicates a timing at which an unusual state has occurred.

FIGS. 9 and 12 illustrate data for one control cycle in which an unusual state has occurred for the device of the device R004. More specifically, in the master data, two changes of OFF→ON and ON→OFF occur at one control cycle, whereas no change occurs in the current data. Therefore, the time bar 112*d* is displayed in a state different from usual, that is, at the timing of turning OFF→ON.

Here, in the analysis comment 116 illustrated in FIGS. 9 and 12, when the user selects (clicks) the MR001 in the detection list 114, the display is switched to the display illustrated in FIG. 10. FIG. 10 illustrates a state in which a state different from unusual occurs in the MR001 device. In the present embodiment, each of the time bars 112*e*, 112*b*, and 112*f* indicates the same timing.

<Data Collection from Other PLC and the Like>

In the above-described embodiment, data is collected from the field device 10 connected to the PLC 1 and analyzed. However, this is merely an example. The PLC 1 may collect and analyze data from other PLCs, field devices, or the like connected via a network. For this purpose, the PLC 1 needs to be able to communicate with a device (hereinafter, the target device) as a data collection target such as another PLC 1 via an industrial network.

Figure 13:
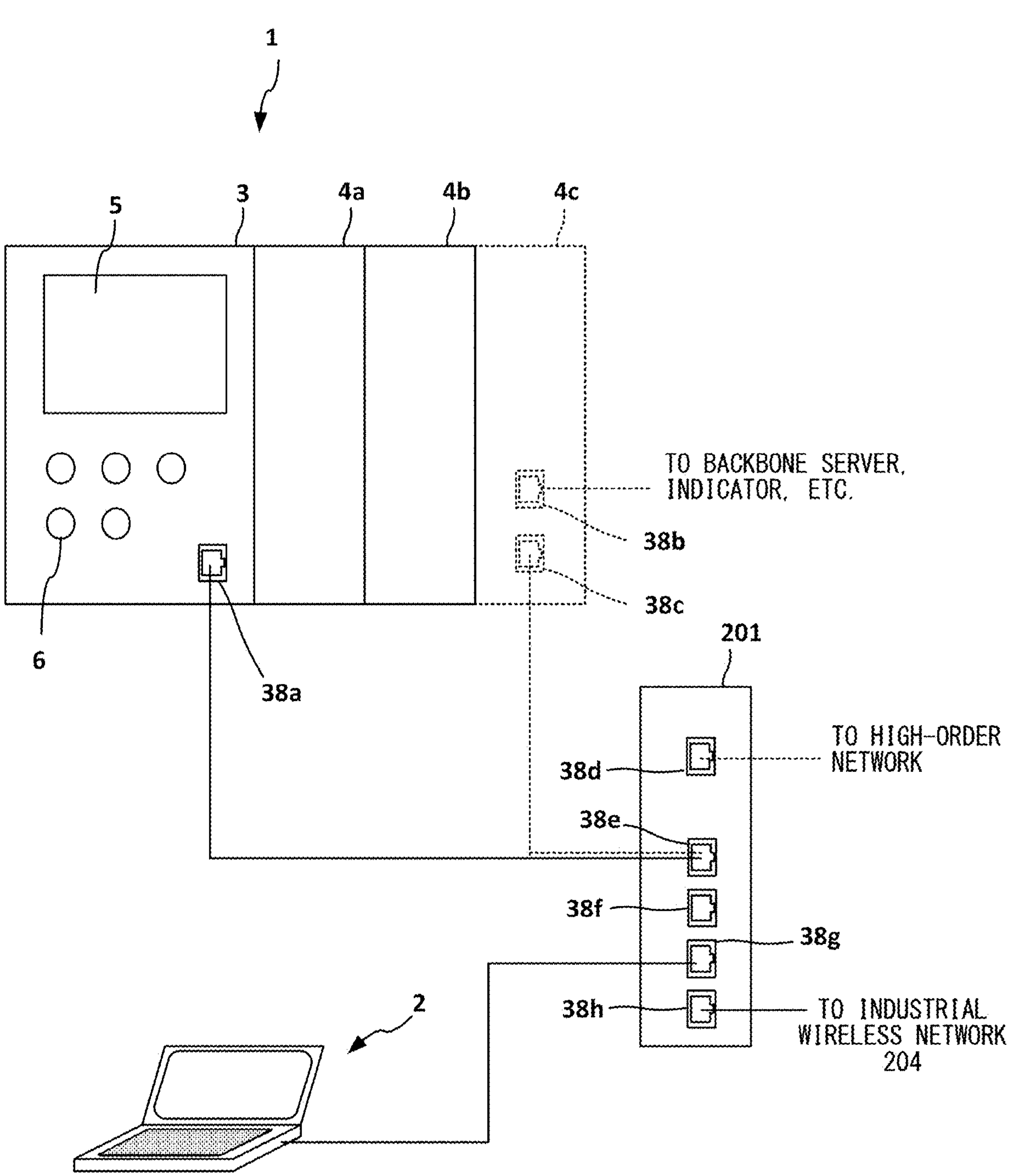
FIG. 13 is a diagram for explaining a connection position of a master device in an industrial wireless system.
Figure 14:
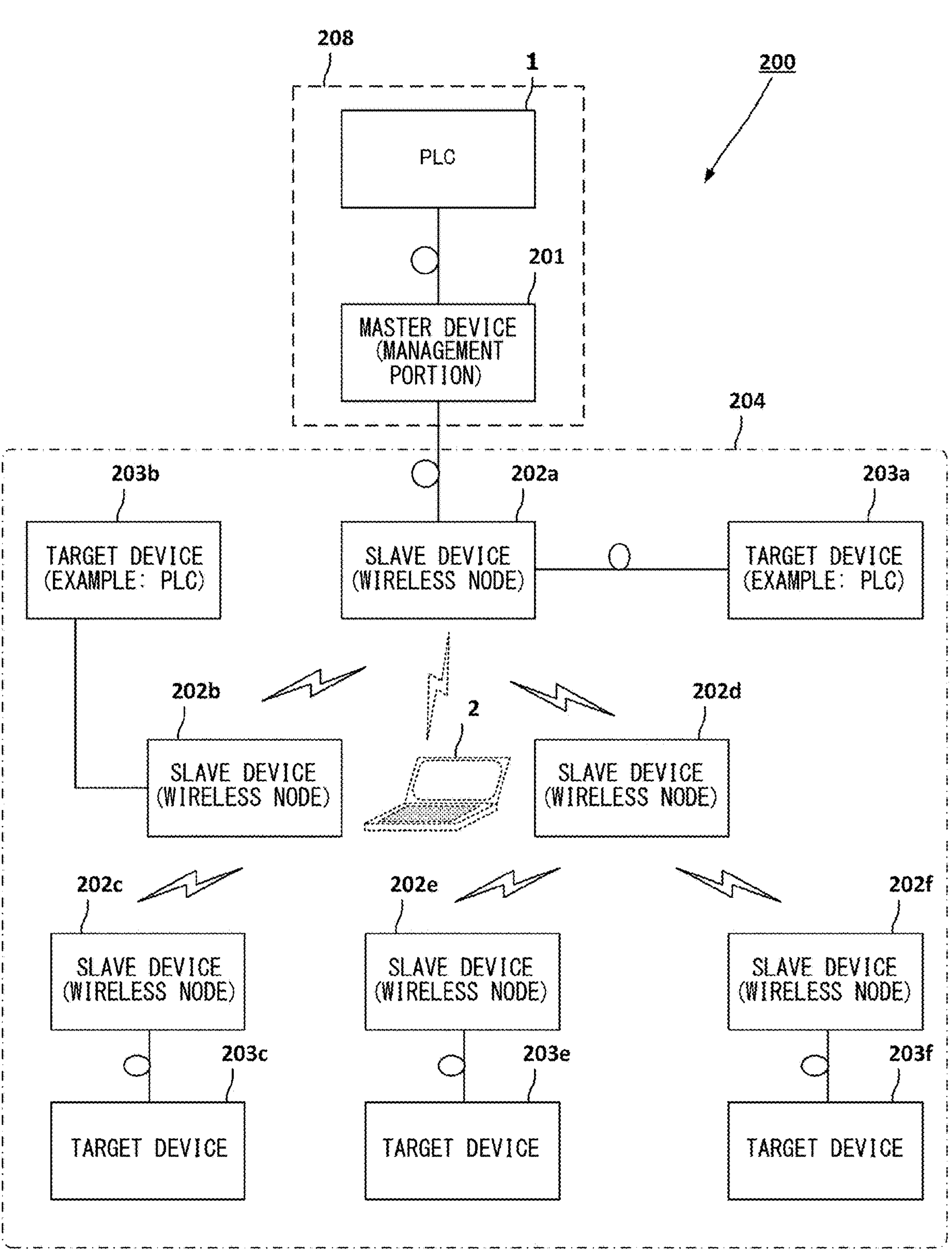
FIG. 14 is a diagram for explaining an industrial wireless system.

FIG. 13 illustrates a network device necessary for connecting the PLC 1 to an industrial wireless network. An industrial wireless system 200 includes, for example, a PLC 1, a master device 201, and an industrial wireless network 204 (FIG. 14).

The master device 201 is a management device that manages settings and the like of a plurality of wireless slave devices. The master device 201 includes a WAN port (LAN port 38*d*) and LAN ports 38*e* to 38*h*.

The LAN port 38*d* is an Ethernet (registered trademark) port for connection with a high-order network such as the Internet or an intranet. The LAN ports 38*e* to 38*h* are Ethernet (registered trademark) ports for connection with at least one wireless slave device among a plurality of wireless slave devices forming an industrial network. In this example, the LAN port 38*e* is connected to a LAN port 38*a* of the base unit 3.

An extension unit 4*c* is an extension unit for increasing the number of network devices connectable to the base unit 3. The extension unit 4*c* includes a plurality of LAN ports 38*b* and 38*c*, and is sometimes referred to as an Ethernet (registered trademark) unit. As a result, the base unit 3 has three LAN ports 38*a*, 38*b*, and 38*c*. For example, the LAN ports 38*b* and 38*c* may be connected to the master device 201, or may be connected to a backbone server (example: relational database server, web server, ftp server) or an indicator (a monitor device that displays a device value of the PLC 1).

FIG. 14 illustrates an industrial wireless network 204 connected to the master device 201. The PLC 1 and the master device 201 are accommodated in a control panel 208 that is a shielded case.

A slave device 202 (slave devices 202*a* to 202*f*) is an example of a wireless slave device. The slave devices 202*a* to 202*f* are the same network devices, but the roles in the industrial wireless network 204 may be different depending on the connection positions in the network topology and the contents set by the master device 201. The slave devices 202*a* to 202*f* may be referred to as wireless nodes.

The slave device 202*a* is connected to the LAN port 38*e* of the master device 201 via a network cable. The slave device 202*a* is connected to the target device 203*a* (example: another plc 1, field device, other) via a network cable, and transfers the operation data of the target device 203*a* to the PLC 1. The target device 203*a* may be, for example, an electric power meter for measuring electric power of a device (such as a flowmeter or a processing device) used in an FA site. In this case, examples of the operation data transferred from the electric power meter to the PLC 1 include data such as an integrated active power amount, a current, a voltage, a power factor, a frequency, and an integrated reactive power amount. In addition, an Ethernet-compatible communication unit may be provided as a part of the PLC 1, and various operation data may be transferred from the electric power meter wire-connected to any one of the slave devices 202*a* to 202*f* to the Ethernet-compatible communication unit via the industrial wireless network 204. The target device 203*a* is not necessarily connected to the slave device 202*a*. Furthermore, the slave device 202*a* can wirelessly communicate with one or more other slave devices 202*b* and 202*d*. When receiving a request (including a transfer request) from the PLC 1 via the master device 201, the slave device 202*a* operates in response to the request, transfers the request to the other slave devices 202*b* to 202*f*, or transfers responses from the other slave devices 202*b* to 202*f* to the PLC 1 via the master device 201.

The slave device 202*b* is a network device that performs wireless communication with the slave device 202*a* and the slave device 202*c*, and performs wired communication with the target device 203*b*. The target device 203*b* may not be connected. The slave device 202*b* relays a communication signal between the slave device 202*a* and the slave device 202*c*, and transfers the operation data of the target device 203*b* to the PLC 1 via the slave device 202*a* and the master device 201. When receiving a request from the PLC 1 via the master device 201, the slave device 202*b* operates in response to the request, transfers the request to another slave device 202*c*, or transfers a response from another slave device 202*c* to the PLC 1 via the master device 201.

The slave device 202*c* is a network device that performs wireless communication with the slave device 202*b*, and performs wired communication with the target device 203*c*. The target device 203*c* may not be connected. The slave device 202*c* transfers the operation data of the target device 203*c* to the PLC 1 via the slave device 202*b*, the slave device 202*a*, and the master device 201. When receiving the request from the PLC 1 via the master device 201 and the slave devices 202*a* and 202*b*, the slave device 202*c* operates in response to the request, creates a response to the request, and transfers the response to the PLC 1 via the slave devices 202*a* and 202*b* and the master device 201.

The slave device 202*d* is a network device that performs wireless communication with the slave device 202*a*, the slave device 202*e*, and the slave device 202*f*. The target device may also be connected to the slave device 202*d*. The slave device 202*d* relays a communication signal between the slave device 202*a* and the slave device 202*e*, and relays a communication signal between the slave device 202*a* and the slave device 202*f*. When receiving a request from the PLC 1 via the master device 201 and the slave device 202*a*, the slave device 202*d* operates in response to the request, transfers the request to the other slave devices 202*e* and 202*f*, and transfers responses from the other slave devices 202*e* and 202*f* to the PLC 1 via the master device 201.

The slave device 202*e* is a network device that performs wireless communication with the slave device 202*d*, and performs wired communication with the target device 203*e*. The target device 203*e* may not be connected. The slave device 202*e* transfers the operation data of the target device 203*e* to the PLC 1 via the slave device 202*d*, the slave device 202*a*, and the master device 201. When receiving the request from the PLC 1 via the master device 201 and the slave devices 202*a* and 202*d*, the slave device 202*e* operates in response to the request, creates a response to the request, and transfers the response to the PLC 1 via the slave devices 202*a* and 202*d* and the master device 201.

The slave device 202*f* is a network device that performs wireless communication with the slave device 202*d*, and performs wired communication with the target device 203*f*. The target device 203*f* may not be connected. The slave device 202*f* transfers the operation data of the target device 203*f* to the PLC 1 via the slave device 202*d*, the slave device 202*a*, and the master device 201. When receiving the request from the PLC 1 via the master device 201 and the slave devices 202*a* and 202*d*, the slave device 202*f* operates in response to the request, creates a response to the request, and transfers the response to the PLC 1 via the slave devices 202*a* and 202*d* and the master device 201.

In this way, by constructing the industrial wireless network 204, the PLC 1 can not only collect the operation data from the extension unit 4 and the field device 10 connected to the PLC 1 itself, but also collect the operation data from the target device including the other PLC 1 connected via the industrial wireless network 204.

The slave devices 202*a* to 202*f* may be connected to the other PCs 2 to relay communication between the other PCs 2 and the PLC 1. The other PC 2 may function as a simple indicator (simple monitor) that displays the operation data of the PLC 1. Here, the industrial wireless network 204 may be a wireless mesh network. In general, the wireless mesh network is a network in which a plurality of slave devices 202*a* to 202*f* are connected to each other by wireless communication and a packet is transferred in multi-hop. In other words, the wireless mesh network is a network in which a mesh-like topology is formed in the entire network by wirelessly connecting adjacent communicable slave devices, and packets are transferred in a bucket relay manner across one or a plurality of slave devices. The wireless mesh network is characterized by being more resistant to communication failure than other wireless networks because the wireless mesh network can switch to an alternative path even if communication becomes impossible through a specific path. Supplementary description will be given below with reference to FIG. 14.

In FIG. 14, the slave devices 202*a* to 202*f* may store, for example, a "destination table" and a "next hop table". The "destination table" is a table in which wireless nodes (slave devices 202*a* to 202*f*) connected by wire are associated with destination terminals such as the master device 201 and (the MAC addresses of) the target devices 203*a* to 203*f*. When constructing the wireless mesh network, for example, the master device 201 grasps the existence (MAC addresses and the like) of all the target devices 203*a* to 203*f* included in the wireless mesh network by transmitting broadcast packets, and distributes information on wireless nodes wire-connected to the target devices 203*a* to 203*f* to the slave devices

202*a* to 202*f*. Note that the "destination table" may be updated by transmitting a broadcast packet at the timing of the first communication with a specific target device.

The "next hop table" is a table individually stored by each of the slave devices 202*a* to 202*f*, and is a table that defines to which slave device nearby the packet is to be transferred next (that is, the next transfer destination of the packet). When constructing the industrial wireless network 204, the master device 201 determines a packet transfer route (for example, a tree shape) and a next hop table assuming the route, determines a next hop table for the slave devices 202*a* to 202*f*, and distributes the table to each slave device. For example, the next hop table stored in the slave device 202*e* includes information indicating that the transfer destination next to the packet whose destination node is set to "slave device 202*a*" is "slave device 202*d*".

Note that, although the master device 201 has the function of determining the packet transfer route and the next hop table in the present embodiment, for example, the slave device 202*a* wire-connected to the master device 201 may have the function. In other words, in a case where the slave device 202*a* is not wire-connected to the master device 201, the slave device 202*a* may have a function similar to those of the other slave devices 202*b* to 202*f*, and in a case where the slave device 202*a* is wire-connected to the master device 201, the slave device 202*a* may exhibit a function (for example, a function of determining the packet transfer route and the next hop table described above) different from those of the other slave devices 202*b* to 202*f*. For example, a specific program may be executed only in the slave device 202*a* wire-connected to the master device 201 in order to exhibit the function of determining the packet transfer route and the next hop table described above.

An example of packet transfer will be described. When the packet transfer from the target device 203*c* to the master device 201 is considered, first, the target device 203*e* transfers the packet to the slave device 202*e* wire-connected to the target device 203*e*. The slave device 202*c* refers to the destination table and recognizes that it is sufficient to deliver the packet to the slave device 202*a* wire-connected to the master device 201. Next, the slave device 202*e* refers to the next hop table, and recognizes that it is sufficient to transfer the packet to the slave device 202*d* as the next transfer destination in order to deliver the packet to the slave device 202*a*. Then, the slave device 202*e* transfers the packet to the slave device 202*d* that is the next packet transfer destination. Thereafter, similar processing is repeated in the slave device 202*d*, and the packet arrives at the slave device 202*a*. The slave device 202*a* refers to the destination table, recognizes that the packet addressed to the master device 201 has arrived at itself, and transfers the packet to the master device 201 connected by wire. In this manner, the packet is transferred in a bucket relay method.

Another example of packet transfer will be described. When the packet transfer from the target device 203*e* to the target device 203*f* is considered, the target device 203*e* first transfers the packet to the slave device 202*e* connected to the target device 203*c*. The slave device 202*c* refers to the destination table and recognizes that it is sufficient to deliver the packet to the slave device 202*f* wire-connected to the target device 203*f*. Next, the slave device 202*c* refers to the next hop table, and recognizes that it is sufficient to transfer the packet to the slave device 202*d* as the next transfer destination in order to deliver the packet to the slave device 202*f*. Then, the slave device 202*e* transfers the packet to the slave device 202*d* that is the next packet transfer destination. Similar processing is repeated in the slave device 202*d*, and the packet arrives at the slave device 202*f*. The slave device 202*f* refers to the destination table, recognizes that the packet addressed to the target device 203*f* has arrived at itself, and transfers the packet to the target device 203*f* connected in wire. As described above, by using the "next hop table", it is also possible to perform wireless communication without going through the slave device 202*a* connected to the master device 201.

The master device 201 (or the slave device 202*a*) may dynamically optimize the network configuration in the industrial wireless network 204 by periodically monitoring the communication state (for example, the packet delay time, the number of hops, the degree of radio wave penetration, the radio wave intensity, and the like) between the slave devices in the industrial wireless network 204. In short, the master device 201 (or the slave device 202*a*) may dynamically generate and update the next hop table. For example, when deterioration of a communication state between the slave device 202*d* and the slave device 202*e* is recognized for some reason (for example, an object causing radio wave interference or radio wave disturbance is placed), the slave device 202*e* searches for another slave device capable of wireless communication. For example, when the slave device 202*b* is found, a route via the slave device 202*b* is determined and updated as a packet transfer route from the slave device 202*e* to the slave device 202*a*. Then, the master device 201 (or the slave device 202*a*) determines and updates the next hop table that assumes the updated packet transfer route, determines and updates the next hop table for the slave devices 202*a* to 202*f*, and distributes the updated next hop table to each slave device.

Note that the function of periodically monitoring the communication state between the slave devices may also be provided not to the master device 201 but to the slave device 202*a* wire-connected to the master device 201, similarly to the function of determining the packet transfer route and the next hop table. Furthermore, in the above-described example, packet transfer using both the "destination table" and the "next hop table" has been described, but this is merely an example.

(1) Structure of Master Device

Figure 15:
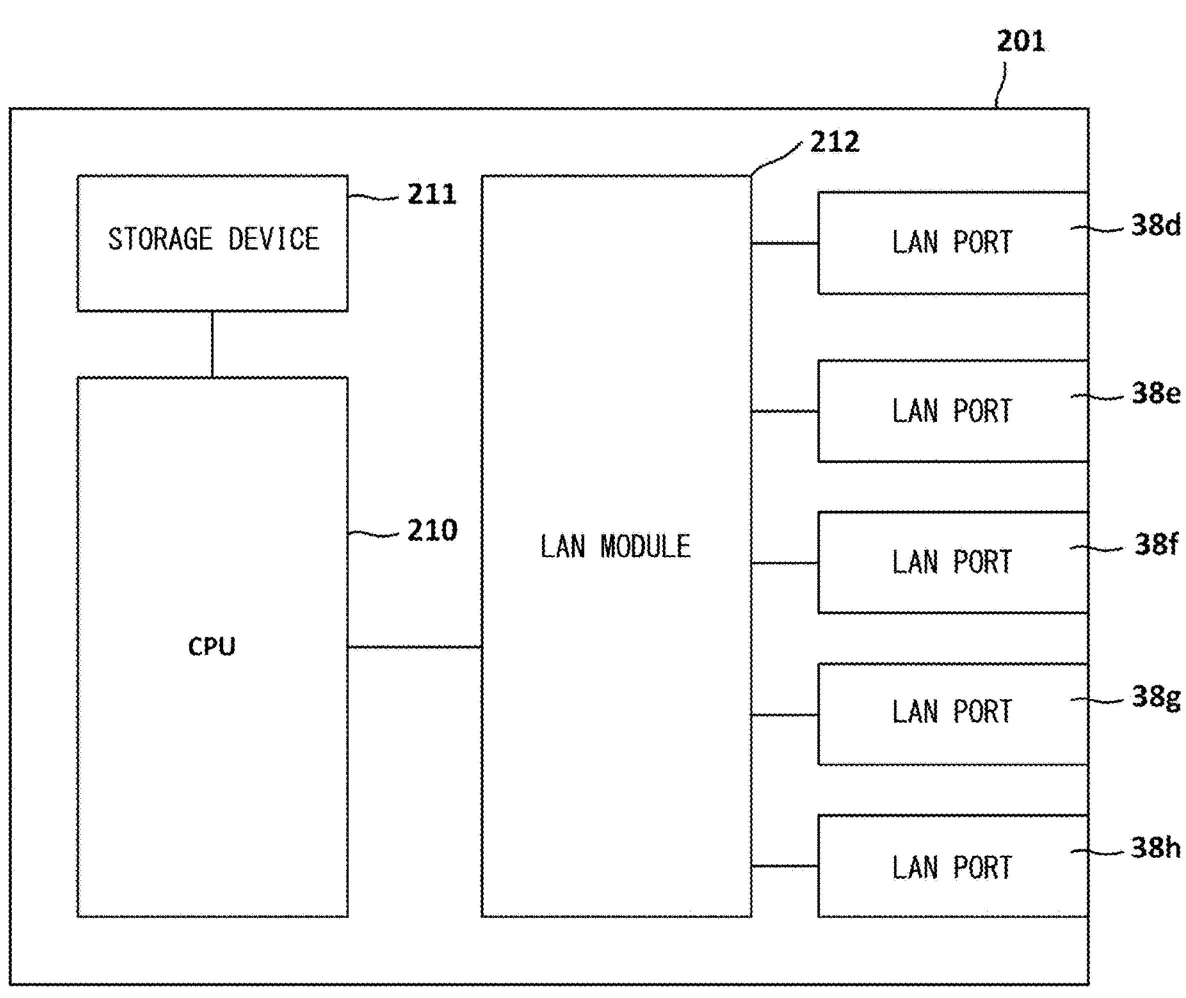
FIG. 15 is a diagram for explaining hardware of the master device.

FIG. 15 illustrates an electrical structure of the master device 201. A CPU 210 controls a LAN module 212 according to a program stored in a storage device 211. The LAN module 212 is a wired communication circuit (network communication circuit) that executes wired communication with other network devices connected to the plurality of LAN ports 38*d* to 38*h*. The CPU 210 includes at least one processor core (processing circuit). The storage device 211 includes a read-only memory (ROM) and a random access memory (RAM). The ROM is an example of a nonvolatile memory. The RAM is an example of a volatile memory.

Figure 16:
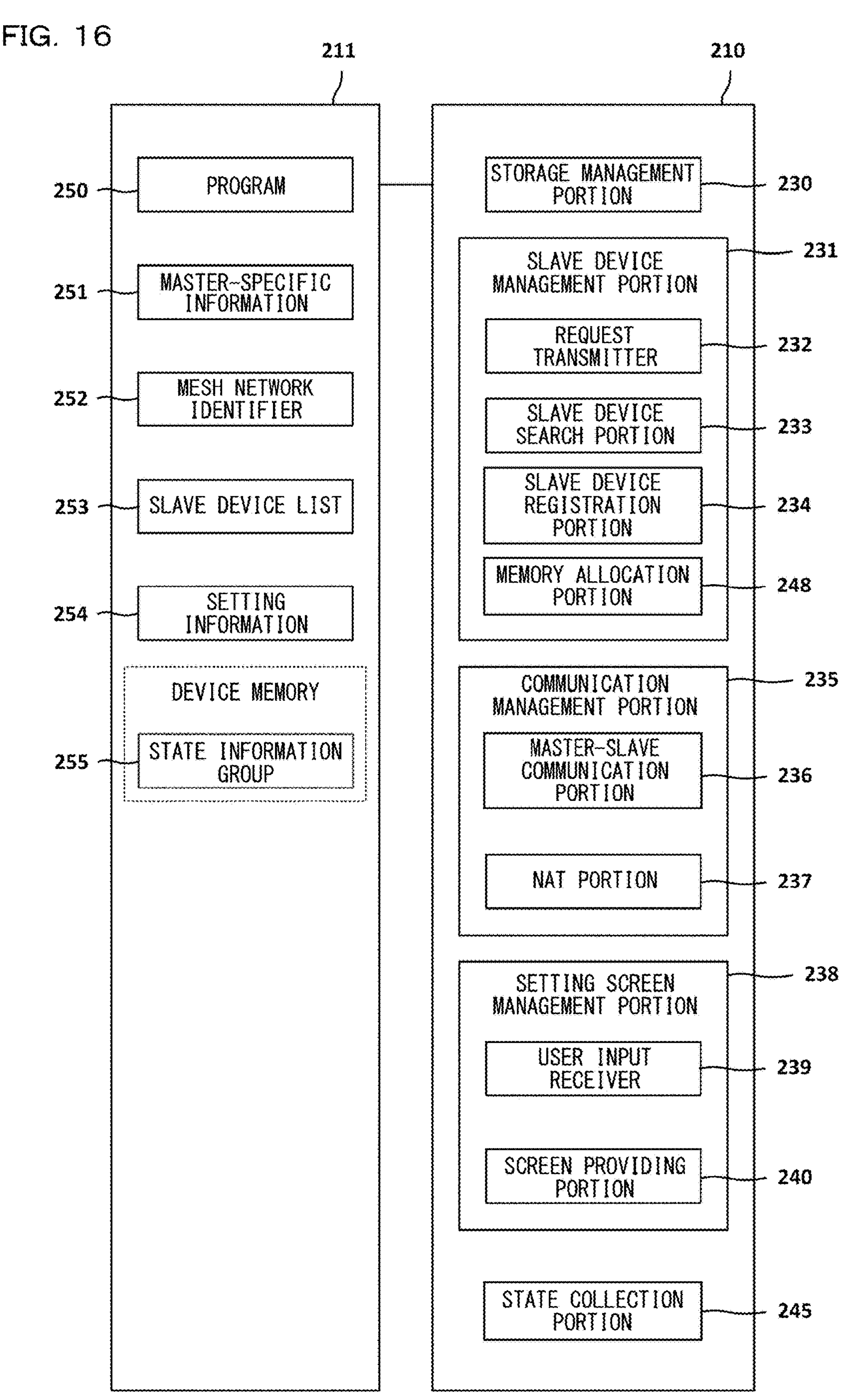
FIG. 16 is a diagram for explaining functions of the master device.

FIG. 16 illustrates functions of the CPU 210. The CPU 210 implements various functions according to a program 250 stored in the storage device 211. All or some of these various functions may be implemented by another logic circuit (ASIC, FPGA) different from the CPU 210. ASIC is an abbreviation for application specific integrated circuit. FPGA is an abbreviation for field programmable gate array.

A storage management portion 230 reads predetermined data from the storage device 211 and writes predetermined data in a storage device 221.

A slave device management portion 231 manages the slave devices 202*a* to 202*f* connected to the industrial wireless network 204. In particular, a request transmitter 232 may request the specific slave device 202 to turn on an indicator lamp or change the lighting state of the indicator lamp. A slave device search portion 233 searches for a slave device 202*a* directly connected to the master device 201 via a network cable. Such a slave device 202*a* may be referred to as a direct node or a root node. A slave device registration portion 234 registers, in a slave device list 253 through the storage management portion 230, slave device-specific information (example: product serial number, MAC address) of a slave device newly added to the industrial wireless network 204.

A memory allocation portion 248 secures a storage area or a storage variable based on a memory map, and stores predetermined information therein. The memory map is setting information that holds a relationship between a storage area or a storage variable (example: device memory (sometimes simply referred to as a device)) secured in the storage device 211 and information (example: device value) stored therein, and is set in advance through the PC 2. For example, information indicating an operation state (examples: normal, warning, abnormal) of the slave device 202*a* is stored in a device memory named DM11200. The device memory named DM11201 stores the reception strength of the radio wave by the slave device 202*a*. Information indicating an operation state (examples: normal, warning, abnormal) of the slave device 202*b* is stored in a device memory named DM11300. The device memory named DM11301 stores the reception strength of the radio wave by the slave device 202*b*. Information indicating an operation state (examples: normal, warning, abnormal) of the slave device 202*c* is stored in a device memory named DM11400. The device memory named DM11401 stores the reception strength of the radio wave by the slave device 202*c*. The same applies to the slave devices 202*d* to 202*f*. In this example, a state information group 255 indicates individual state information of the slave devices 202*a* to 202*f* stored in the device memory allocated based on the memory map.

A communication management portion 235 is an instance of a program module for the master device 201 to communicate with the slave device 202. The communication management portion 235 processes a communication packet between the master device 201 and the slave device 202 according to a predetermined communication protocol. The above-described slave device management portion 231 communicates with the slave device 202 through a master-slave device communication portion 236 of the communication management portion 235. An NAT portion 237 is an address conversion module that converts the address of the communication packet. For example, the NAT portion 237 converts network addresses and port numbers of packets transmitted and received between the LAN port 38*d* that is a WAN port and the LAN ports 38*c* to 38*h* that are LAN ports. Note that the communication management portion 235 may generate an IPv6 address based on its own MAC address.

A setting screen management portion 238 provides various setting screens to the PC 2 connected to the LAN ports 38*c* to 38*h* or the PC 2 connected to the slave device 202. The setting screen may be implemented by a Web user interface. Examples of the setting screen include a setting screen for setting the industrial wireless network 204 and a setting screen for setting the indicator lamp of the slave device 202. A user input receiver 239 receives a user input from the PC 2 connected to the LAN ports 38*e* to 38*h* or the PC 2 connected to the slave device 202. A screen providing portion 240 provides a setting screen (example: Web page) to the PC 2 connected to the LAN ports 38*c* to 38*h* or the PC 2 connected to the slave device 202. The screen providing portion 240 may be, for example, a Web server.

The storage device 211 stores not only the program 250 but also various types of information. Master device-specific information 251 is network identification information (example: MAC address) or a serial number assigned to the master device 201. A mesh network identifier 252 is a network identifier of the industrial wireless network 204 constructed as a wireless mesh network. The slave device list 253 is a list of pieces of slave device-specific information of the slave devices 202 permitted to join the industrial wireless network 204 by the master device 201. Setting information 254 includes a radio frequency band, a radio channel, an IP address, and the like used in the industrial wireless network 204. The mesh network identifier 252 may be included in the setting information 254.

A state collection portion 245 collects individual state information indicating the operation states of the slave devices 202*a* to 202*f* registered in the slave device list 253, creates the state information group 255, and stores the state information group 255 in the storage device 211. As described above, the state collection portion 245 may store the individual state information collected from the slave device 202 in the device memory allocated by the memory map. Here, the state collection portion 245 may collect the individual state information from the plurality of slave devices 202 in parallel and store the individual state information in the device memory. As a result, the plurality of pieces of individual state information collected from the plurality of slave devices 202 may be substantially time-synchronized.

The device memory is accessed substantially directly from the PLC 1. Therefore, the collection portion 72 can collect the state information group 255 stored in the device memory of the master device 201.

The state information group 255 held in the master device 201 may be collected by the collection portion 72 of the base unit 3 and recorded as a part of the operation record 74 by the logger 73. The collection portion 72 collects the device values in the PLC 1 and collects the state information group 255 from the master device 201 in parallel. Therefore, the collection time of the device value in the PLC 1 and the collection time of the state information group 255 are substantially time-synchronized.

The analyzer 83 may analyze the individual state information of the slave devices 202*a* to 202*f* included in the state information group 255 and store the state information in the analysis result 77. The Web server 82 may provide and display the individual state information of the slave devices 202*a* to 202*f* to the PC 2 together with a graph or the like created from the time-series data of the device values. The Web server 82 may provide the display data (examples: HTML files, CSS files, image data, scripts, etc., for displaying graphs) of the device value collected in the PLC 1 in real time by the collection portion 72 and the state information group 255 collected from the master device 201 in real time by the collection portion 72 to the PC 2 or the programmable indicator. The Web server 82 may provide the display data (examples: HTML files, CSS files, image data, scripts, etc., for displaying graphs) of the analysis result (analysis report) of the device value collected in the PLC 1 by the collection portion 72 and the state information group 255 collected from the master device 201 by the collection portion 72 to the PC 2 or the programmable indicator.

(2) Structure of Slave Device

Figure 17:
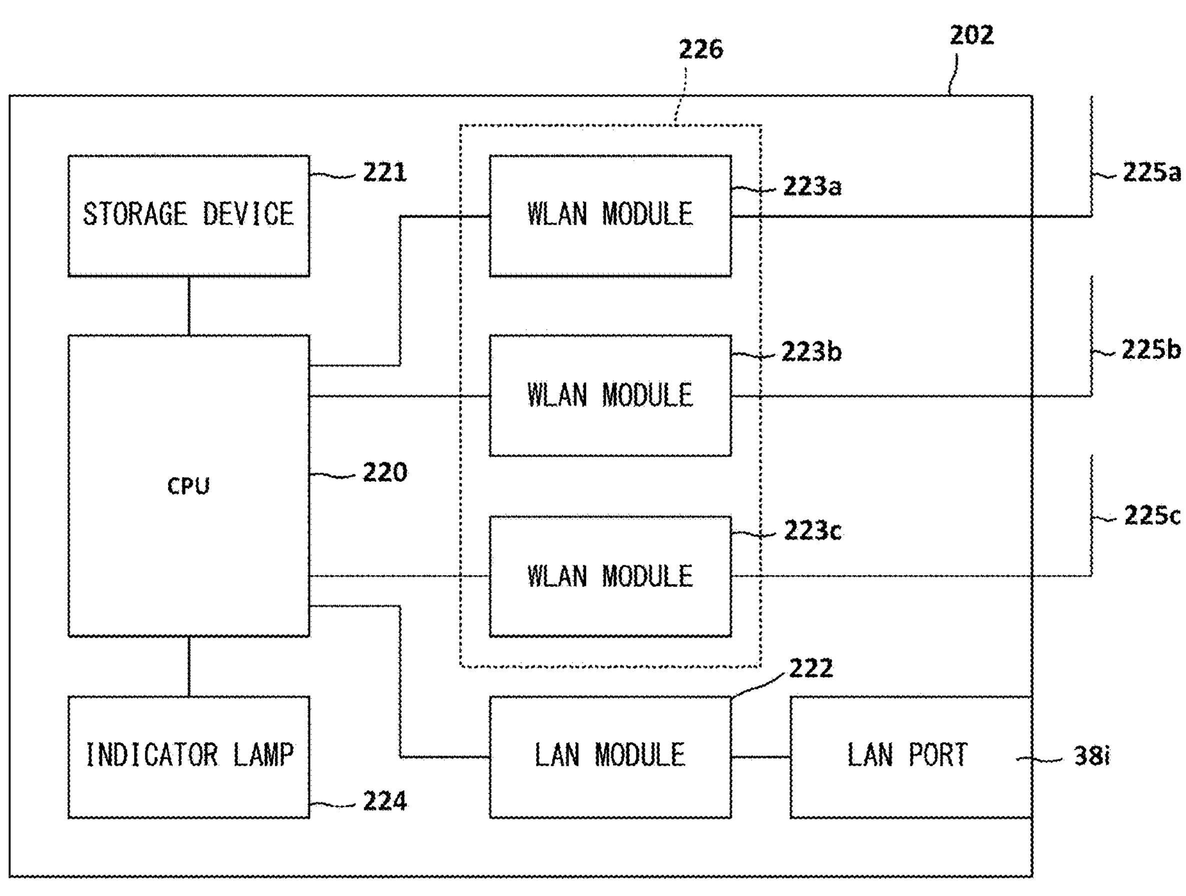
FIG. 17 is a diagram for explaining hardware of a slave device.

FIG. 17 illustrates an electrical structure of the slave device 202. A CPU 220 controls WLAN modules 223*a* to 223*c* and a LAN module 222 according to the program stored in the storage device 221. The CPU 220 includes at least one processor core (processing circuit). The WLAN modules 223*a* to 223*c* are wireless communication circuits (wireless network communication circuits) that perform wireless communication with other wireless network devices. The WLAN modules 223*a* to 223*c* may be independent wireless communication circuits, or may be wireless communication circuits virtually implemented by an SDR 226. In the case of a virtually implemented wireless communication circuit, antennas 225*a*, 225*b*, and 225*c* may be shared. SDR is an abbreviation for software radio. The SDR 226 realizes various wireless communication circuits by rewriting content of software. The WLAN modules 223*a* to 223*c* communicate with the other slave devices 202 and the PC 2 through the antennas 225*a*, 225*b*, and 225*c*, respectively. In this example, the WLAN modules 223*a* to 223*c* and the antennas 225*a*, 225*b*, and 225*c* are connected one-to-one, but this is merely an example. For example, by interposing a multiplexer, the WLAN modules 223*a* to 223*c* and the antenna 225*a* may share an antenna prepared for each radio band (example: 2.4 GHz, 5 GHz). An amplifier, a filter, a frequency conversion circuit, and the like are arranged between the SDR 226 and 225*a*, 225*b*, and 225*c*, but illustration thereof is omitted here. The LAN module 222 is a wired communication circuit (network communication circuit) that executes wired communication with another network device (example: master device 201, industrial device) connected to a LAN port 38*i*. An indicator lamp 224 includes one or more light emitting elements (example: light emitting diode, organic EL) indicating the state of the slave device 202 and a lighting control circuit. The storage device 221 includes a ROM and a RAM.

The WLAN module 223*a* is, for example, a wireless local area network module for backhaul communication between the slave devices 202. The network identifier (example: SSID) of the WLAN module 223*a* is a mesh network identifier 281 of the industrial wireless network 204. The WLAN module 223*a* operates as an access point (AP) and also operates as a station (STA).

A WLAN module 223*b* is, for example, a module for performing communication for adding another slave device 202 to the industrial wireless network 204 by performing wireless communication with the slave device 202. Alternatively, the WLAN module 223*b* is, for example, a module for performing wireless communication with another slave device 202 to add itself to the industrial wireless network 204 to which the slave device 202 is joined. In this case, the initial (dedicated to the addition processing) mesh network identifier 282 is set in the WLAN module 223*b*. When the slave device 202 already joins the industrial wireless network 204, the WLAN module 223*b* of the slave device 202 functions as a second access point. When the slave device 202 is about to join the industrial wireless network 204, the WLAN module 223*b* of the slave device 202 functions as a second station. In FIG. 17, the WLAN module 223*b* and the other WLAN modules 223*a* and 223*c* appear to be physically separate modules, but this is merely an example. The invention is not limited thereto, and these modules may be physically configured in a single module (example: integrated circuit) and may be logically separate modules. That is, the modules may be physically integrated into one module by using the virtual AP technology or the like.

The WLAN module 223*c* is, for example, a module used to connect an external terminal (examples: notebook-type PC 2, tablet terminal, and smartphone) to the industrial wireless network 204. The WLAN module 223*c* may function as, for example, a third access point. Note that which WLAN module is connected to which network can be freely combined.

FIG. 18 illustrates functions of the CPU 220. The CPU 220 implements various functions according to a program 280 stored in the storage device 221. A storage management portion 260 reads predetermined data from the storage device 221 and writes predetermined data in a storage device 221. When it is desired to update the program 280, the update file may be wirelessly transferred from the master device 201 to the slave device 202. Specifically, the user may issue an instruction to update the program of the slave device 202 via a Web screen provided from the master device 201, for example, a screen of the PC 2. The master device 201 can hold the program 280 (system program) of the slave device 202, and may transfer the program 280 held in the master device 201 to the slave device 202 to update the program when receiving a user instruction (instruction signal) from the PC 2.

A slave device management portion 261 manages various functions of the slave device 202. An indicator lamp operation portion 262 controls the display color and lighting mode (blinking, continuous lighting, etc.) of the indicator lamp 224. An addition slave device connection portion 263 is a module that establishes a communication link with another slave device 202 desired to be added to the industrial wireless network 204. The addition slave device connection portion 263 allocates the initial (dedicated to the addition processing) mesh network identifier 282 to the WLAN module 223*b*, and connects the other slave device 202 to the network dedicated to slave device addition. Note that the mesh network identifier 282 is a mesh network identifier dedicated to the addition processing known to all the slave devices 202. The addition slave device connection portion 263 may operate only when the master device 201 permits or instructs addition of the slave device 202. A request receiver 264 receives a request from the master device 201 through a master-slave device communication portion 266 and the WLAN module 223*a* of a communication management portion 265. Examples of the request include a request for transitioning from the normal mode to the slave device addition mode, an acquisition request for acquiring unique information 283 from the slave device 202 to be added, and a request for highlighting the indicator lamp 224 of the slave device 202 to be added.

A memory allocation portion 278 secures a storage area or a storage variable based on a memory map, and stores predetermined information therein. The memory map is setting information that holds a relationship between a storage area or a storage variable (example: device) secured in the storage device 221 and information (example: device value) stored therein, and is set in advance by the PC 2 through the master device 201. For example, in the storage device 221 of the slave device 202*a*, information indicating an operation state (examples: normal, warning, abnormal) of the slave device 202*a* is stored in a device named DM11200. In the storage device 221 of the slave device 202*a*, the reception strength of the radio wave by the slave device 202*a* is stored in a device named DM11201. In the storage device 221 of the slave device 202*b*, information indicating an operation state (examples: normal, warning, abnormal) of the slave device 202*b* is stored in a device named DM11300. The device named DM11301 stores the reception strength of the radio wave by the slave device 202*b*. In the storage device 221 of the slave device 202*c*, information indicating an operation state (examples: normal, warning, abnormal) of the slave device 202*c* is stored in a device named DM11400.

The device named DM11401 stores the reception strength of the radio wave by the slave device 202*c*. The same applies to the slave devices 202*d* to 202*f*. In this example, an individual state information 256 indicates individual state information of the slave device 202 stored in a device allocated based on the memory map. For example, the individual state information 256 held in the storage device 221 of the slave device 202*a* includes state information of the slave device 202*a*. The individual state information 256 held in the storage device 221 of the slave device 202*b* includes state information of the slave device 202*b*.

The communication management portion 265 manages and controls communication through the WLAN modules 223*a* to 223*c* and the LAN module 222. The master-slave device communication portion 266 is an instance of a program module for the slave device 202 to communicate with the master device 201 in accordance with a predetermined communication protocol. An existing slave device/added slave device communication portion 267 is an instance of a program module that controls the WLAN module 223*b* according to a predetermined communication protocol and executes communication between the existing slave device and the added slave device. The communication management portion 265 generates an IPv6 address based on its own MAC address and sets the IPv6 address in a network management portion 268.

A measurement portion 270 measures the operation state of the slave device 202. For example, the measurement portion 270 may measure reception strength of a radio wave transmitted from another slave device 202, measure a communication speed, measure signal-to-interference noise (SINR), or measure a temperature of the slave device 202. The measurement portion 270 creates the individual state information 256 indicating the measurement result and stores the individual state information 256 in the storage device 221. For example, the measurement portion 270 stores the measurement result in the device secured in the storage device 221 based on the memory map. Therefore, the individual state information 256 may be understood as an aggregate of measurement results held in a plurality of devices. When the individual state information 256 is requested from the master device 201, the slave device management portion 261 transmits the individual state information 256 to the master device 201 via the master-slave device communication portion 266.

The network management portion 268 manages the industrial wireless network 204. A network construction portion 269 constructs an industrial wireless network 204 as a wireless mesh network. For example, the network construction portion 269 sets the mesh network identifier 281 and the setting information 254 set by the master device 201 in the WLAN module 223*a* to construct the industrial wireless network 204. Setting information 254 includes a radio frequency band, a radio channel, an IP address, and the like used in the industrial wireless network 204.

The storage device 221 stores the unique information 283. The unique information 283 is a network identifier (example: MAC address) allocated to the WLAN modules 223*a* to 223*c* and the LAN module 222. Hereinafter, the unique information 283 is described as a network identifier allocated to the WLAN module 223*a*. When a slave device 202 is newly added, the unique information 283 of the slave device 202 is transmitted to the master device 201 via the industrial wireless network 204. The master device 201 determines whether to permit addition of the slave device 202 based on the unique information 283 of the slave device 202.

<Addition of Master Device and Slave Device to Industrial Wireless Network>

1 Initial Setting of Master Device

The connection between the master device 201 and the slave device 202 to the industrial wireless network 204 is performed by, for example, the following procedure.

Connection between the PLC 1 and the master device 201

Initial setting of the master device 201

Addition of the slave device 202

Note that there are various methods of adding the slave device 202. For example, it is conceivable to first register the slave device 202*a*, which is a wired slave device connected via a LAN cable, in the master device 201, and then register the other slave devices 202*b* to 202*h* in the master device 201. Alternatively, not only the slave device 202*a* that is a wired slave device but also the slave devices 202*b* to 202*h* that are wireless slave devices may be simultaneously registered in the master device 201 in parallel. In any case, the initial setting is first performed on the master device 201.

Figure 19:
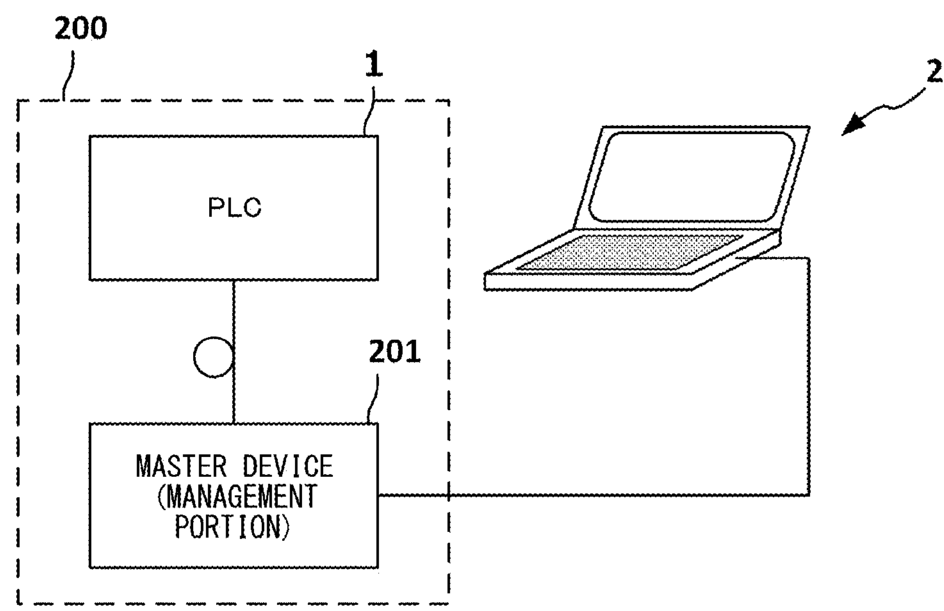
FIG. 19 is a diagram for explaining a setting method of the master device.

FIG. 19 is a diagram illustrating initial setting of the master device 201 connected to the PLC 1 from the PC 2 as a setting device. The PLC 1 and the master device 201 are connected by a LAN cable. The PC 2 and the master device 201 are also connected by a LAN cable. These LAN cables are connected to any of the LAN ports 38*e* to 38*h*.

Figure 20:
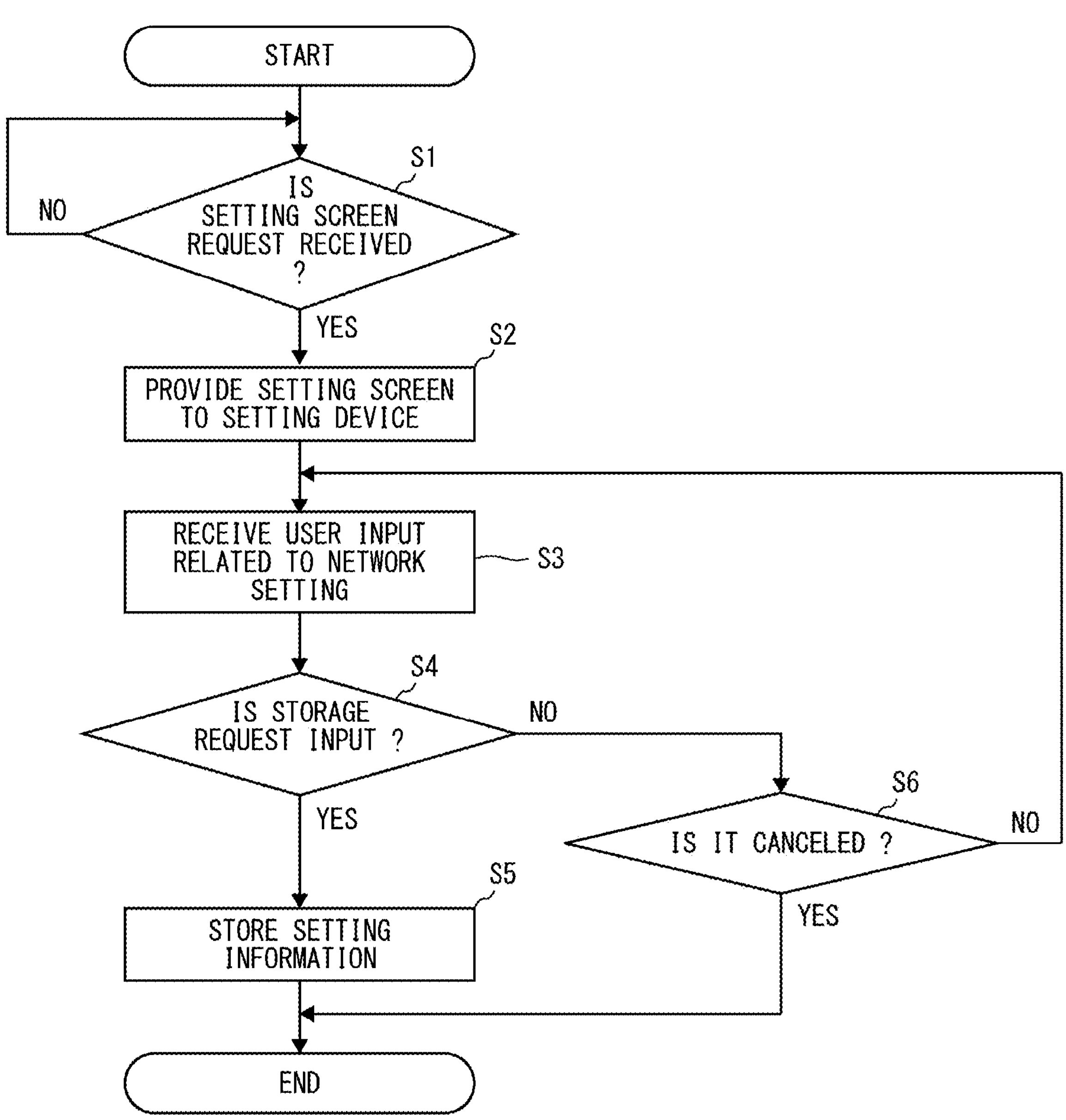
FIG. 20 is a flowchart for explaining a setting method of the master device.

FIG. 20 illustrates a setting information saving process executed by the master device 201. The CPU 210 of the master device 201 executes the following procedure in accordance with the program 250.

In S1, the CPU 210 (screen providing portion 240) determines whether a setting screen request has been received from the PC 2 as a setting device. For example, an access request from the PC 2 to a setting page of the Web server that is a part of the screen providing portion 240 is an example of the setting screen request. When the setting screen request is received, the CPU 210 proceeds from S1 to S2.

In S2, the CPU 210 provides the setting screen to the PC 2 which is the setting device. For example, the CPU 210 transmits a part (examples: HTML file, image file, CSS file, etc.) of a Web page for displaying the setting screen to the PC 2.

Figure 21:
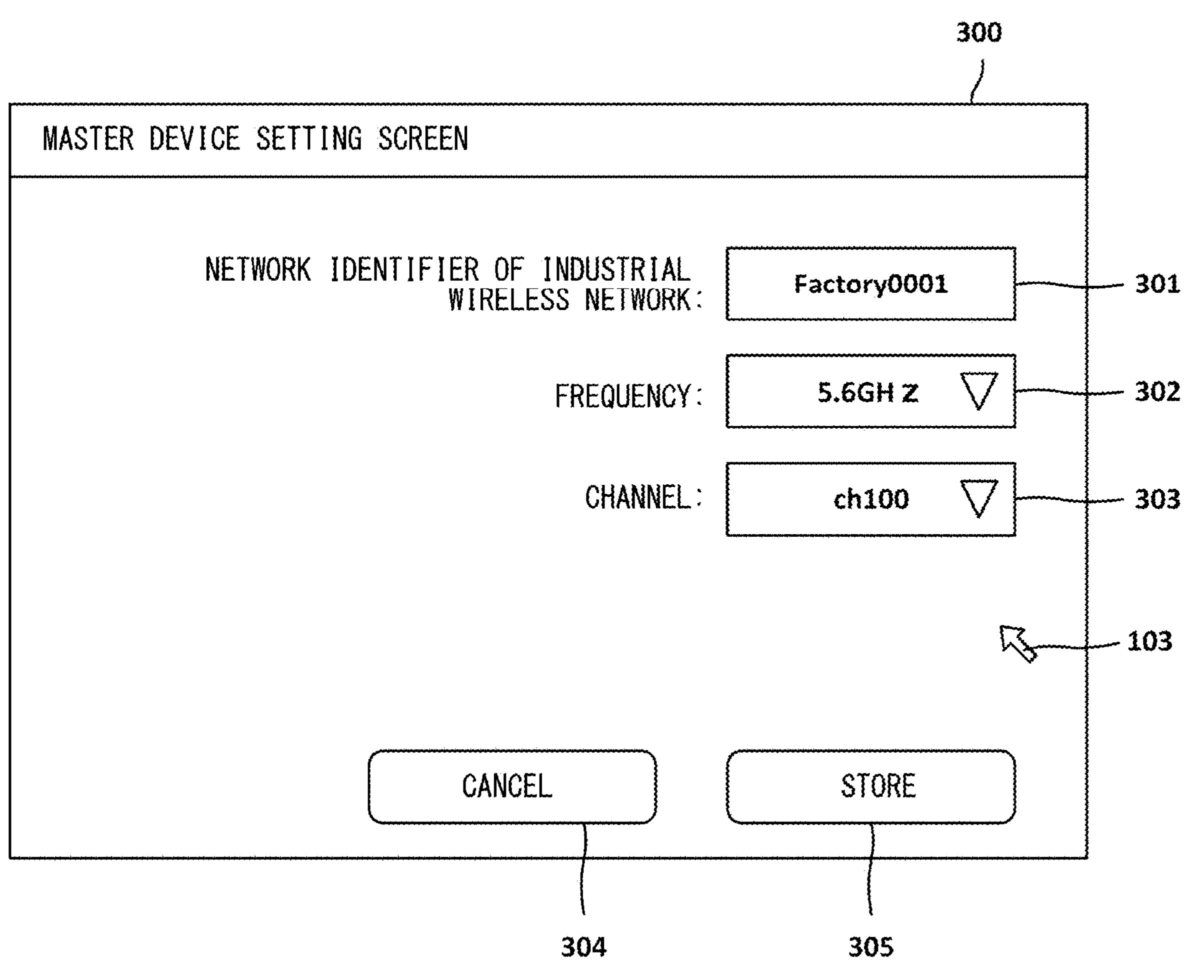
FIG. 21 is a diagram for explaining a setting screen.

FIG. 21 is an example of a setting screen 300 displayed on the display portion 7 of the PC 2. In this example, the network identifier (example: SSID), the frequency, and the channel of the industrial wireless network 204 stored in the setting information 254 are input. A text box 301 receives a network identifier input by the user. A frequency list 302 receives an input or selection of a frequency band by the user. A channel list 303 receives an input or selection of a channel by the user. A cancel button 304 is a button for instructing the CPU 210 to cancel the initial setting to the master device 201. A save button 305 is a button for instructing the CPU 210 to save the network identifier, the frequency, and the channel in the setting information 254. Note that other settings such as an encryption method of the wireless section may be received through the setting screen 300. Note that the network identifier may be stored in the mesh network identifier 252. Although the network identifier is input in FIG. 21, either a backhaul or an external AP may be selected and input.

In S3, the CPU 210 (user input receiver 239) receives a user input related to network setting (initial setting of master device 201). As described above, a network identifier, a frequency, a channel, and the like are received.

In S4, the CPU 210 (user input receiver 239) determines whether a storage request has been input. The storage request is, for example, that the save button 305 is pressed by the pointer 103. When the storage request is input, the CPU 210 proceeds to S5. In S5, the CPU 210 (storage management portion 230) stores the setting information 254 input by the user in the storage device 211. On the other hand, when the storage request is not input, the CPU 210 proceeds from S4 to S6. In S6, the CPU 210 determines whether the cancel button 304 has been pressed. When the cancel button 304 is not pressed, the CPU 210 proceeds from S6 to S3. On the other hand, when the cancel button 304 is pressed, the CPU 210 closes the setting screen 300 and ends the saving process.

Figure 22:
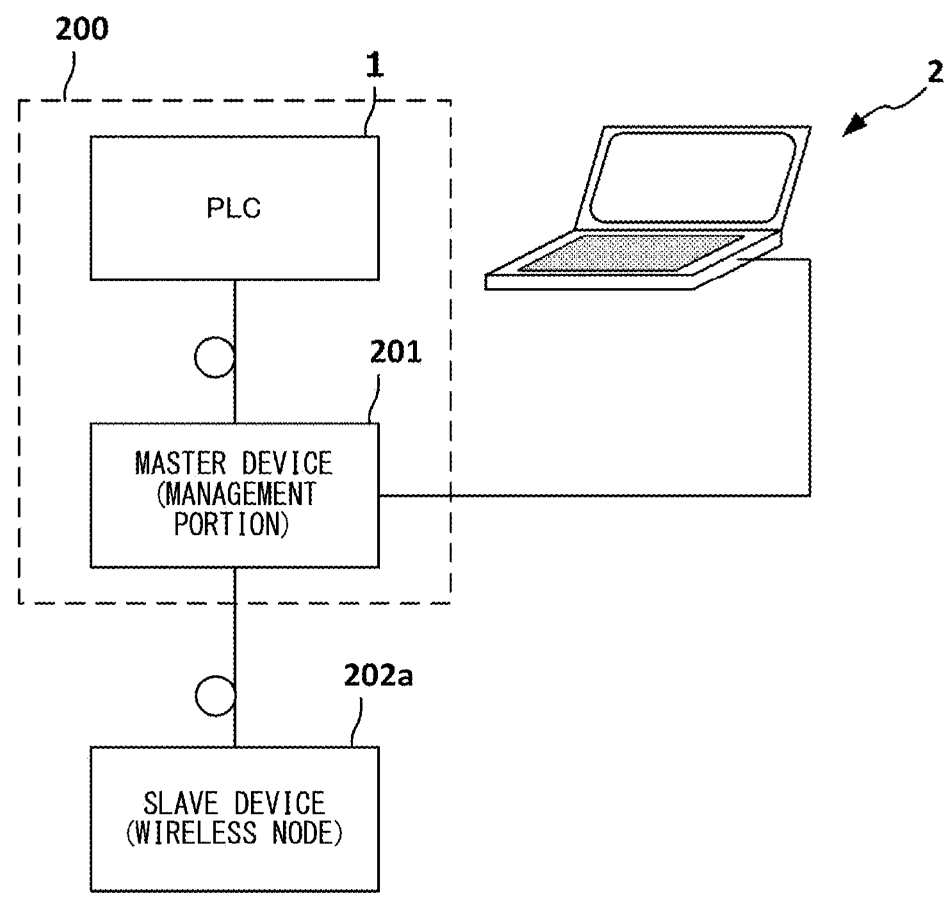
FIG. 22 is a diagram for explaining that a wired slave device is connected to the master device.

2. Addition of Slave Device 2-1. Addition of Wired Slave Device 2-1-1. Processing of Master Device FIG. 22 illustrates addition of the slave device 202*a*, which is a direct slave device (wired slave device), to the master device 201. In this example, the other slave devices 202*b* to 202*h* are added later.

Figure 23:
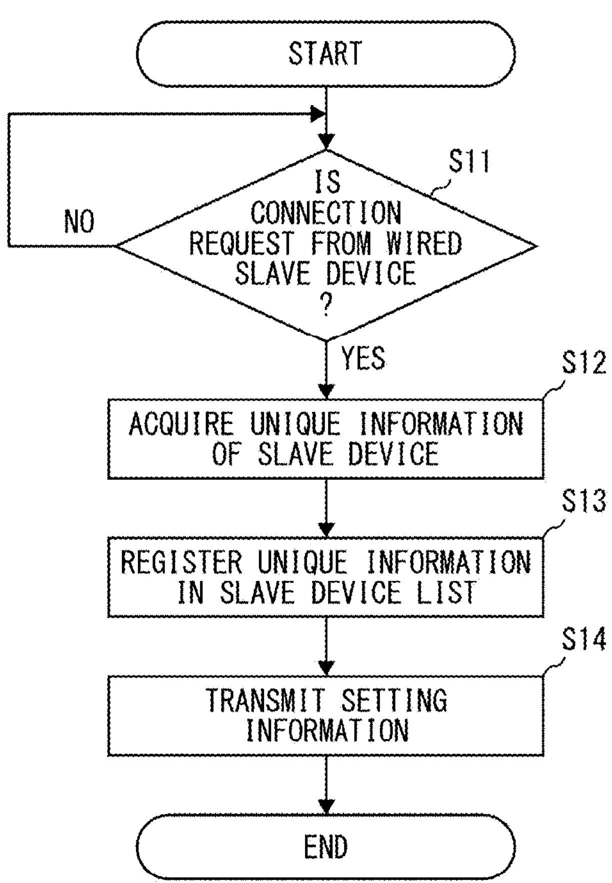
FIG. 23 is a flowchart for explaining a method of registering a wired slave device.

FIG. 23 illustrates the operation of the CPU 210 of the master device 201 when the wired slave device (slave device 202*a*) is connected. Note that the communication between the slave device 202*a* and the master device 201 is encrypted using an encryption key known to both the slave device 202*a* and the master device 201. Here, the simplest example in which the PC 2 as a setting device is not interposed will be described, but as will be described later, the master device 201 may be permitted to connect to the wired slave device (slave device 202*a*) by the PC 2.

In S11, the CPU 210 (example: slave device search portion 233) broadcasts a search request for a slave device to determine whether a connection request from a wired slave device that is a response to the search request has been received. For example, the CPU 210 determines whether the connection request has been received from the slave device 202*a* connected to any one of the LAN ports 38*c* to 38*h* via the LAN cable. When there is the connection request from the wired slave device, the CPU 210 proceeds from S11 to S12. Here, the connection request is from the wired slave device, but the connection request may be from the master device 201.

In S12, the CPU 210 (slave device search portion 233) acquires the unique information (unique information 283) from the wired slave device.

In S13, the CPU 210 (slave device registration portion 234) registers the unique information of the wired slave device in the slave device list 253.

In S14, the CPU 210 (slave device registration portion 234) reads the setting information 254 from the storage device 211, and transmits the setting information 254 to the wired slave device. As a result, the slave device 202*a*, which is a wired slave device, acquires the setting information 254 and constructs the industrial wireless network 204.

2-1-2. Processing of Wired Slave Device

Figure 24:
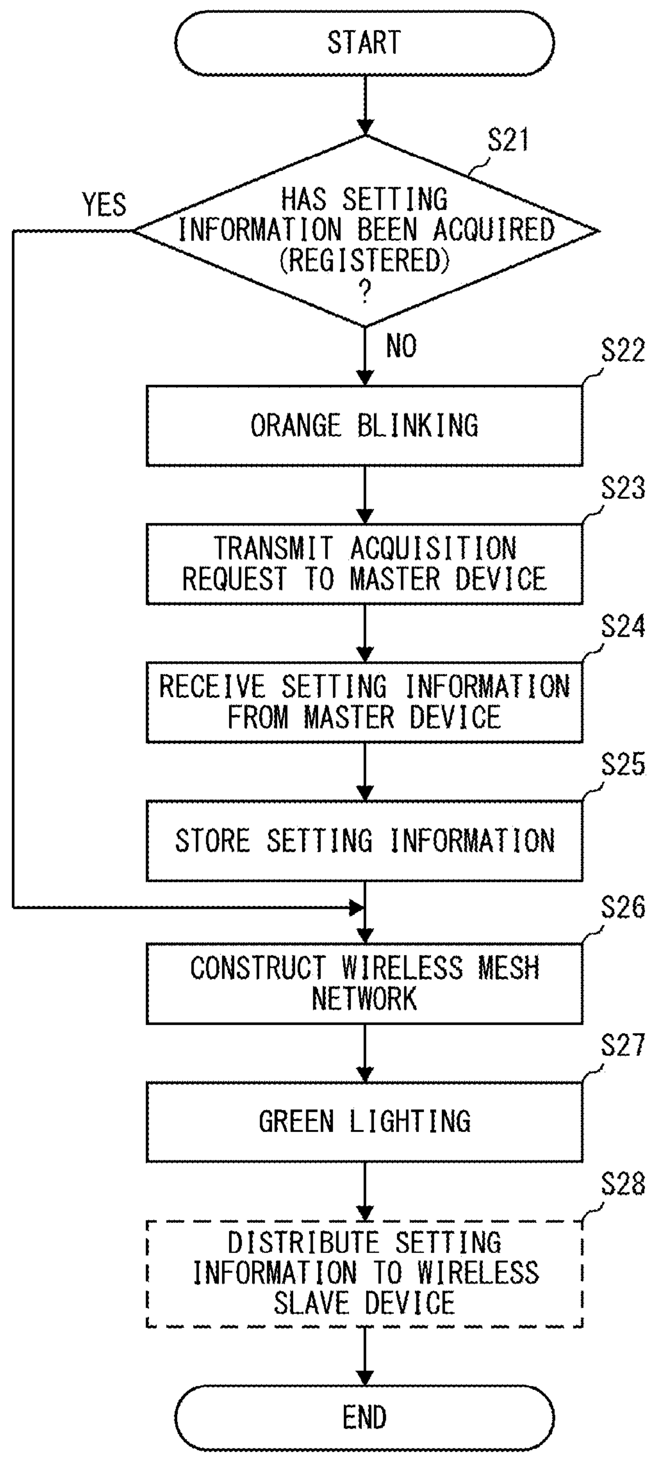
FIG. 24 is a flowchart for explaining the operation of the slave device.

FIG. 24 illustrates processing executed by the CPU 220 of the wired slave device. When the power is turned on, the CPU 220 executes the following processing.

In S21, the CPU 220 (network construction portion 269) determines whether the setting information 254 has not been acquired from the master device 201. This corresponds to a process of determining whether the wired slave device is still registered in the master device 201. When the wired slave device has not yet been registered in the master device 201 and the industrial wireless network 204 cannot be constructed, the CPU 220 proceeds from S21 to S22. On the other hand, when the master device 201 has been registered and the setting information 254 is stored in the storage device 221, the CPU 220 proceeds from S22 to S28.

In S22, the CPU 220 (indicator lamp operation portion 262) causes the indicator lamp 224 to blink in orange. Orange blinking means that the display color of the indicator lamp 224 is set to orange, and the display mode is set such that the indicator lamp 224 flashes at a constant cycle. In the present embodiment, the lamp is lit up in orange in S22. However, for example, the lamp may be lit up in orange when communication is established.

In S23, the CPU 220 (master-slave device communication portion 266) transmits an acquisition request for the setting information 254 to the master device 201. Note that, although the acquisition request for the setting information 254 is transmitted to the master device 201 here, the invention is not limited thereto, and for example, a request may be always issued from the master device 201 side to the slave device side.

In S24, the CPU 220 (master-slave device communication portion 266) receives the setting information 254 from the master device 201.

In S25, the CPU 220 (storage management portion 260) stores the setting information 254 in the storage device 221.

In S26, the CPU 220 (network construction portion 269) activates the WLAN module 223*a* according to the setting information 254, and constructs the industrial wireless network 204 which is a wireless mesh network.

In S27, the CPU 220 (indicator lamp operation portion 262) causes the indicator lamp 224 to light up in green. Green lighting means that the display color of the indicator lamp 224 is set to green and the display mode is set to continuous lighting.

In S28, the CPU 220 (addition slave device connection portion 263) distributes (propagates) the setting information 254 to the wireless slave devices (slave devices 202*b* to 202*h*) connected to the mesh network for adding slave devices constructed by the WLAN module 223*b*. Note that S28 is an option executed when another wireless slave device is present. The other wireless slave device acquires the setting information 254 from the wired slave device directly connected to the master device 201, stores the setting information 254 in its own storage device 221, and joins the industrial wireless network 204 according to the setting information 254.

2-2. Addition of Wireless Slave Device

Figure 25:
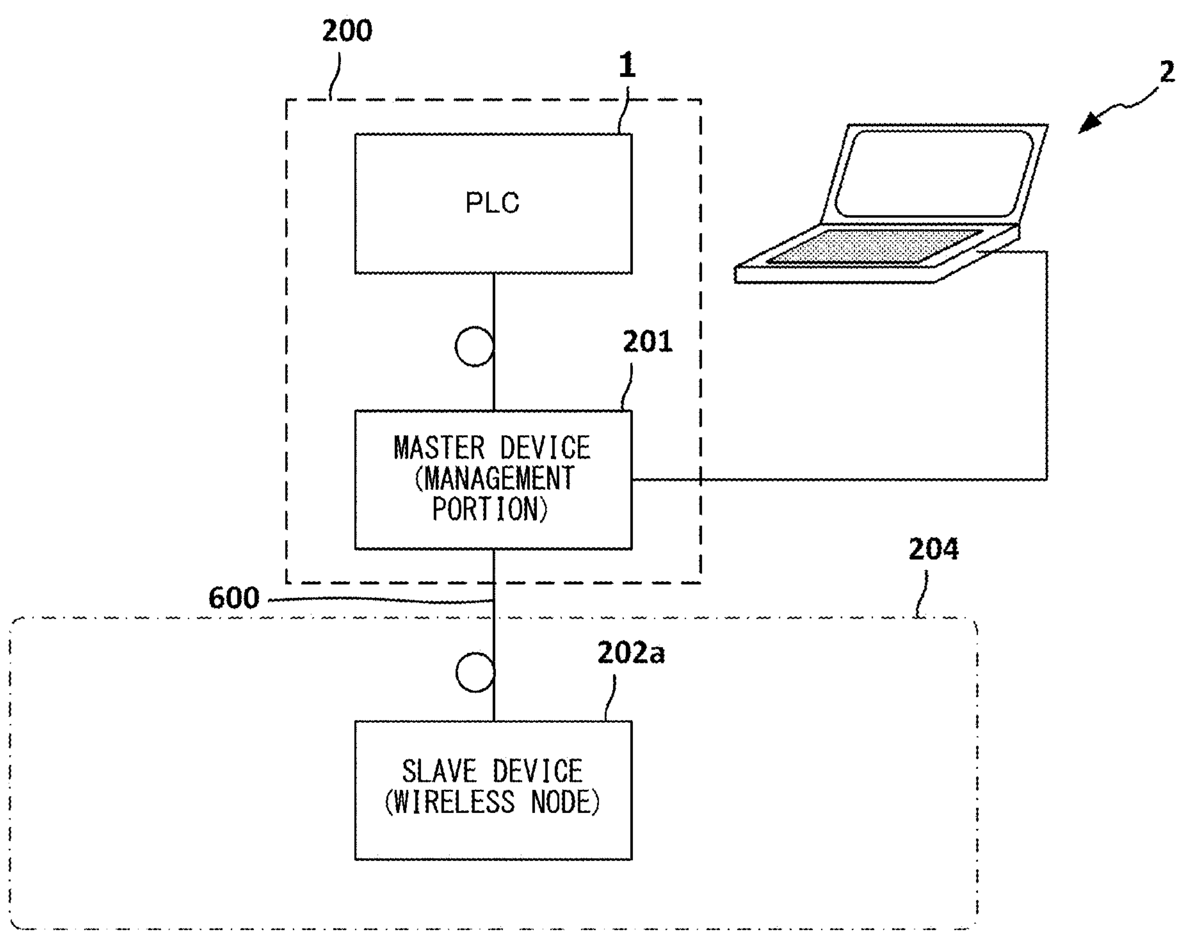
FIG. 25 is a diagram illustrating a state in which the wired slave device has established an industrial wireless network.

FIG. 25 illustrates that the master device 201 and the slave device 202*a*, which is a wired slave device, are connected via a network cable 600, and the slave device 202*a* acquires the setting information 254 from the master device 201 to construct the industrial wireless network 204. However, the wireless slave device joining the industrial wireless network 204 is only the slave device 202*a*. In FIG. 25, a case where the slave device 202*a* is once added and then the wireless slave device is added will be described, but the invention is not limited thereto, and the slave device 202*a* and at least one of the other slave devices 202*b* to 202*f* may be added at a time.

Figure 26:
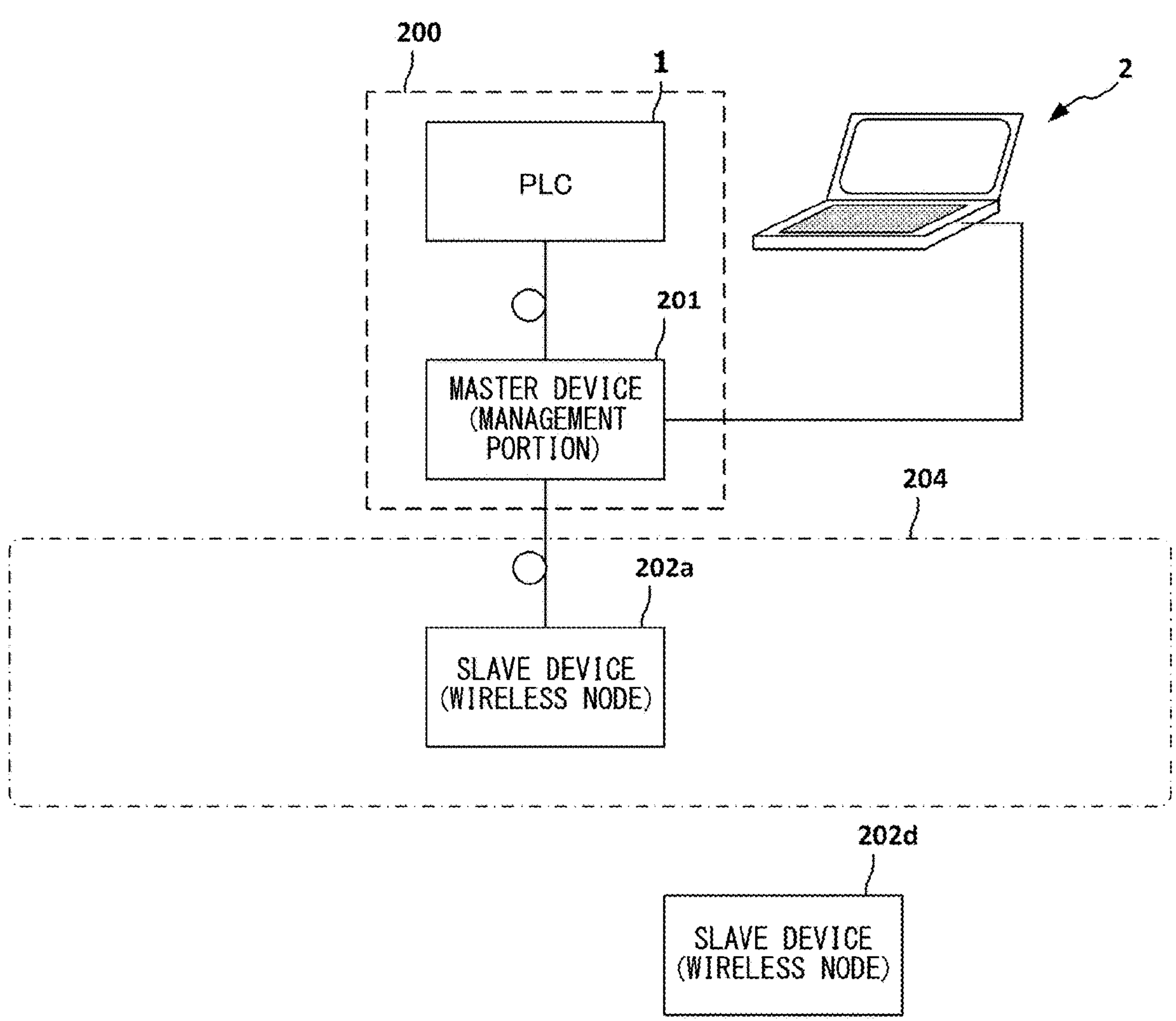
FIG. 26 is a diagram illustrating a state before the wireless slave device is connected.

FIG. 26 illustrates that the slave device 202*d* that has not been registered in the master device 201 is powered on and activated. Since the slave device 202*d* is not yet registered in the master device 201, the slave device 202*d* cannot join the industrial wireless network 204.

Figure 27:
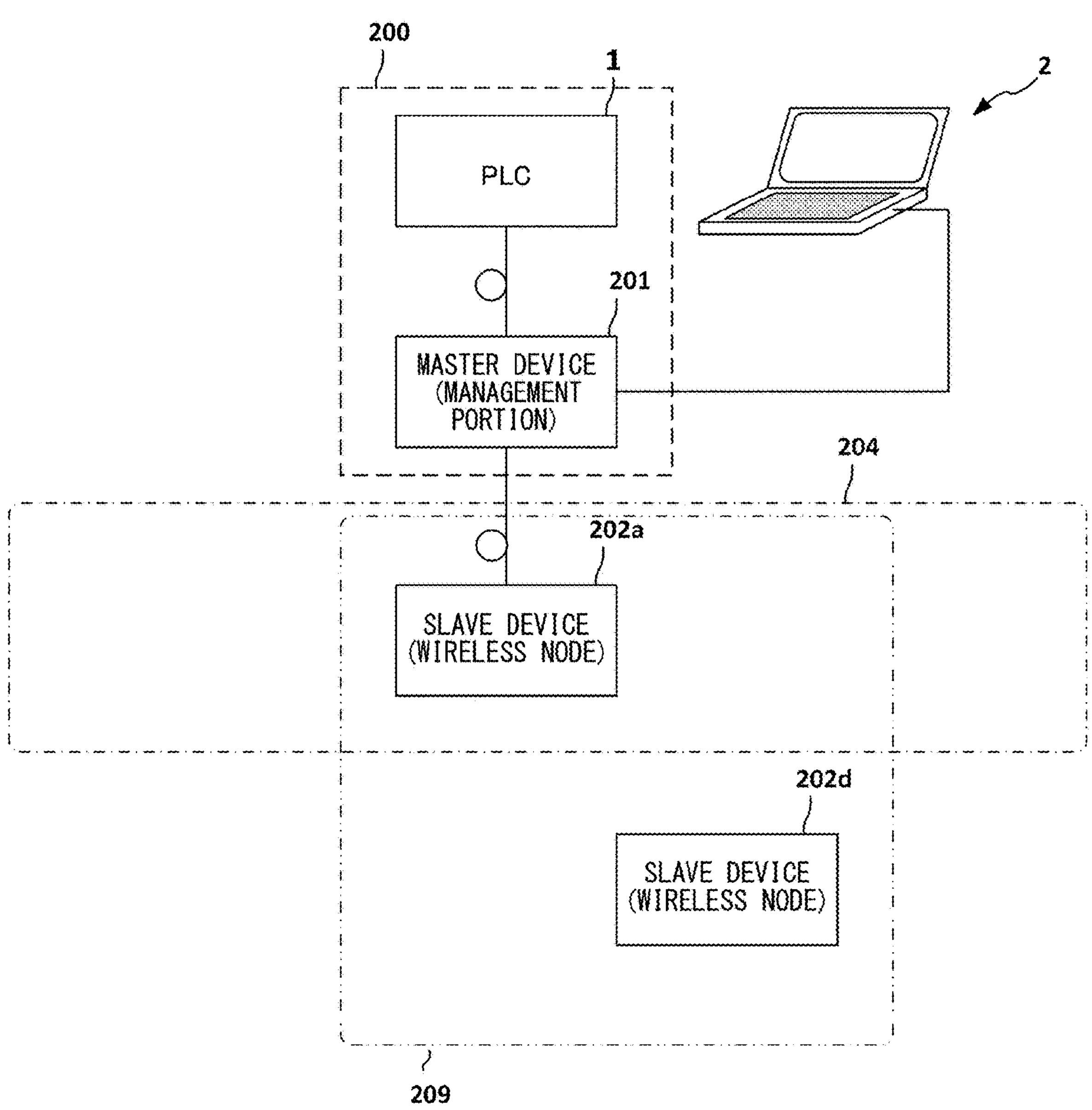
FIG. 27 is a diagram for explaining construction of a wireless network for adding slave devices.

FIG. 27 illustrates an additional wireless network 209 constructed to register the slave device 202*d* to the master device 201. Since the slave device 202*d* to be added does not have the setting information 254 of the industrial wireless network 204, the mesh network identifier 282 of the additional wireless network 209 is set in the WLAN module 223*b*. Further, the slave device 202*a*, which is a wired slave device, sets the mesh network identifier 282 of the additional wireless network 209 in the WLAN module 223*b* based on the instruction to transition to the slave device addition mode (slave device addition permitted state) transmitted from the PC 2 through the master device 201. As a result, the slave device 202*a* and the slave device 202*d* construct and join the additional wireless network 209. That is, the slave device 202*a* can propagate the setting information 254 to the slave device 202*d*. The slave device 202*d* stores the setting information 254 in the storage device 221.

Figure 28:
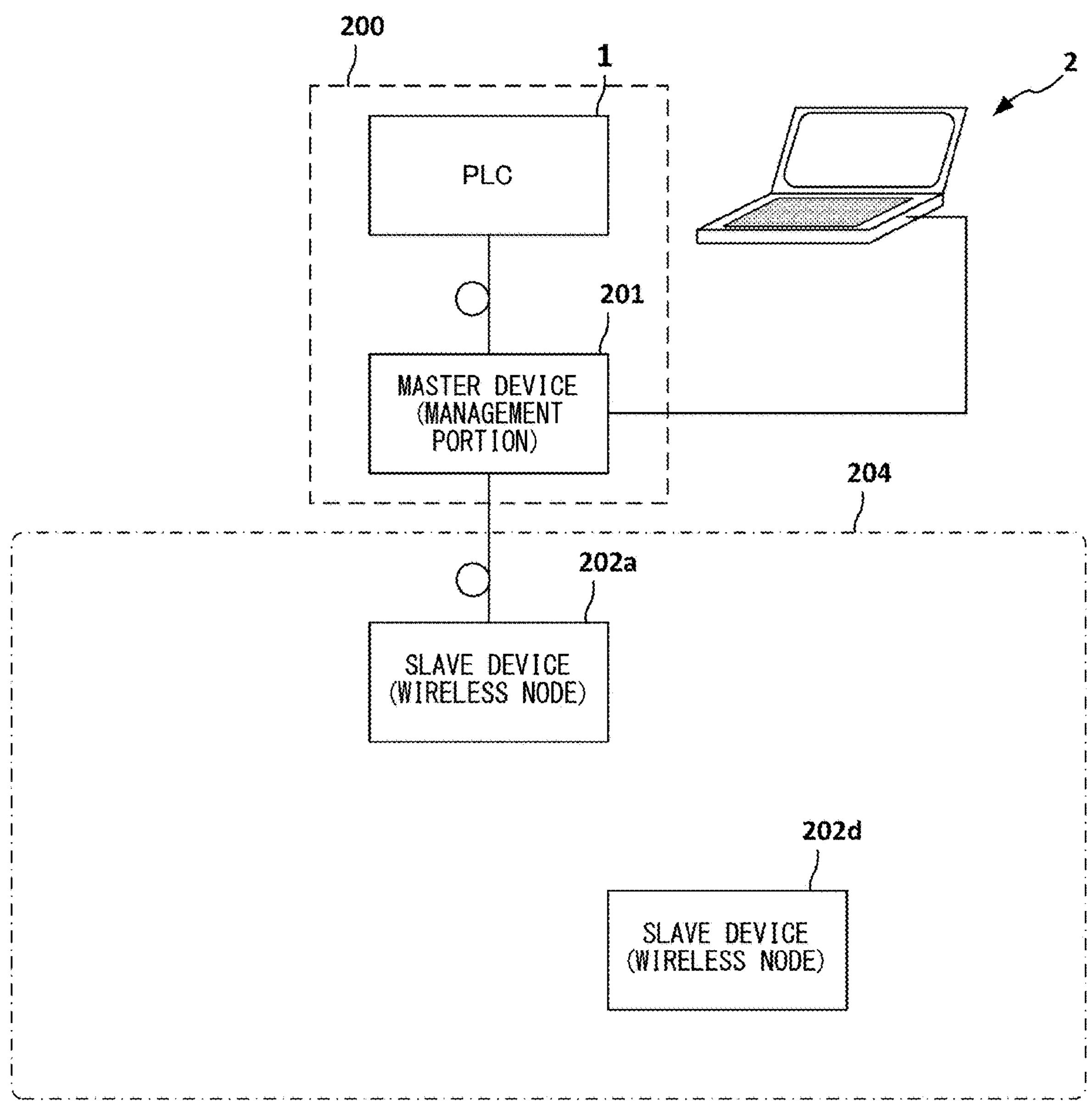
FIG. 28 is a diagram for explaining that a wireless slave device has been added.

FIG. 28 illustrates that the slave device 202*d* joins the industrial wireless network 204. The CPU 220 of the slave device 202*d* sets the setting information 254 stored in the storage device 221 in the WLAN module 223*a* and joins the industrial wireless network 204. Note that the setting information 254 is stored in a nonvolatile memory area.

Figure 31:
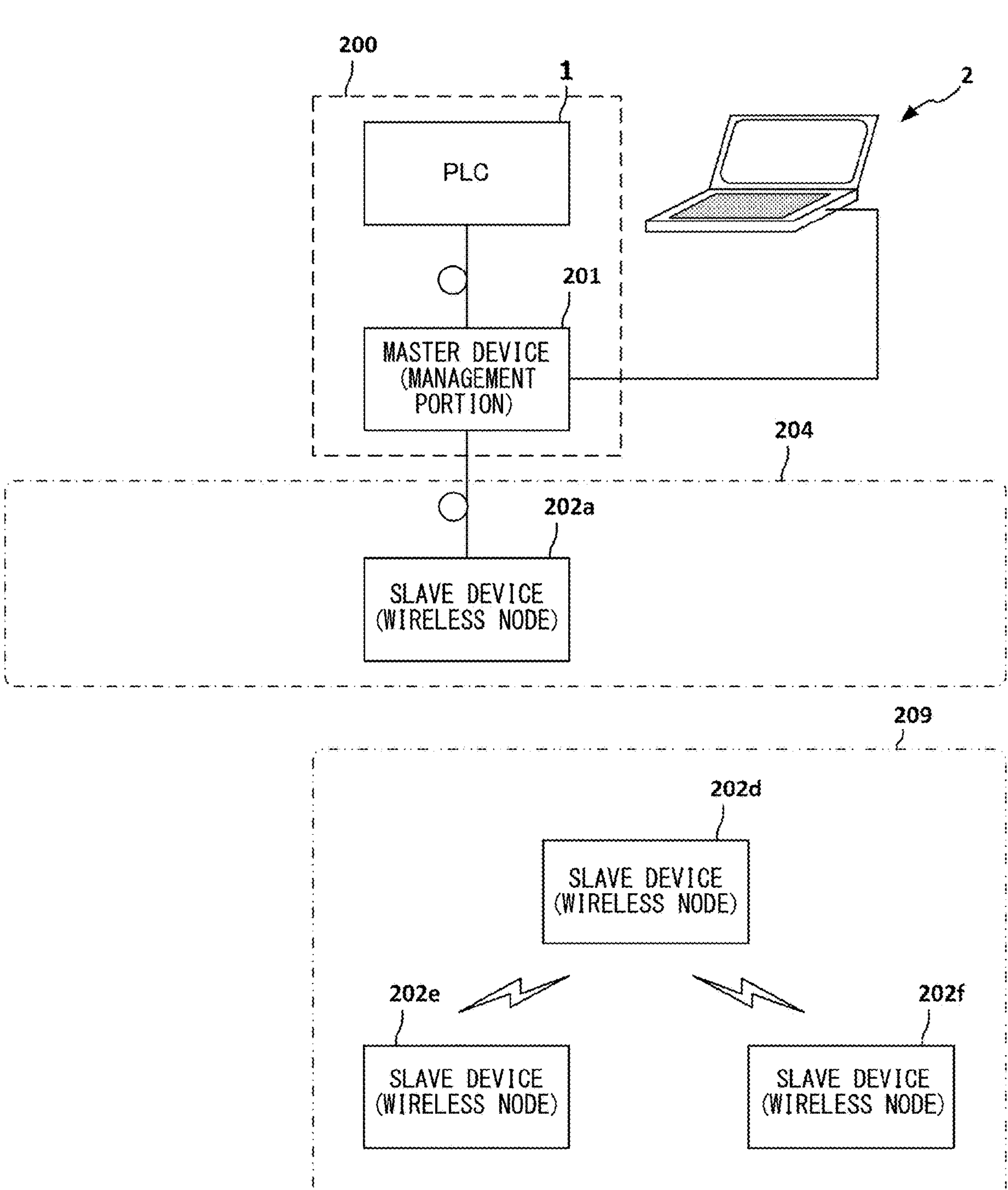
FIG. 31 is a diagram for explaining that a plurality of wireless slave devices have constructed a wireless network for adding slave devices.

FIG. 29 illustrates an example in which a plurality of other slave devices 202*d*, 202*e*, and 202*f* are added to the master device 201. In this state, the master device 201 and the slave device 202*a* have not yet transition to the slave device addition mode, and are in the normal mode. Therefore, as illustrated in FIG. 30, the unregistered slave device 202*d* sets the mesh network identifier 282 in the WLAN module 223*b* and constructs the additional wireless network 209. Similarly, the other slave devices 202*e* and 202*f* also do not have the setting information 254. Therefore, as illustrated in FIG. 31, the slave devices 202*e* and 202*f* also set the mesh network identifier 282 in the WLAN module 223*b* and join the additional wireless network 209.

Figure 32:
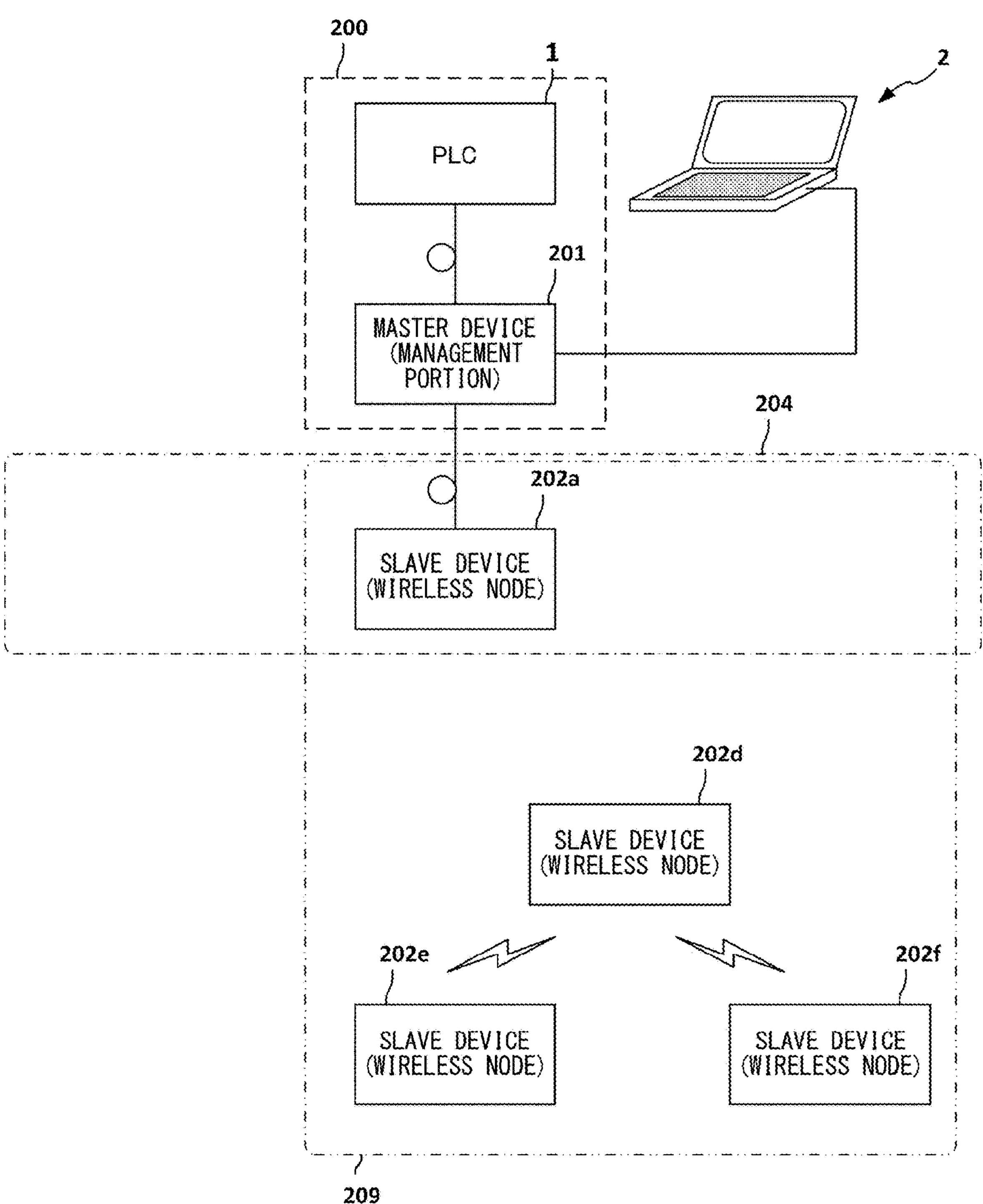
FIG. 32 is a diagram for explaining that the wired slave device has joined the wireless network for adding slave devices.

As illustrated in FIG. 32, when the master device 201 and the slave device 202*a* transitions to the slave device addition mode through a setting device 2, the slave device 202*a* sets the mesh network identifier 282 in the WLAN module 223*b* and joins the additional wireless network 209. As a result, the slave devices 202*a*, 202*d*, 202*e*, and 202*f* can perform wireless communication. The slave device 202*a* distributes the setting information 254 to the slave devices 202*d*, 202*e*, and 202*f*. The slave devices 202*d*, 202*e*, and 202*f* store the setting information 254 in the storage device 221.

Figure 33:
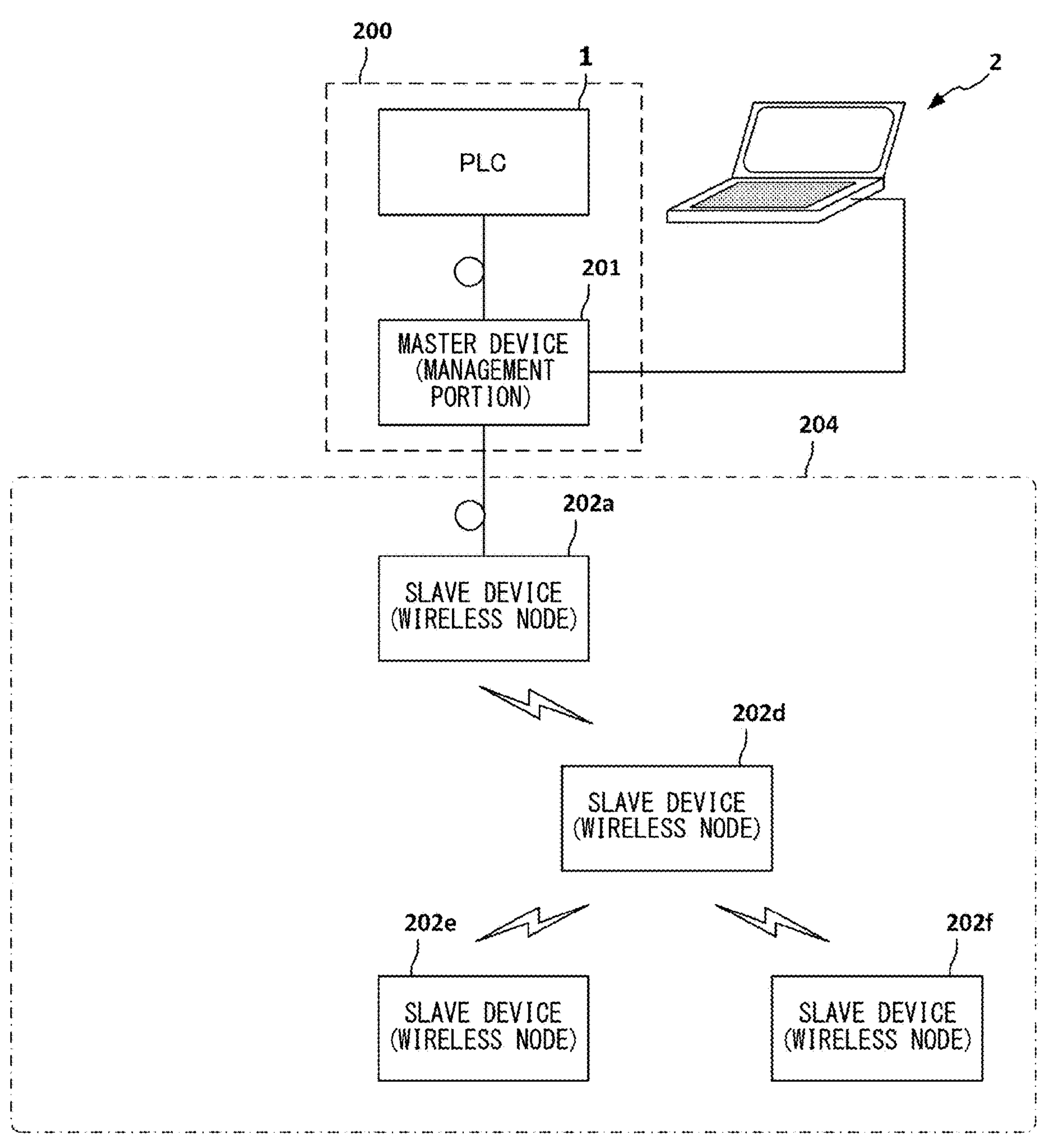
FIG. 33 is a diagram for explaining that a plurality of wireless slave devices has joined an industrial wireless network.

As illustrated in FIG. 33, the slave devices 202*d*, 202*e*, and 202*f* join the industrial wireless network 204 in accordance with the setting information 254. Each of the slave devices 202*a*, 202*d*, 202*e*, and 202*f* stops the WLAN module 223*b* and leaves the additional wireless network 209.

2-2-1. Processing of Master Device

Figure 34:
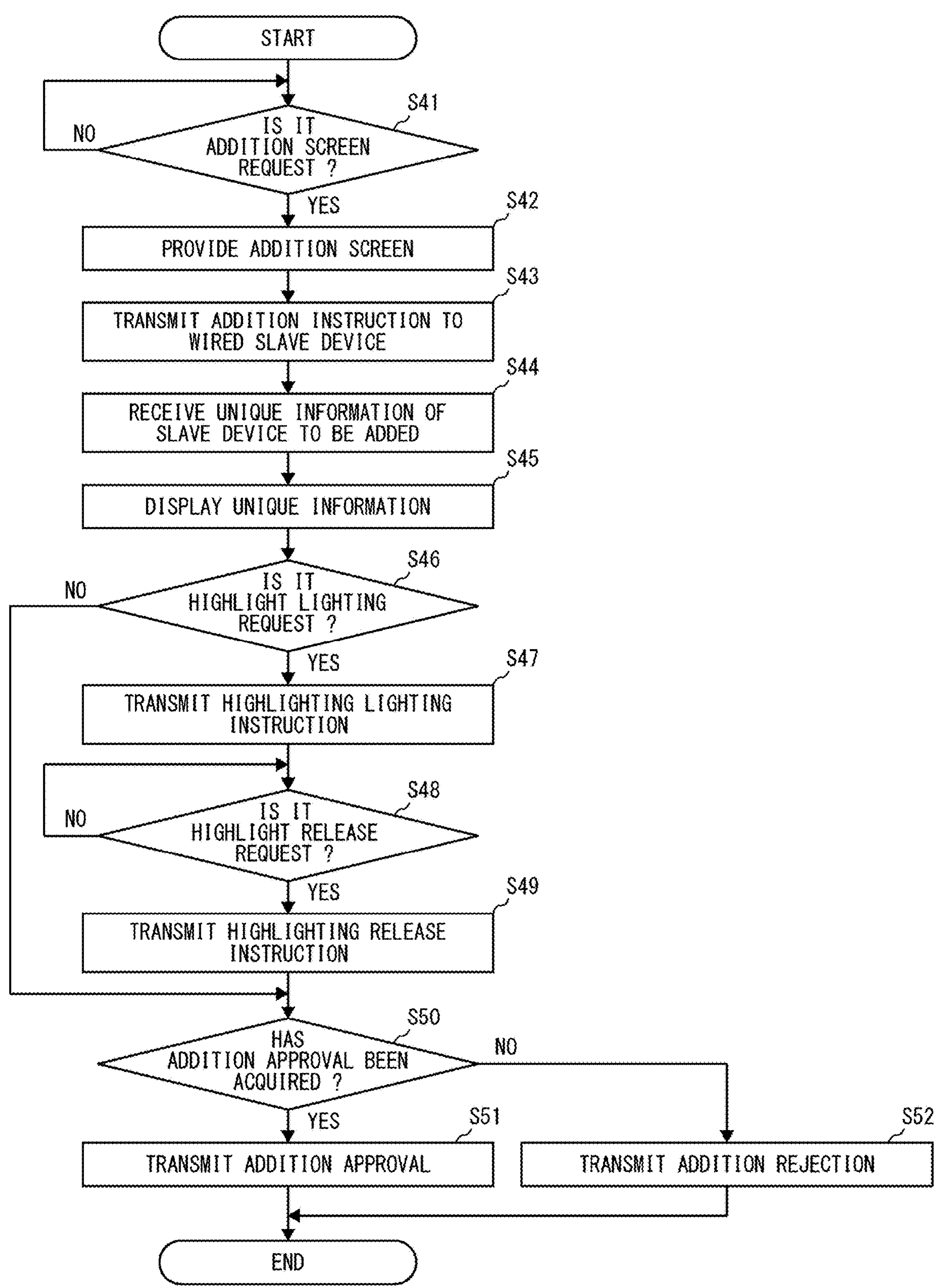
FIG. 34 is a flowchart for explaining the operation of the master device.

FIG. 34 illustrates addition processing of the slave device 202 executed by the CPU 210 of the master device 201. Here, it is assumed that the master device 201 has already stored the setting information 254 in the storage device 221.

In S41, the CPU 210 (setting screen management portion 238) determines whether an addition screen request has been received from the PC 2. Here, the addition screen is an addition screen (example: Web page) provided to the PC 2 to add the slave device 202. When the addition screen request is received, the CPU 220 proceeds from S41 to S42.

In S42, the CPU 210 (setting screen management portion 238) provides an addition screen (example: Web page) to the PC 2.

Figure 35:
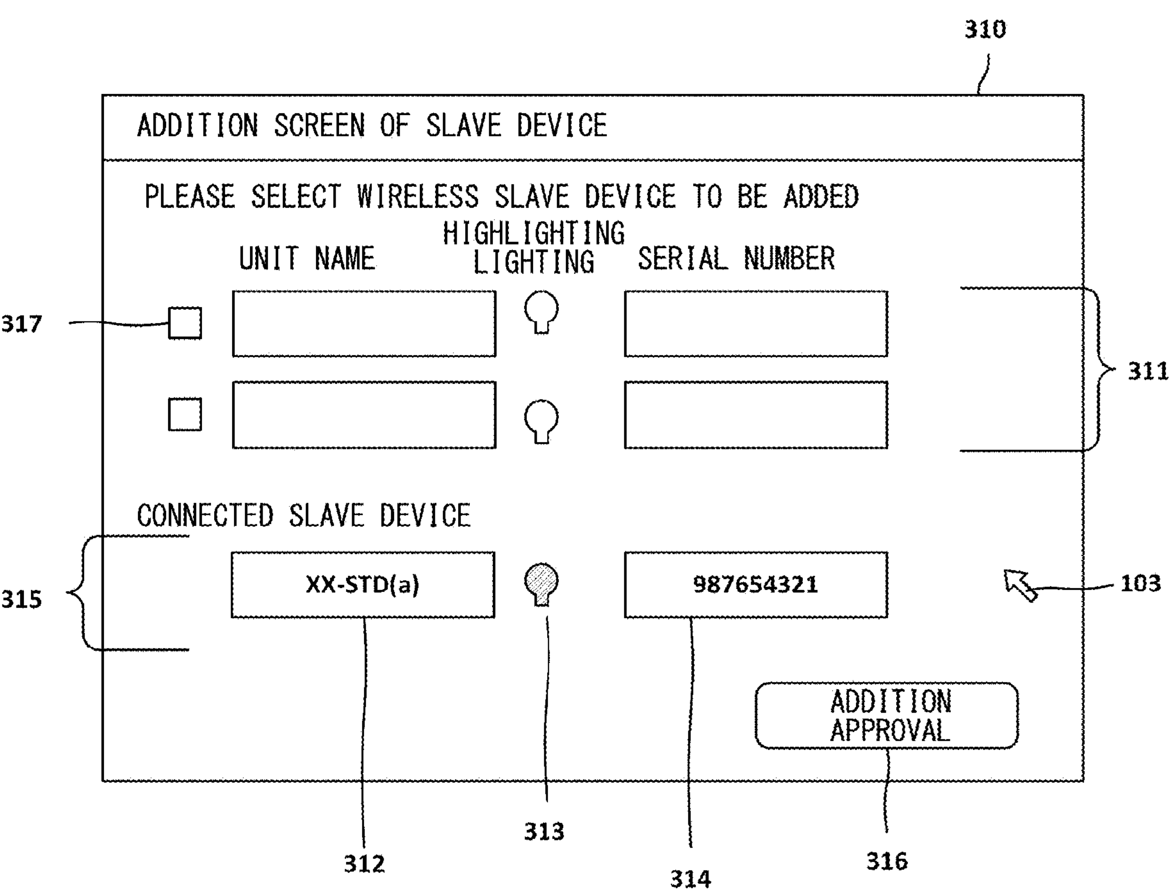
FIG. 35 is a diagram for explaining an addition screen.

FIG. 35 illustrates an example of the addition screen 310 displayed on the display portion 7 of the PC 2. The addition screen 310 includes a list 311 of wireless slave devices to be added and a list 315 of slave devices already connected to the industrial wireless network 204. Each of the lists 311 and 315 includes a unit name 312 and a serial number 314, which are unique information of the slave device. A check box 317 is a control object used by the user to select a slave device to which the user desires to add from among the plurality of addition target slave devices found by the search. A button 313 is a button for instructing to highlight the indicator lamp 224 of the slave device 202. When the button 313 is pressed by the pointer 103, a highlight lighting request is transmitted to the slave device 202 corresponding to the pressed button 313. The indicator lamp operation portion 262 of the slave device 202 highlights the indicator lamp 224 in accordance with the highlight lighting request. The highlight lighting may include, for example, increasing brightness more than usual. Note that the display of the list 315 of the connected slave devices may be omitted on the addition screen 310.

The target to be highlighted may include not only the slave device 202 to be added but also the already connected slave device 202. Large number of the slave devices 202 may be installed throughout the factory. The user can press the button 313 to identify a specific slave device 202 from the plurality of slave devices 202.

When an addition approval button 316 is pressed by the pointer 103, the slave device management portion 231 transmits an addition approval to the slave device 202 checked by the check box 317. When receiving the addition approval, the wired slave device transmits the setting information 254 to the slave device 202 to be subjected to the addition approval. When receiving the setting information 254, the slave device 202 for the addition approval stores the setting information 254 in the storage device 221.

In S43, the CPU 210 (request transmitter 232, master-slave device communication portion 236) transmits an addition instruction to the wired slave device.

In S44, the CPU 210 (master-slave device communication portion 236) receives the unique information about the slave device to be added. When receiving a notification indicating that the slave device to be added has been found from the master device 201, the CPU 210 may transmit an instruction to the master device 201 to acquire unique information of the slave device to be added.

In S45, the CPU 210 (screen providing portion 240) displays the unique information about the slave device to be added on the display portion 7 of the PC 2.

Figure 36:
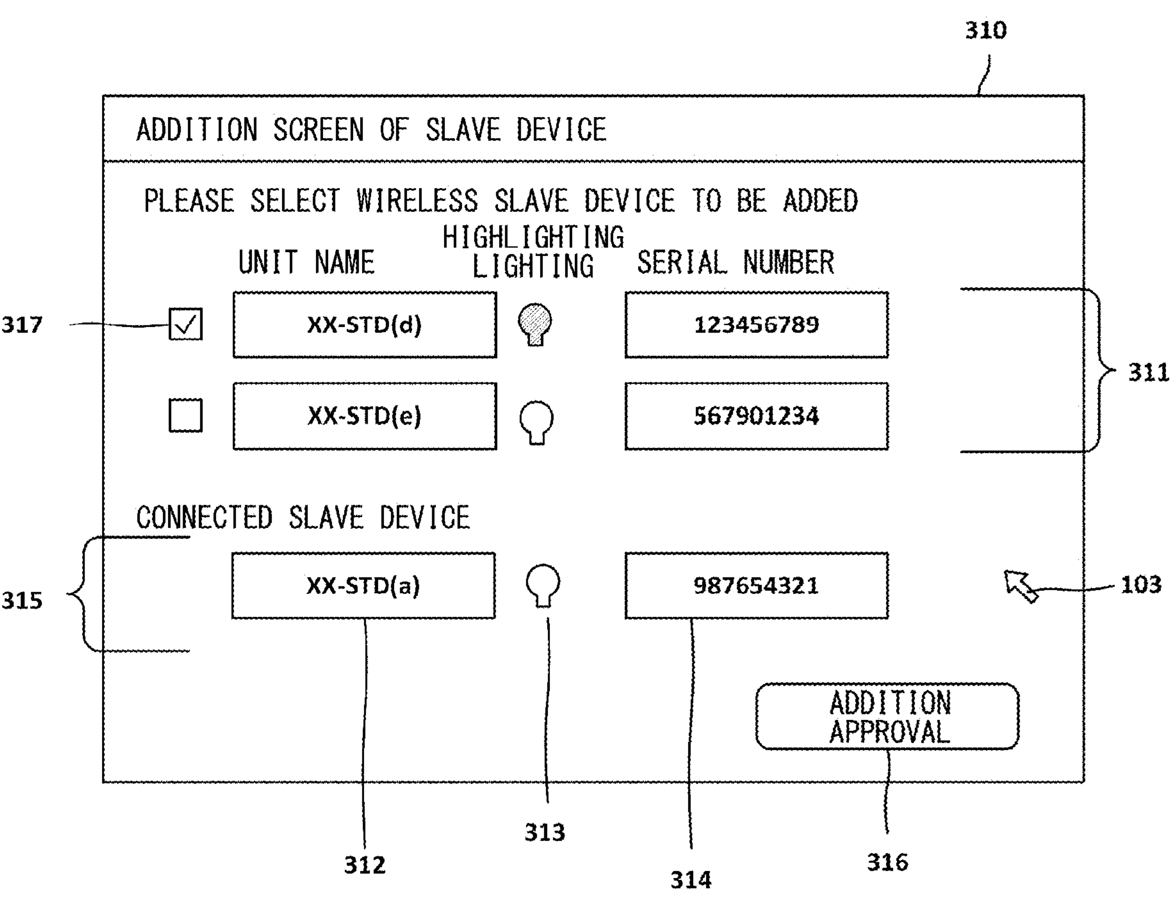
FIG. 36 is a diagram for explaining an addition screen.

FIG. 36 illustrates the addition screen 310 reflecting the unique information of the found slave device to be added. When acquiring the unique information about the slave device to be added, the master device 201 updates the addition screen 310.

In S46, the CPU 210 (user input receiver 239) determines whether a highlight lighting request has been input from the PC 2. When the highlight lighting request is not input, the CPU 210 proceeds from S46 to S50.

In S47, the CPU 210 (request transmitter 232, master-slave device communication portion 236) transmits the highlight lighting request to the slave device as a target of highlight lighting.

In S48, the CPU 210 (user input receiver 239) determines whether a highlight point release instruction is input from the PC 2. When the highlighting release instruction is input, the CPU 210 proceeds from S48 to S49. When the highlighting release instruction is not input even after a predetermined time has elapsed, the CPU 210 proceeds from S48 to S49.

In S50, the CPU 210 (slave device registration portion 234) determines whether the addition approval has been acquired from the master device 201. When the addition approval is acquired, the CPU 210 proceeds from S50 to S51. In S51, the CPU 210 (slave device registration portion 234) registers the unique information in the slave device list 253, and transmits the addition approval to the wired slave device. As a result, the wired slave device transmits the setting information 254 stored in advance in the storage device 221 to the slave device to be added for the addition approval. On the other hand, when the addition approval is not obtained from the PC 2, the CPU 210 proceeds from S50 to S52. In S52, the CPU 210 (slave device registration portion 234) transmits an addition rejection to the master device 201. As a result, the master device 201 does not transmit the setting information 254 to the slave device 202 to be added.

2-2-2. Processing of Wired Slave Device (or Existing Slave Device)

Figure 37:
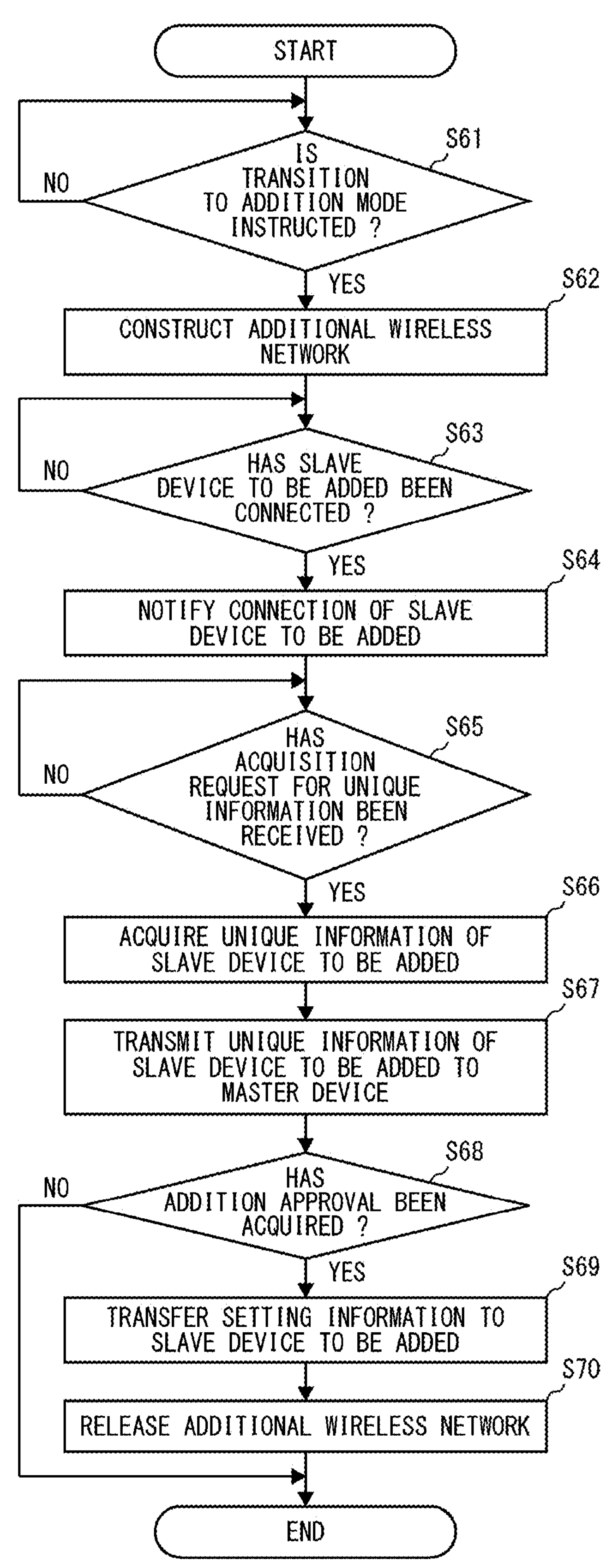
FIG. 37 is a diagram for explaining the operation of the existing slave device.

FIG. 37 illustrates slave device addition processing executed by the CPU 220 of the wired slave device or the slave device 202 already joining the industrial wireless network 204.

In S61, the CPU 220 (request receiver 264) determines whether an instruction to transition to the slave device addition mode has been received from the master device 201. When receiving the instruction to transition to the slave device addition mode, the CPU 220 transitions from the normal mode to the slave device addition mode, and proceeds from S61 to S62.

In S62, the CPU 220 (network construction portion 269) sets the mesh network identifier 282 in the WLAN module **223*b* and constructs the additional wireless network 209. Since the slave device to be added also holds the mesh network identifier 282, the slave device to be added can be connected to the additional wireless network 209**.

In S63, the CPU 220 (addition slave device connection portion 263) determines whether the slave device to be added has been connected to the additional wireless network 209. When the slave device to be added is connected to the additional wireless network 209, the CPU 210 proceeds from S63 to S64.

In S64, the CPU 220 (addition slave device connection portion 263) notifies (reports) the master device 201 of the connection of the slave device to be added.

In S65, the CPU 220 (addition slave device connection portion 263) determines whether an acquisition request for the unique information about the slave device to be added has been received from the master device 201. When the acquisition request for the unique information is received, the CPU 220 proceeds from S65 to S66.

In S66, the CPU 220 (addition slave device connection portion 263) acquires the unique information from the slave device to be added. For example, the addition slave device connection portion 263 transmits the acquisition request to the slave device to be added.

In S67, the CPU 220 transmits the unique information (example: unit name, serial number) about the slave device to be added to the master device 201.

In S68, the CPU 220 (addition slave device connection portion 263) determines whether the addition approval for the slave device to be added has been received from the master device. When the addition approval has not been received (example: when the addition rejection has been received), the CPU 220 returns from the slave device addition mode to the normal mode, and ends the slave device addition processing. On the other hand, when the addition approval is received, the CPU 220 proceeds from S68 to S69.

In S69, the CPU 220 (addition slave device connection portion 263) reads the setting information 254 stored in the storage device 221, and transfers the setting information 254 to the slave device to be added.

In S70, the CPU 220 (network construction portion 269) releases the additional wireless network 209. In addition, the CPU 220 returns from the slave device addition mode to the normal mode.

2-2-3. Processing of Slave Device to be Added

Figure 38:
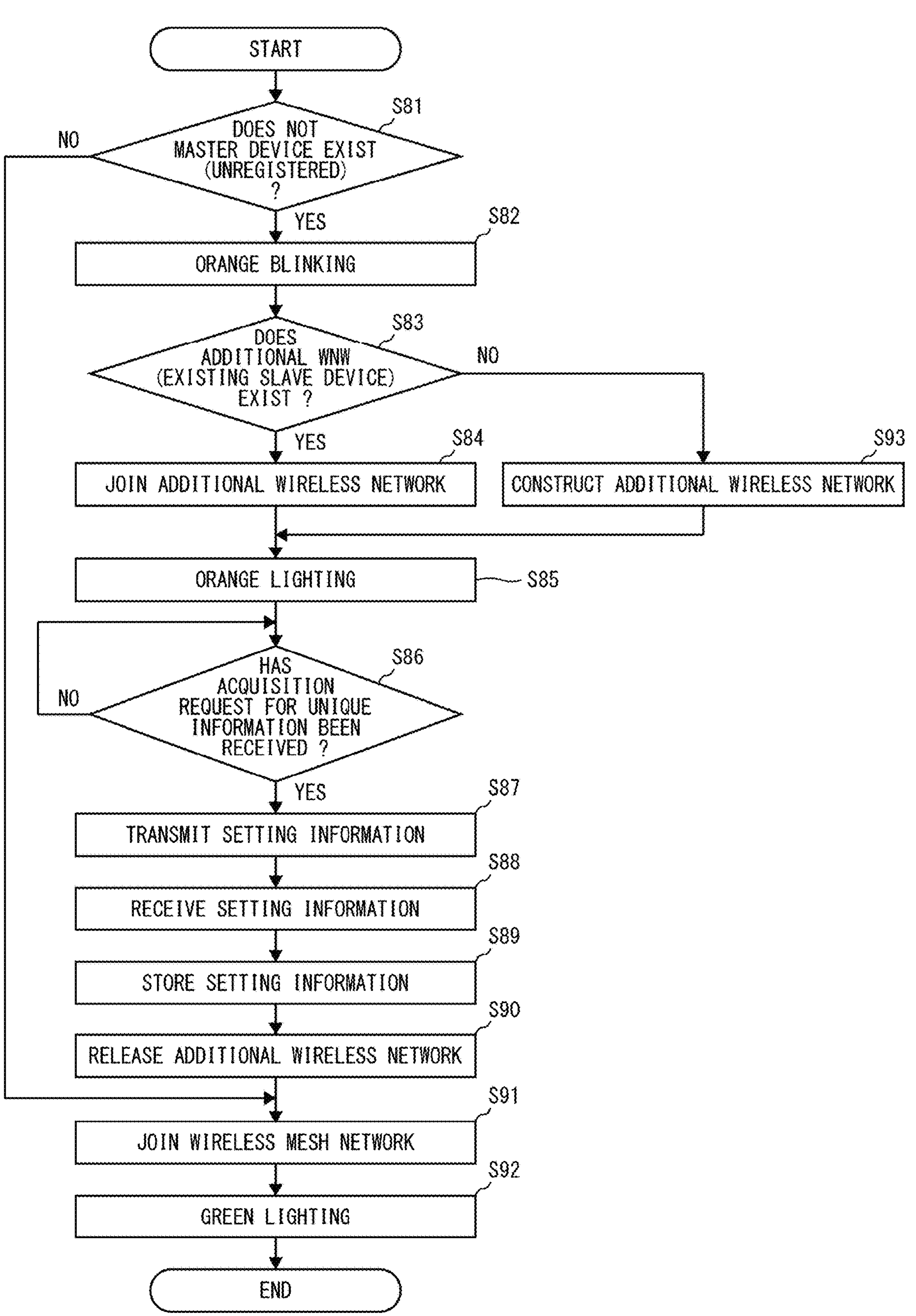
FIG. 38 is a diagram for explaining the operation of the slave device.

FIG. 38 illustrates slave device addition processing executed by the slave device to be added. The CPU 220 executes the following processing according to the program 280.

In S81, the CPU 220 (network construction portion 269) determines whether the master device 201 does not exist or is not registered in the master device 201. For example, if the setting information 254 is stored in the storage device 221, the network construction portion 269 determines that the registration has been done in the master device 201. In this case, the CPU 220 proceeds from S81 to S91, and joins the industrial wireless network 204, which is a wireless mesh network, based on the setting information 254. On the other hand, if the setting information 254 is not stored in the storage device 221, the network construction portion 269 determines that the master device 201 is unregistered. In this case, the CPU 220 proceeds from S81 to S82.

In S82, the CPU 220 (indicator lamp operation portion 262) causes the indicator lamp 224 to blink in orange.

In S83, the CPU 220 (addition slave device connection portion 263) determines whether there is an additional wireless network 209 (existing slave device). the addition slave device connection portion 263 searches for an additional wireless network 209 having the same network identifier as the mesh network identifier 282 held therein. If the additional wireless network 209 already exists, the CPU 220 proceeds from S83 to S84. In S84, the CPU 220 (network construction portion 269) joins the additional wireless network 209 constructed by the existing slave device. On the other hand, if the additional wireless network 209 is not present, the CPU 220 proceeds from S83 to S93. In S93, the CPU 220 (network construction portion 269) constructs the additional wireless network 209 by itself. As a result, a plurality of slave devices to be added join the additional wireless network 209. Details of this example will be described later.

In S85, the CPU 220 (indicator lamp operation portion 262) causes the indicator lamp 224 to light up in orange. Orange lighting means that the lighting color of the indicator lamp 224 is set to orange and the lighting mode is set to continuous lighting.

In S86, the CPU 220 (request receiver 264) determines whether an acquisition request for the unique information is received from the master device 201 via the additional wireless network 209. When the acquisition request for the unique information is received, the CPU 220 proceeds from S86 to S87.

In S87, the CPU 220 (request receiver 264) reads the unique information from the storage device 221, and transmits the unique information 283 to the master device 201.

In S88, the CPU 220 (master-slave device communication portion 266) receives the setting information 254 from the wired slave device or another existing slave device via the additional wireless network 209.

In S89, the CPU 220 (storage management portion 260) stores the setting information 254 in the storage device 221.

In S90, the CPU 220 (network construction portion 269) releases the additional wireless network 209.

In S91, the CPU 220 (network construction portion 269) joins the industrial wireless network 204, which is a wireless mesh network, according to the setting information 254.

In S92, the CPU 220 (indicator lamp operation portion 262) causes the indicator lamp 224 to light up in green.

In this way, the slave device can join the industrial wireless network 204.

2-3. Highlighting Lighting

Figure 39:
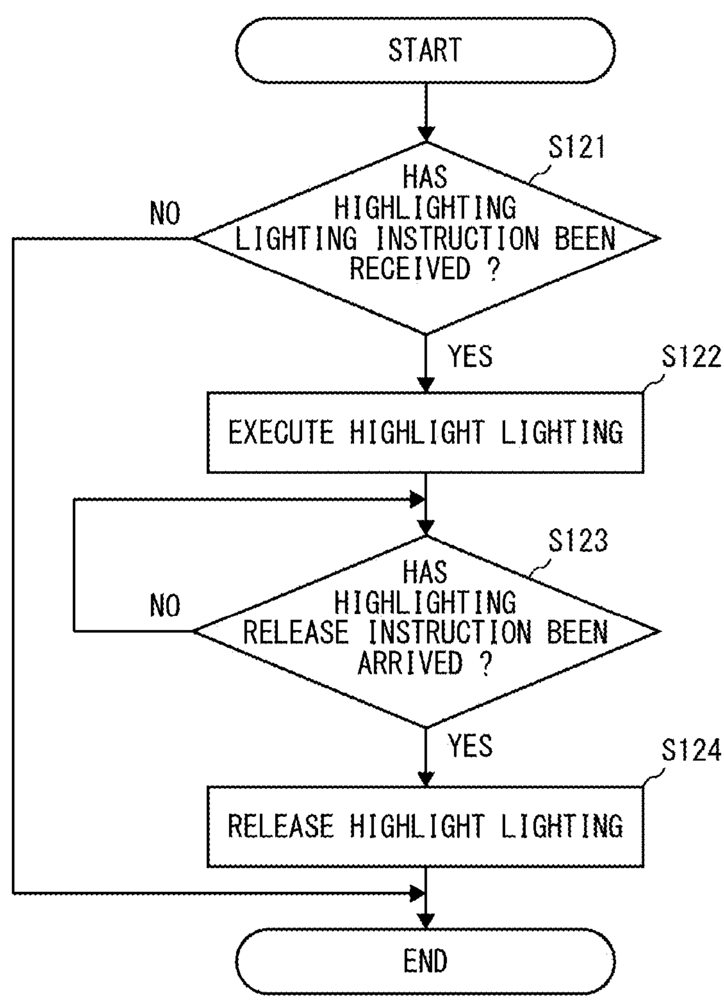
FIG. 39 is a flowchart for explaining highlight lighting.

FIG. 39 illustrates highlight lighting processing executed by the CPU 220 of the slave device 202.

In S121, the CPU 220 (request receiver 264) determines whether a highlighting lighting instruction (highlighting lighting request) has been received from the master device 201. When the highlighting lighting instruction is received, the CPU 220 proceeds from S121 to S122.

In S122, the CPU 220 (indicator lamp operation portion 262) highlights the indicator lamp 224.

In S123, the CPU 220 (request receiver 264) determines whether a highlighting release instruction (highlight release request) has been received from the master device 201. When the highlighting release instruction is received, the CPU 220 proceeds from S123 to S124.

In S124, the CPU 220 (indicator lamp operation portion 262) releases the highlighting lighting of the indicator lamp 224.

Here, the highlighting lighting is released based on the highlighting release instruction, but this is merely an example. When the timer or the counter measures a certain time, the CPU 220 may release the highlight lighting.

2-4. Signal Sequence

Figure 40:
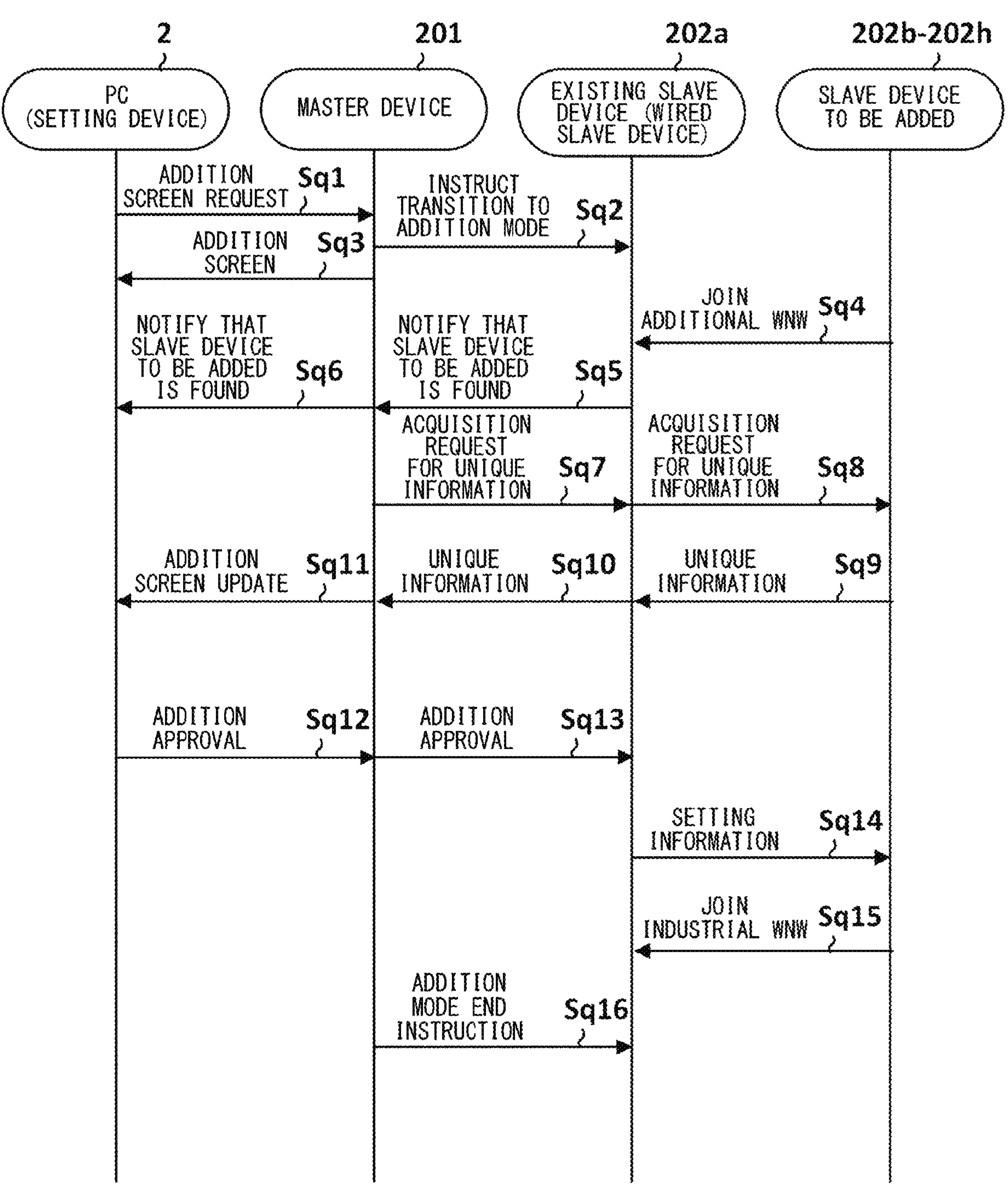
FIG. 40 is a diagram illustrating a signal sequence related to addition processing.

FIG. 40 illustrates a signal sequence in the slave device addition processing. Here, in a case where the wired slave device has been connected to the master device 201, it is assumed that another wireless slave device joins the industrial wireless network 204. In FIG. 40, WNW is an abbreviation for wireless network.

In Sq1, the PC 2 transmits the addition screen request to the master device 201, and the master device 201 receives the addition screen request. The addition screen request is an implicit instruction to transition to the slave device addition mode.

In Sq2, the master device 201 transmits an instruction to transition to the slave device addition mode to the wired slave device (slave device 202*a*), and the slave device 202*a* receives the transition instruction. As a result, the slave device 202*a* transitions to the slave device addition mode and constructs the additional wireless network 209.

In Sq3, the master device 201 transmits display information (such as an HTML file) of the addition screen 310 to the PC 2, and the PC 2 receives the display information. The PC 2 displays an addition screen 310 (FIG. 35) on the display portion 7 by a Web browser. Note that the order of Sq2 and Sq3 may be reversed.

In Sq4, the slave devices to be added (such as the slave devices 202*b* to 202*h*) find the additional wireless network 209 and join the additional wireless network 209.

In Sq5, the slave device 202*a* finds a slave device to be added which has joined the additional wireless network 209, and transmits a notification indicating that the slave device to be added has been found to the master device 201. The master device 201 receives the notification.

In Sq6, the master device 201 transfers the notification to the PC 2. Sq6 may be omitted.

In Sq7, the master device 201 transmits an acquisition request for requesting the unique information 283 of the slave device to be added to the slave device 202*a*, and the slave device 202*a* receives the acquisition request.

In Sq8, the slave device 202*a* transfers the acquisition request to the slave device to be added. The slave device to be added receives the acquisition request.

In Sq9, the slave device to be added transmits the own unique information 283 to the slave device 202*a* as a response to the acquisition request. The slave device 202*a* receives the unique information 283 about the slave device to be added.

In Sq10, the slave device 202*a* transfers the unique information 283 about the slave device to be added to the master device 201. The master device 201 receives the unique information 283 about the slave device to be added.

In Sq11, the master device 201 creates (updates) the addition screen 310 reflecting the unique information 283 of the slave device to be added, and transmits the updated addition screen 310 to the PC 2. The PC 2 receives the updated addition screen 310 (FIG. 36) and displays it on the display portion 7. As a result, the user can check the unique information (example: unit name and serial number) of the slave device to be added. The unique information is generally printed in a box in which the slave device 202 is packed, an instruction manual, or a certificate, and the user can check the unique information. That is, the user can check, through the addition screen 310, whether a slave device desired to join the industrial wireless network 204 is actually detected as a slave device to be added.

In Sq12, the PC 2 transmits the addition approval to the master device 201 based on the user operation, and the master device 201 receives the addition approval. The addition approval may include the unique information of the slave device 202 for which the addition has been approved. As a result, the slave device 202 whose addition has been approved and the slave device 202 whose addition has been rejected may be distinguished from each other. The master device 201 registers the unique information 283 of the slave device 202 to be approved for addition in the slave device list 253.

In Sq13, the master device 201 transfers the addition approval to the slave device 202*a*. The slave device 202*a* receives the addition approval.

In Sq14, the master device 201 transmits the setting information 254 to the slave device to be added whose addition has been approved. The slave device to be added whose addition has been approved receives the setting information 254 (including the mesh network identifier 281) and stores the setting information 254 in the storage device 221.

In Sq15, the slave device to be added joins the industrial wireless network 204 according to the setting information 254.

In Sq16, the master device 201 transmits an end instruction of the slave device addition mode to the existing slave device (slave device 202*a*) including the wired slave device. The existing slave device (slave device 202*a*) including the wired slave device returns (transitions) from the slave device addition mode to the normal mode.

<Another Example of Slave Device Addition (Collective Registration)>

Figure 41:
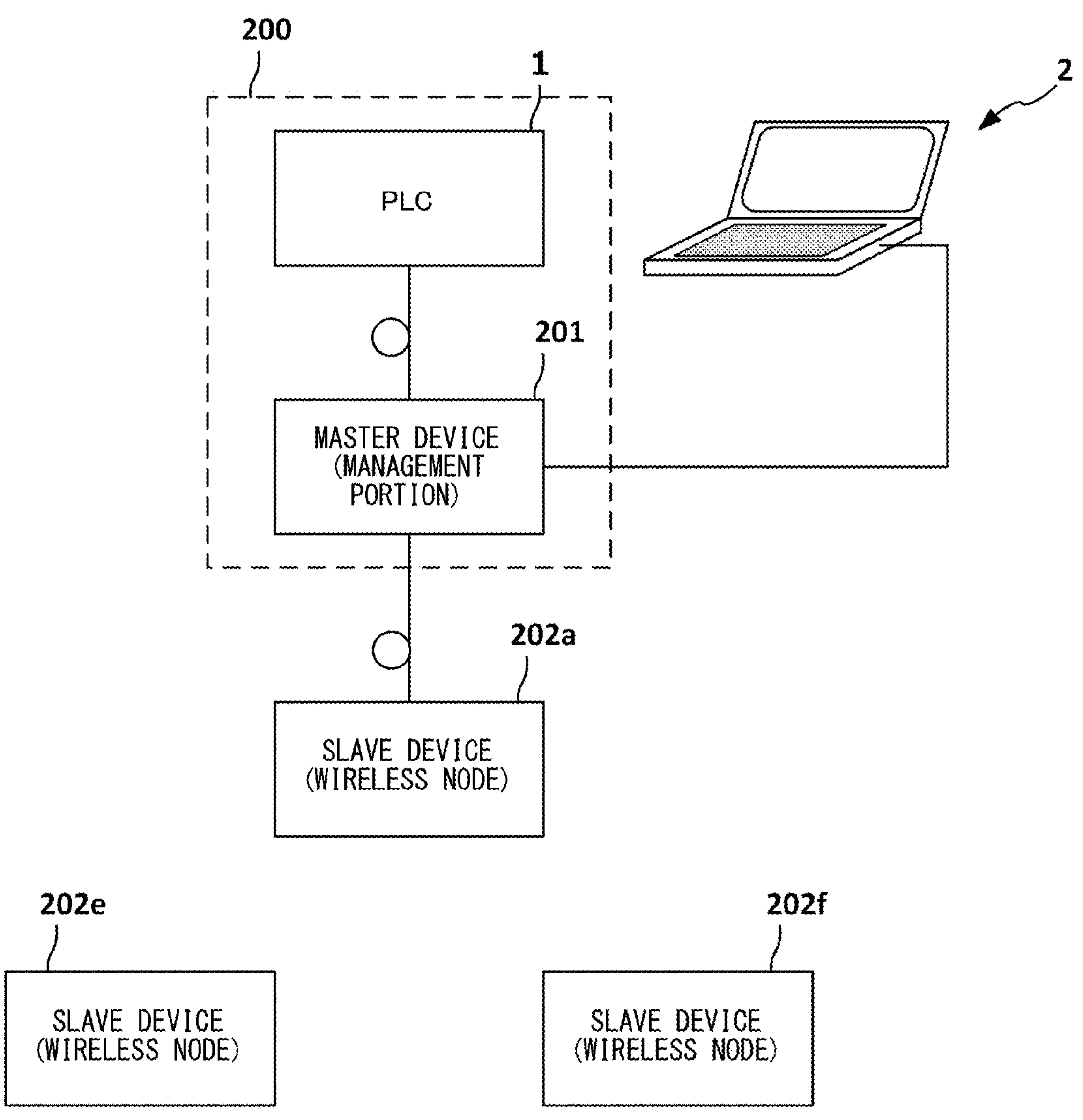
FIG. 41 is a diagram for explaining collective registration of a plurality of slave devices including a wired slave device.

In the above-described example, a wired slave device is first registered in the master device 201, and then a wireless slave device is added. However, as illustrated in FIG. 41, a plurality of slave devices 202*a*, 202*e*, and 202*f* including the wired slave device may be registered in the master device 201 in parallel at the same time.

Figure 42:
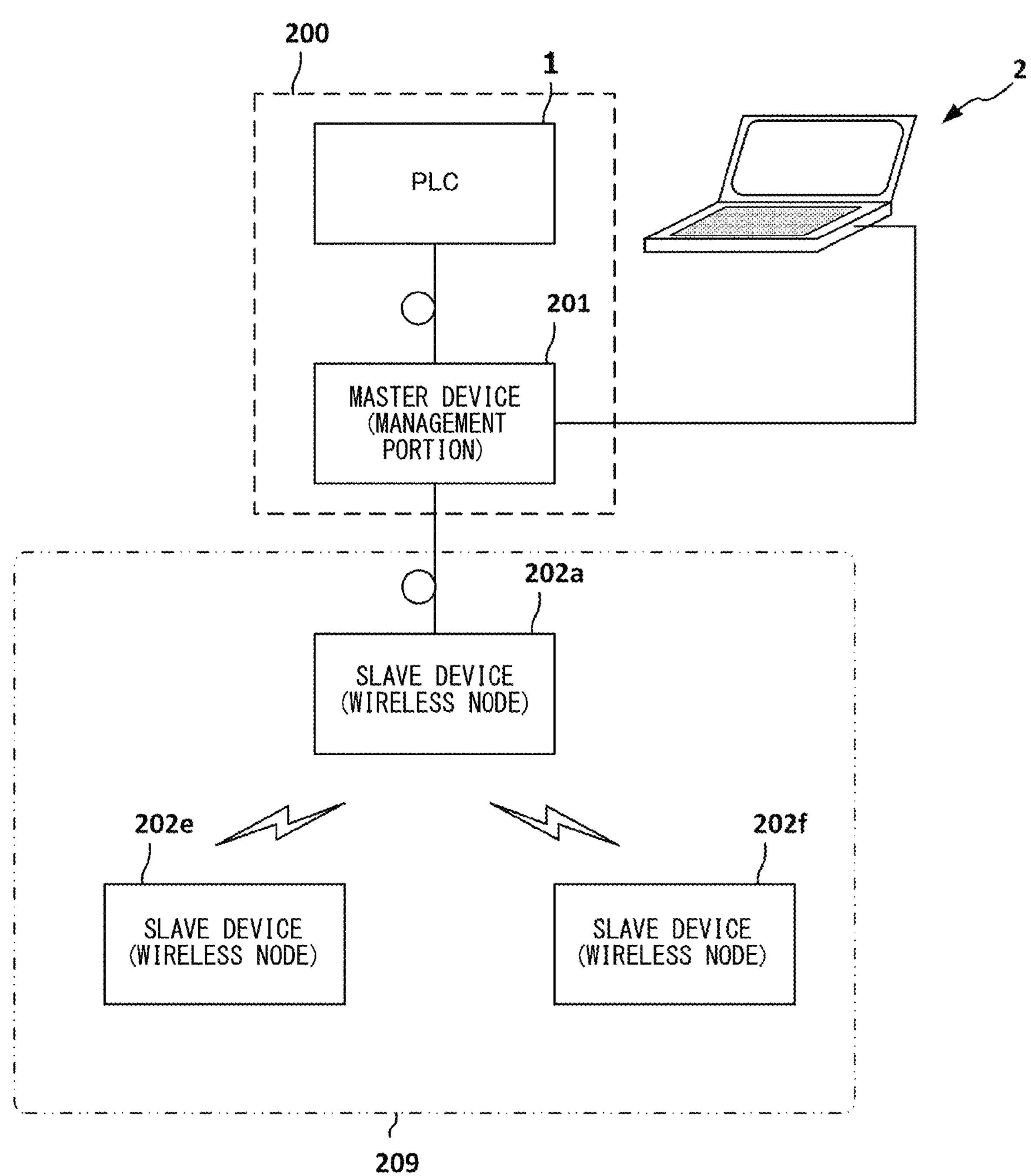
FIG. 42 is a diagram for explaining that an additional wireless network has been constructed.
Figure 43:
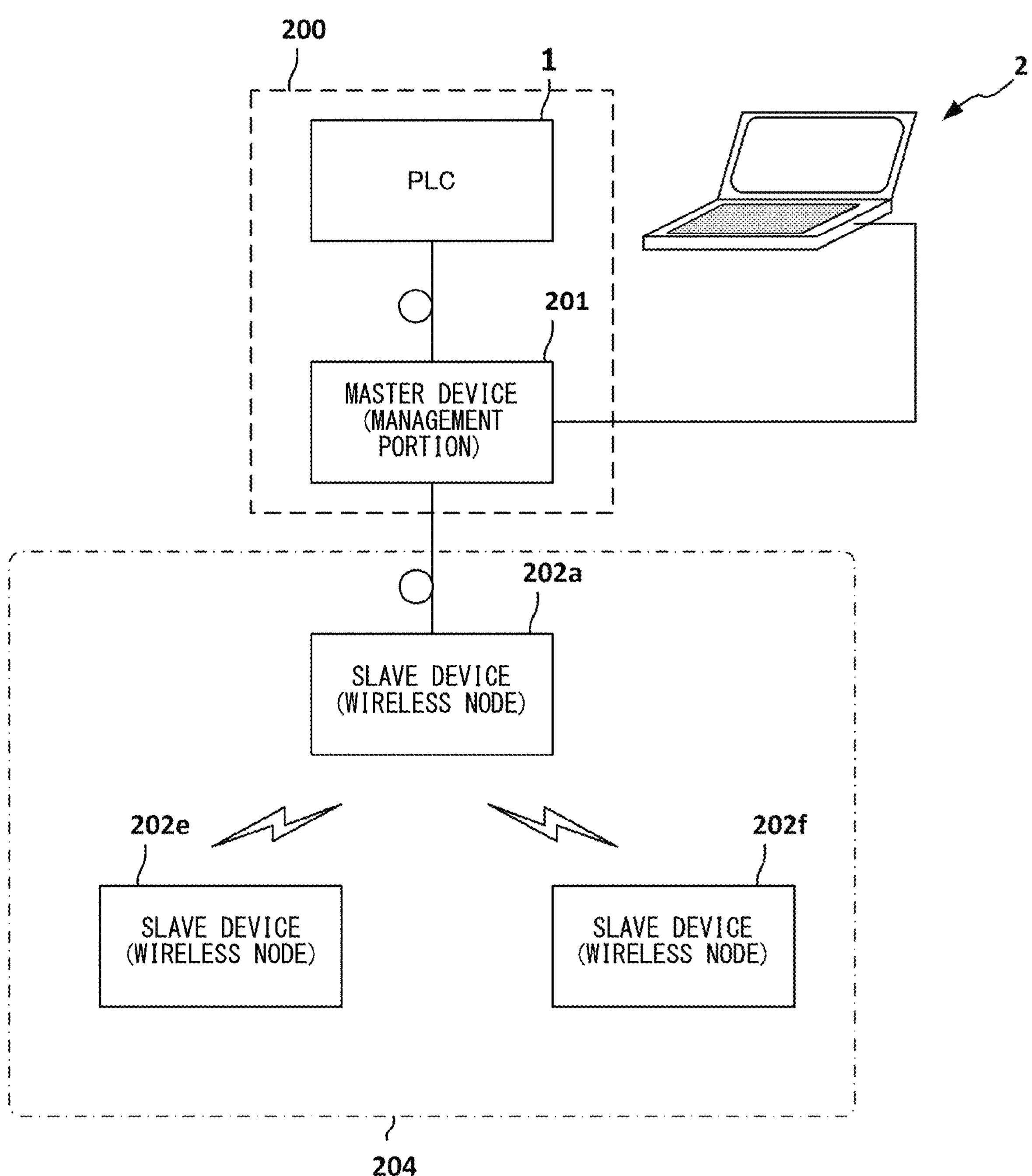
FIG. 43 is a diagram for explaining that an industrial wireless network has been constructed.

In this case, as illustrated in FIG. 42, since the plurality of slave devices 202*a*, 202*c*, and 202*f* does not possess the setting information 254, the additional wireless network 209 is constructed. The plurality of slave devices 202*a*, 202*e*, and 202*f* acquires the setting information 254 from the master device 201 via the additional wireless network 209. Then, as illustrated in FIG. 43, the plurality of slave devices 202*a*, 202*e*, and 202*f* join the industrial wireless network 204 based on the setting information 254.

Figure 44:
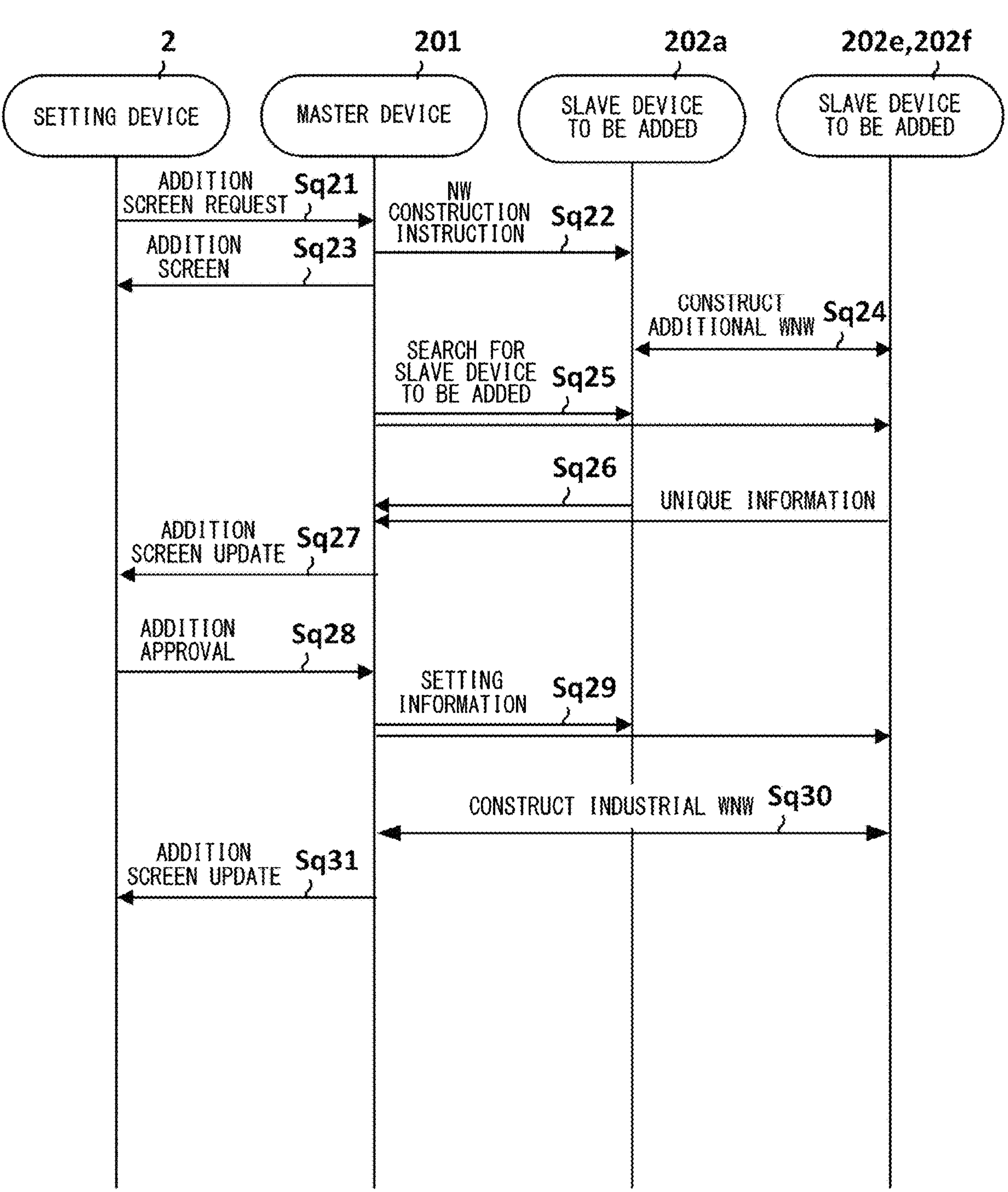
FIG. 44 is a diagram illustrating a signal sequence related to addition processing.

FIG. 44 is a sequence diagram for this example. Since the slave devices 202*a*, 202*c*, and 202*f* are in the non-registered state, the indicator lamp 224 may blink in orange. Further, when accessed by the PC 2, the master device 201 may perform user authentication by inputting a login ID and a password.

In Sq21, the PC 2 transmits the addition screen request to the master device 201, and the master device 201 receives the addition screen request.

In Sq22, the master device 201 transmits an NW construction instruction to the slave device 202*a*.

In Sq23, the master device 201 transmits display information (such as an HTML file) of the addition screen 310 to the PC 2, and the PC 2 receives the display information. The PC 2 displays the addition screen 310 (FIG. 35) on the display portion 7. Note that the order of Sq32 and Sq23 may be reversed.

In Sq24, the slave devices 202*a*, 202*e*, and 202*f* construct the additional wireless network 209 based on the NW construction instruction. As a result, not only the slave device 202*a*, which is a wired slave device, but also the slave devices 202*e* and 202*f*, which are wireless slave devices, can communicate with the master device 201. Each of the slave devices 202*a*, 202*c*, and 202*f* may cause the indicator lamp 224 to light up in orange.

In Sq25, the master device 201 broadcasts a search packet for searching for the slave devices 202*a*, 202*c*, and 202*f*.

In Sq26, the slave devices 202*a*, 202*e*, and 202*f* transmit the unique information 283 to the master device 201 as a response to the search packet.

In Sq27, the master device 201 updates the addition screen 310 with the unique information 283 of the found slave devices 202*a*, 202*e*, and 202*f*. As a result, the PC 2 displays the updated addition screen 310 on the display portion 7.

In Sq28, the PC 2 transmits the addition approval to the master device 201 based on the user operation, and the master device 201 receives the addition approval. The addition approval may include the unique information of the slave devices 202*a*, 202*e*, and 202*f* for which the addition has been approved. As a result, the slave device 202 whose addition has been approved and the slave device 202 whose addition has been rejected may be distinguished from each other. The master device 201 registers the unique information 283 of the slave devices 202*a*, 202*c*, and 202*f* to be approved for addition in the slave device list 253.

In Sq29, the master device 201 transmits the setting information 254 to the slave devices 202*a*, 202*c*, and 202*f* whose addition has been approved. The slave devices 202*a*, 202*e*, and 202*f* approved for addition receive the setting information 254 (including the mesh network identifier 281) and store the setting information 254 in the storage device 221.

In Sq30, the slave devices 202*a*, 202*e*, and 202*f* join the industrial wireless network 204 according to the setting information 254. Each of the slave devices 202*a*, 202*e*, and 202*f* may cause the indicator lamp 224 to light up in green.

In Sq31, the master device 201 updates the addition screen 310 to indicate that the slave devices 202*a*, 202*e*, and 202*f* have been connected. The PC 2 displays the updated addition screen 310 on the display portion 7.

In this manner, a plurality of slave devices 202 may be registered simultaneously in parallel. Note that the slave device 202 that has received the highlight lighting request from the PC 2 may highlight the indicator lamp 224 (example: increase in brightness) in accordance with the highlight lighting request.

<Setting Change Processing>

The PC 2 is connected to the master device 201, and can change the setting information 254. In this case, the changed setting information 254 needs to be propagated (distributed) to each slave device 202 joining the industrial wireless network 204.

Figure 45:
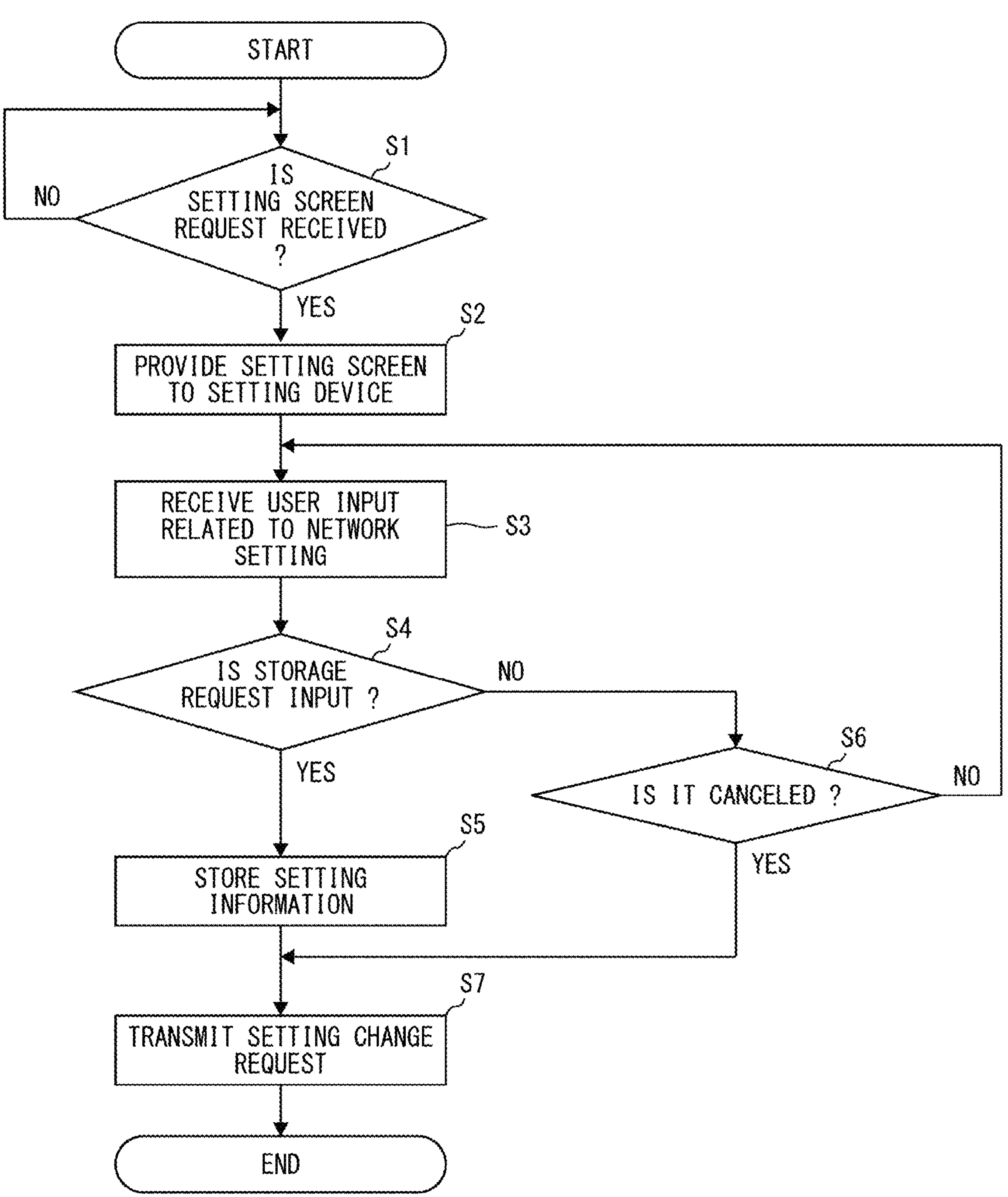
FIG. 45 is a flowchart for explaining the operation of the master device.

FIG. 45 illustrates the setting change processing executed in the master device 201. A difference between FIG. 45 and FIG. 20 is that S6 is added after S5. In S6, the CPU 210 (request transmitter 232, master-slave device communication portion 236) detects that the setting information 254 has been changed, and transmits (broadcasts) a setting change request including the changed setting information 254 to the industrial wireless network 204. Note that the CPU 210 may transmit the setting information 254 to the slave device 202 after waiting for a response to the setting change request.

Figure 46:
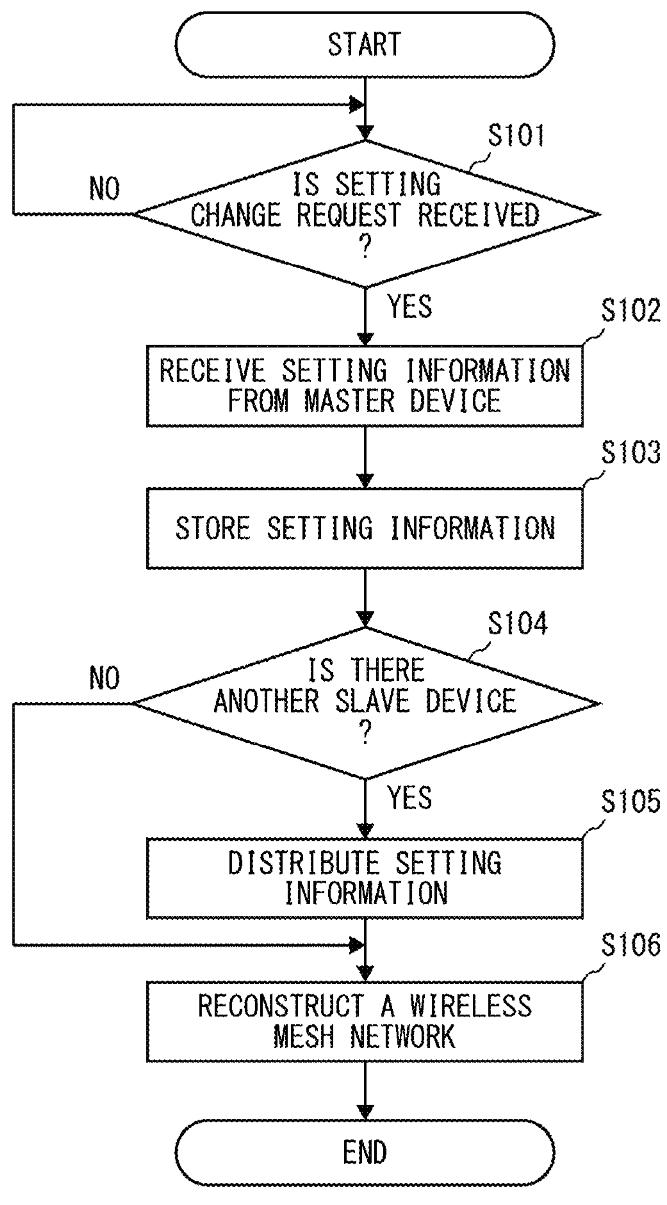
FIG. 46 is a flowchart for explaining setting change processing.

FIG. 46 illustrates the setting change processing of the slave device 202. Here, it is assumed that the setting change request and the setting information 254 are separately received. Of course, the setting change request and the setting information 254 may be received together.

In S101, the CPU 220 (request receiver 264, master-slave device communication portion 266) determines whether a setting change request has been received. When the setting change request is received, the CPU 220 proceeds from S101 to S102.

In S102, the CPU 220 (request receiver 264, master-slave device communication portion 266) receives the setting information 254 from the master device 201.

In S103, the CPU 220 (storage management portion 260) stores the received setting information 254 in the storage device 221.

In S104, the CPU 220 determines whether there is another slave device 202 connected thereto. Each slave device 202 holds a network address (example: MAC address or the like) of the slave device 202 to be the next hop in the storage device 221, and knows whether there is another slave device 202 connected thereto. When the master device 201 does not broadcast the setting information, the setting information 254 needs to be propagated to the other slave devices 202 in S104 and S105. Therefore, in a case where the setting information 254 is broadcast, S104 and S105 are unnecessary. When there is no other slave device 202 connected thereto, the CPU 220 proceeds from S104 to S106. In a case where there is another slave device 202 connected thereto, the CPU 220 proceeds from S104 to S105.

In S105, the CPU 220 distributes the setting information 254 to the other slave devices 202. The other slave devices 202 store the distributed setting information 254 in the storage device 221.

In S106, the CPU 220 reconstructs the wireless mesh network (industrial wireless network 204) based on the updated setting information 254. As a result, the updated setting information 254 is reflected on the industrial wireless network 204.

Note that the setting change request may be used when the setting information 254 is written to the slave device to be added in the slave device addition processing.

<Deletion Processing of Slave Device>

Figure 47:
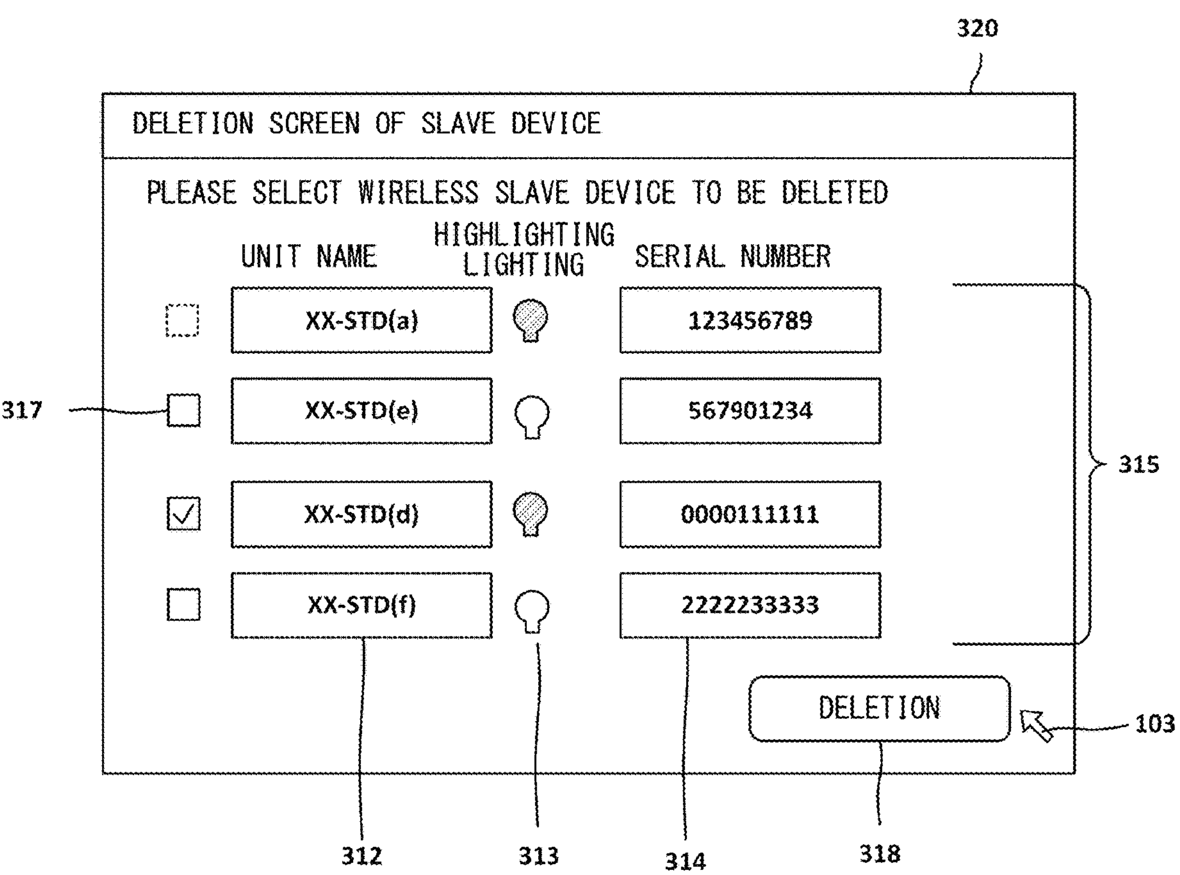
FIG. 47 is a diagram for explaining a deletion screen.

FIG. 47 illustrates a deletion screen 320 for deleting any one of the slave devices 202 connected to the industrial wireless network 204. As described above, the list 315 is a list of the connected slave devices 202. A unit name 312 and a serial number 314 are listed for each slave device 202. The button 313 is a button for highlighting the indicator lamp 224 of the corresponding slave device 202. The check box 317 is a control object for selecting the slave device 202 to be deleted. If the wired slave device is deleted, the industrial wireless network 204 is disconnected from the master device 201, and thus deletion of the wired slave device may be prohibited. For example, the check box 317 corresponding to the wired slave device may not be displayed or not selectable. A delete button 318 is a button for instructing the CPU 210 to delete the selected slave device.

Figure 48:
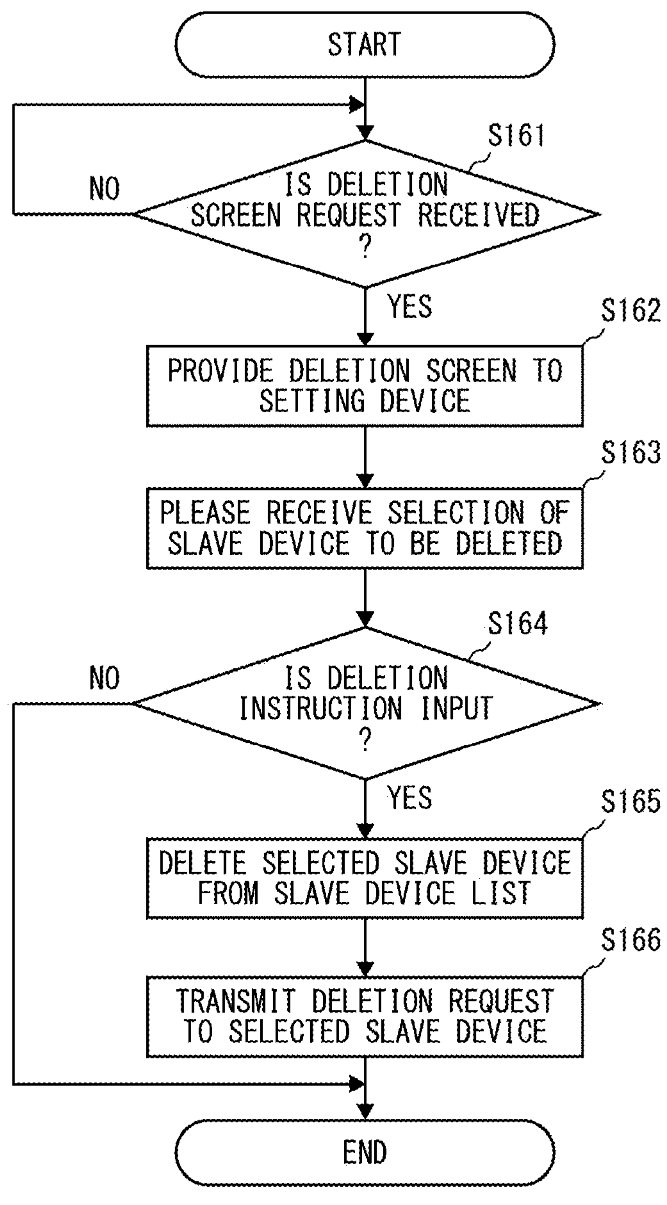
FIG. 48 is a flowchart for explaining deletion processing in the master device.

FIG. 48 illustrates deletion processing executed by the CPU 220 of the master device 201.

In S161, the CPU 210 (screen providing portion 240) determines whether a deletion screen request has been received from the PC 2. The deletion screen request may be an access request for a URL of a Web page corresponding to the deletion screen 320. When the deletion screen request is received, the CPU 210 proceeds from S161 to S162.

In S162, the CPU 210 (screen providing portion 240) provides the deletion screen 320 (HTML file, CSS file, and image file) to the PC 2 as a setting device.

In S163, the CPU 210 (user input receiver 239) receives the selection of the slave device to be deleted. As described above, the slave device 202 whose check box 317 is checked is to be deleted.

In S164, the CPU 210 (user input receiver 239) determines whether a deletion instruction has been input by the user. When the deletion instruction is input, the CPU 210 proceeds from S164 to S165.

In S165, the CPU 210 (slave device registration portion 234) deletes the selected slave device 202 from the slave device list 253.

In S166, the CPU 210 (request transmitter 232) transmits a deletion request to the selected slave device 202.

Figure 49:
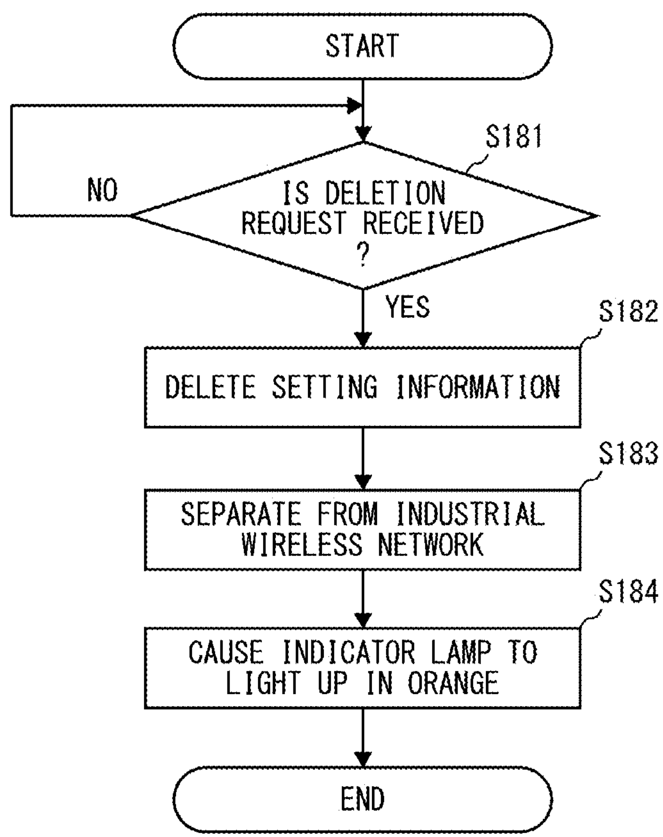
FIG. 49 is a flowchart for explaining a deletion processing operation in a slave device.

FIG. 49 illustrates the deletion processing executed by the CPU 220 of the slave device 202.

In S181, the CPU 220 (request receiver 264) determines whether a deletion request has been received from the master device 201. When the deletion request is received, the CPU 220 proceeds from S181 to S182.

In S182, the CPU 220 (storage management portion 260) deletes the setting information 284 (and the mesh network identifier 281) from the storage device 221.

In S183, the CPU 220 (network management portion 268) turns off the WLAN module 223*a* and separates from the industrial wireless network 204.

In S184, the CPU 220 (indicator lamp operation portion 262) causes the indicator lamp 224 to blink in orange. As a result, the user can easily grasp which slave device 202 is in the non-registered state. Note that, in the above-described deletion processing of a slave device, it is assumed that the slave device to be deleted is powered on at the time when the deletion request is issued. When the deletion request is issued, the slave device to be deleted may be powered off. In this case, for example, the master device may store a unique identifier of the target slave device. The master device may be configured to automatically transmit the deletion request to the target slave device at the timing instructed by the user or at the timing when the power on of the target slave device is recognized after the target slave device is powered on next time. When receiving the deletion request from the master device, the target slave device leaves the industrial wireless network 204.

<Others>

Although the case where the slave device to be added is connected to the wired slave device has been mainly described, the slave device to be added may be connected to the wireless slave device connected to the wired slave device. In this case, the plurality of slave devices 202 relay communication from the master device 201 to the slave device to be added.

When the slave device to be added is connected to the existing slave device, the existing device may apply the authentication processing to the slave device to be added. Examples of the authentication processing include 4-way handshake.

For each of the plurality of slave devices 202 joining the industrial wireless network 204, the next hop can be dynamically changed. For example, in FIG. 14, the next hop of the slave device 202*e* is the slave device 202*d*, but the next hop of the slave device 202*e* may be changed to the slave device 202*b*. This is because when the wireless environment changes, the next hop that can communicate more stably also changes.

As the blinking method, a plurality of blinking methods may be provided. A first blinking method is a method of repeating a gradual increase in brightness and a gradual decrease in brightness. The first blinking method may be applied, for example, during a connection attempt to the additional wireless network 209 (orange blinking) and during a connection attempt to the industrial wireless network 204 (green blinking). A second blinking method is a method of repeating lighting at a first brightness (example: 100%) and lighting at a second brightness (example: 0%). The cycle of the first blinking method may be longer than the cycle of the second blinking method. That is, the first blinking method may be a method in which brightness changes gently. On the other hand, the second blinking method may be a method in which the brightness changes faster. Note that the second blinking method may be employed for the above-described highlight lighting.

<First Use Case>

The industrial wireless network 204 described above can be utilized for various purposes and applications in an FA site. For example, as a first use case, it can also be utilized in the generation phase of the operation record described in detail with reference to FIGS. 1 to 12. This will be described with reference to FIG. 50.

Figure 50:
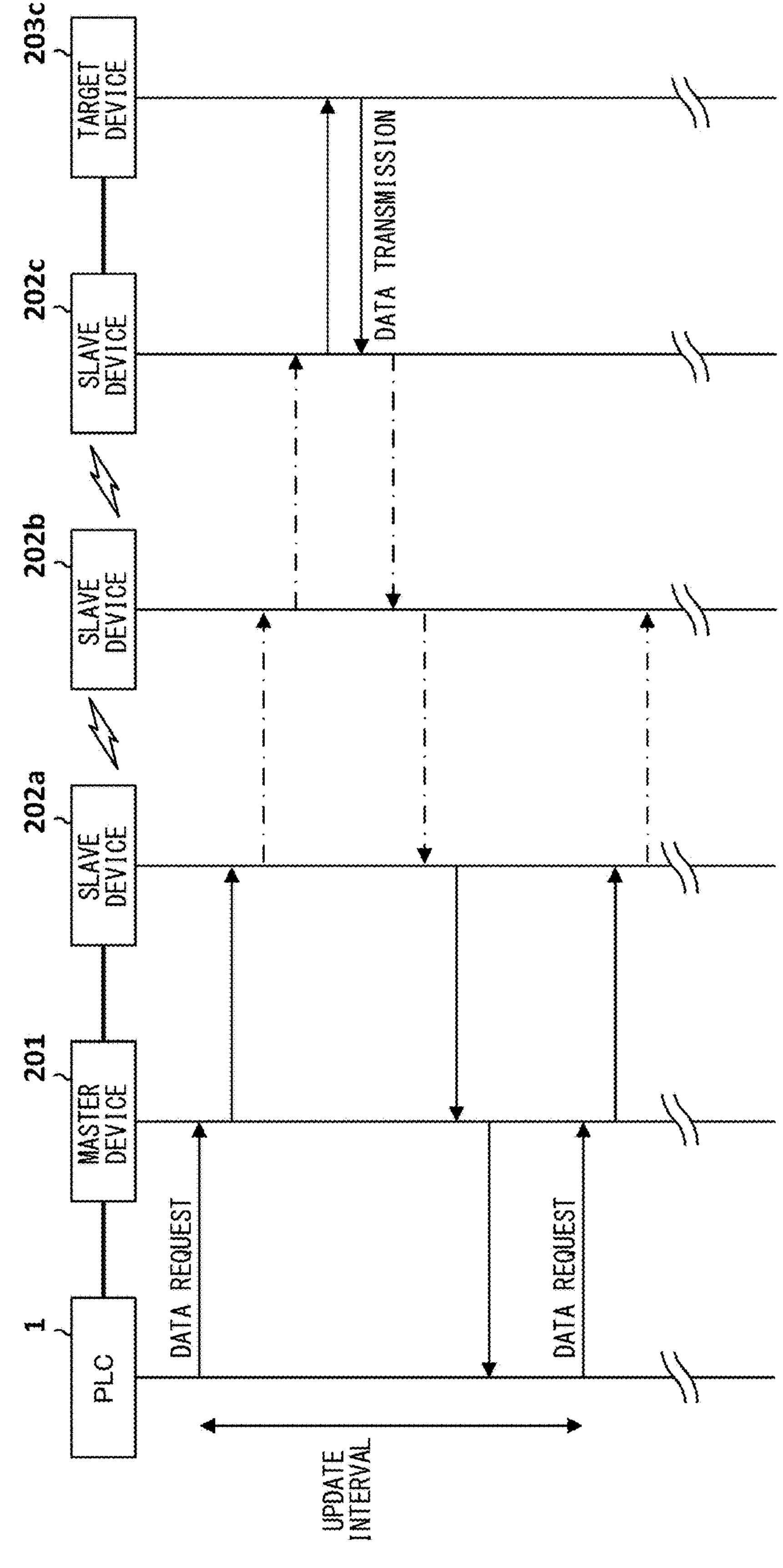
FIG. 50 is a diagram for explaining a PLC link constructed on an industrial wireless network.

FIG. 50 is a sequence diagram for explaining a case where data of the target device 203*c* is included as data periodically collected in the ring buffer 36 (FIG. 3) of the PLC 1. As described above, various types of data are collected in the ring buffer 36 of the PLC 1 in order to generate the operation record. For example, data obtained from the field device 10 wire-connected to the extension unit 4*b* of the PLC 1, that is, data obtained not via the industrial wireless network 204 (via a wired manner) is collected in a scan cycle (for example, several milliseconds or less) as a preset period. However, in order to obtain data from the target device 203*c* via the industrial wireless network 204, it may be difficult to collect data at a scan cycle due to a delay (for example, several tens to several hundreds of milliseconds) caused by wireless communication.

Therefore, as illustrated in FIG. 50, an "update interval" that defines an interval at which data is requested from the PLC 1 to the target device 203*c* is set. Specifically, the user sets the update interval via the PC 2, and the set update interval is stored in the project storage portion 35 of the PLC 1. In addition, the user may set an IP address for specifying the location of the target device 203*c* via the PC 2, or may set information for specifying data to be collected in the target device 203*c*. For example, in a case where another PLC is considered as the target device 203*c* (in a case where a so-called PLC link function is used), an IP address for specifying the location of the other PLC may be set, and a device type or a device number to be collected in the other PLC, the number of words from the head device number, and the like may be set. The various pieces of information (such as the IP address) set in this manner are stored in the project storage portion 35 of the PLC 1.

In FIG. 50, the CPU 31 of the PLC 1 communicates with the target device 203*c* based on the contents stored in the project storage portion 35. That is, the CPU 31 transmits a data request to the target device 203*c* via the master device 201, the slave device 202*a*, the slave device 202*b*, and the slave device 202*c* wire-connected to the CPU itself. The target device 203*c* that has received the data request transmits the data specified (set) in advance as described above to the PLC 1 via the slave device 202*c*, the slave device 202*b*, the slave device 202*a*, and the master device 201. The PLC 1 stores the received data in the ring buffer 36. By repeating the data request and the data transmission at the predetermined update interval described above, the time-series data from the target device 203*c* is collected in the ring buffer 36 of the PLC 1. In this case, in the ring buffer 36, data collected at the scan cycle (data obtained from the field device 10) and data collected at a predetermined update interval (target device 203*c*) are mixed. Thereafter, when the storage trigger condition is satisfied, data for a predetermined period among the data stored in the ring buffer 36 is stored in the operation record storage portion 37, and an operation record is generated. The predetermined period for determining the storage target may be set by the user via the PC 2 and stored in the project storage portion 35 of the PLC 1.

As described above, according to the first use case, data from the target device 203*c* can be included in the operation record via the industrial wireless network 204. In the present embodiment, the ring buffer 36 for generating the operation record is provided in the PLC 1, but the invention is not limited thereto, and may be provided in the master device 201, for example. In the industrial wireless system according to the present embodiment, since the master device (management portion) and the slave device (wireless communication circuit) are separated, such function expansion of the master device 201 can be easily performed.

<Second Use Case>

In addition, as a second use case, the industrial wireless network 204 can also be utilized for checking an analysis report of an operation record generated in the first use case.

Specifically, as described above, the extension unit (analysis unit) 4*a* of the PLC 1 creates an analysis report of the operation record stored in the operation record storage portion 37 and provides the analysis report to the Web browser 60 outside the PLC 1. An example of a device having a Web browser 60 is the PC 2. As illustrated in FIGS. 14 and 28, the PC 2 may be wirelessly connected to not only the master device 201 but also any one of the slave devices 202*a* to 202*f* constituting the industrial wireless network 204.

Figure 51:
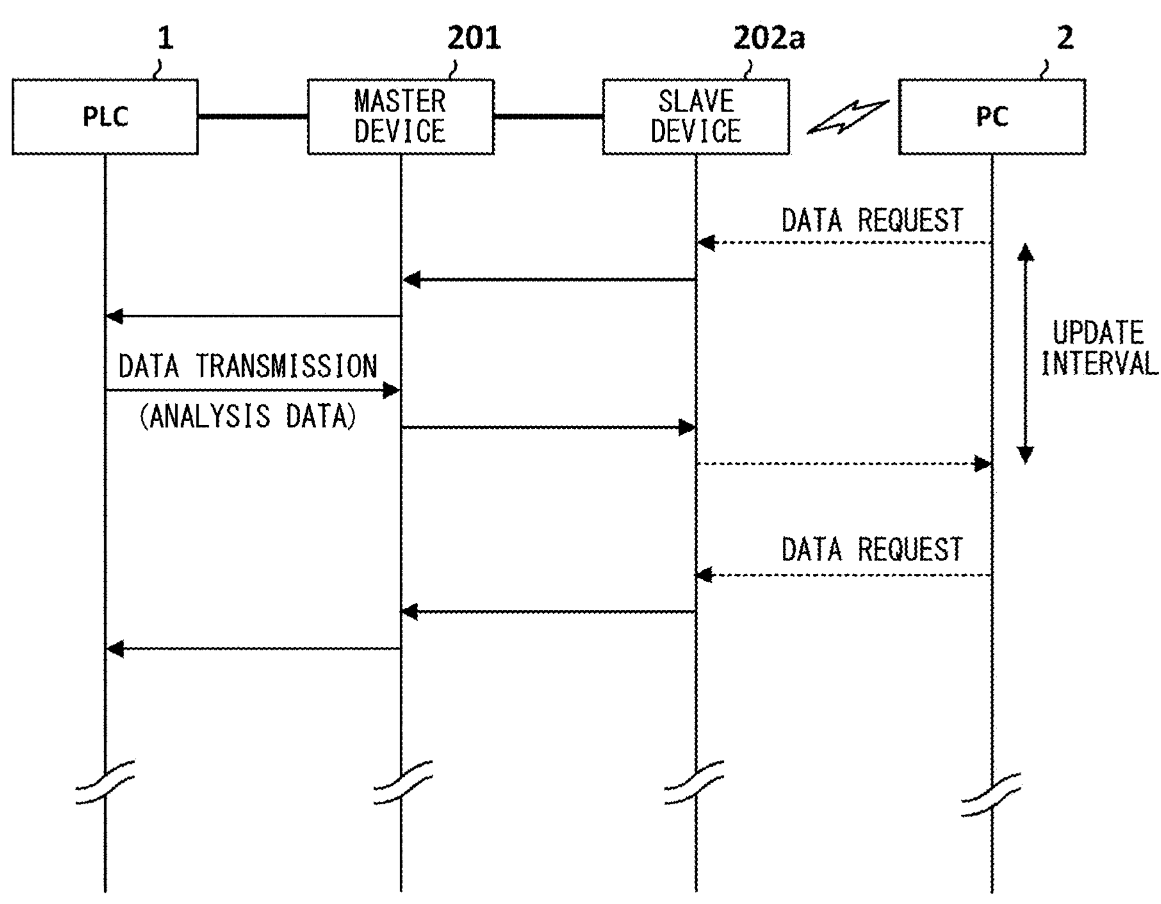
FIG. 51 is a diagram for explaining information display processing by the PC 2 or the programmable indicator.

As illustrated in FIG. 51, for example, the PC 2 connected to the slave device 202*a* transmits a data request for the analysis report to the slave device 202*a*, the master device 201, and the PLC 1. That is, the PC 2 accesses the memory of the PLC 1 storing the analysis report ( ) to read and reproduce the analysis report (the operation record storage portion 37 of the PLC 1 when the analysis report is included in the operation record. A memory for storing the analysis report may be separately provided in addition to the operation record storage portion 37).

At this time, as the above-described update interval (FIG. 50), an interval in consideration of a delay caused by wireless communication may be set. As a result, the PC 2 can easily repeatedly and smoothly perform partial reading and partial reproduction of the analysis report, such as so-called streaming reproduction. Of course, it is also conceivable to first download the entire analysis report to the PC 2 and then reproduce the analysis report in the PC 2.

<Third Use Case>

In addition, for example, as a third use case, the industrial wireless network 204 can also be utilized for monitoring time-series device values acquired in real time from the PLC 1.

Figure 52:
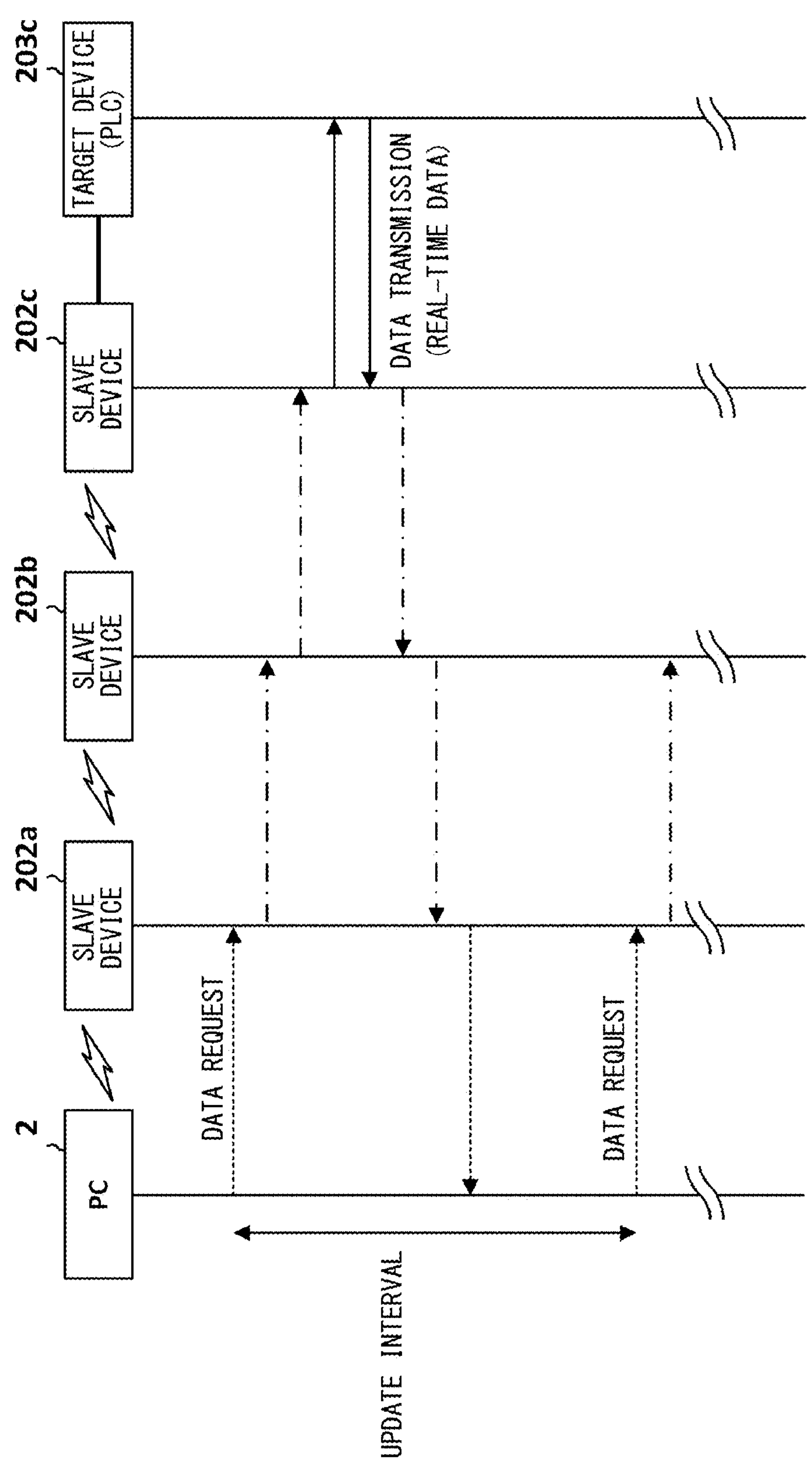
FIG. 52 is a diagram for explaining real-time data display processing by the PC 2.

As described above, the PC 2 may be wirelessly connected to any one of the slave devices 202*a* to 202*f* constituting the industrial wireless network 204. As illustrated in FIG. 52, the PC 2 may be connected to the slave device 202*a*. In this case, in order to monitor the time-series device values recorded in the target device 203*c* (example: PLC), the PC 2 transmits a data request to the target device 203*c* via the slave device 202*a*, the slave device 202*b*, and the slave device 202*c*, and acquires and displays real-time data (example: device values). By setting an appropriate update interval, the PC 2 can monitor the time-series device values recorded in the PLC 1. As described above, the PC 2 may be replaced with a programmable indicator.

<Fourth Use Case>

In addition, for example, as a fourth use case, the industrial wireless network 204 can also be utilized for debugging of a ladder program executed in the PLC 1.

Conventionally, in order to debug the ladder program, a system designer has to go to the installation location of the PLC 1, connect the PC 2 to the ladder program, and debug while verifying the operation of the PLC 1. However, by utilizing the industrial wireless network 204 according to the present embodiment, the ladder program can be debugged without going to the installation location of the PLC 1.

Figure 53:
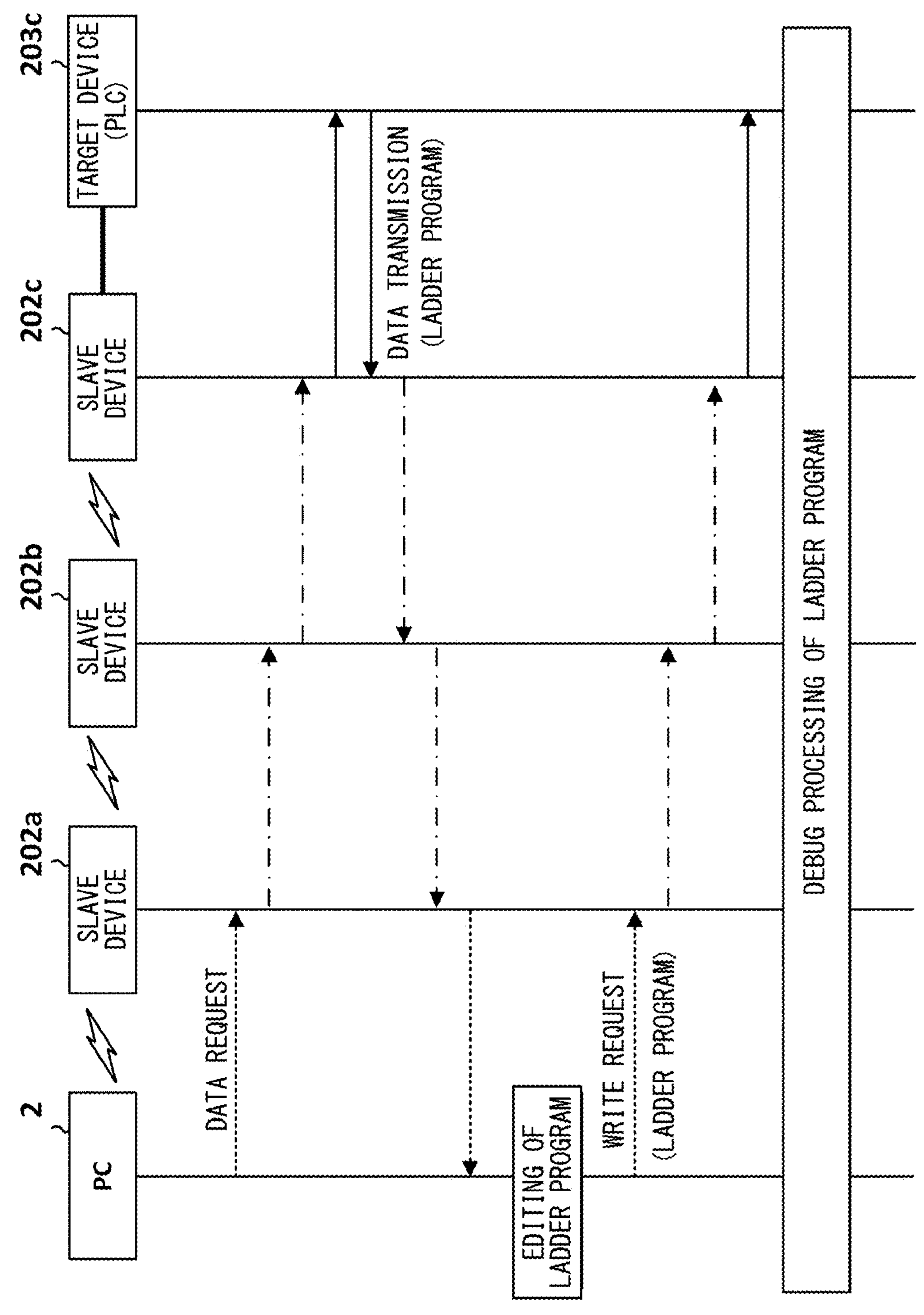
FIG. 53 is a diagram for explaining program editing processing and debug processing by the PC 2.

As illustrated in FIG. 53, the PC 2 is connected to the slave device 202*a*, and transmits a data request (a read request of the ladder program) to the target device 203*c* (example: PLC 1) via the slave device 202*a*, the slave device 202*b*, and the slave device 202*c*. The target device 203*c* transmits the ladder program to the PC 2 in response to the data request. The ladder program is transferred to the PC 2 via the slave device 202_c_, the slave device 202_b_, and the slave device 202_a_. The PC 2 edits the ladder program in accordance with a user operation. The PC 2 transmits a write request for the edited ladder program to the target device 203_c_ via the slave device 202_a_, the slave device 202_b_, and the slave device 202_c_, and writes the ladder program in the PLC 1 that is the target device 203_c_. Thereafter, the PC 2 executes the debug processing by transmitting an operation attempt command for the ladder program written in the PLC 1 via the slave device 202_a_, the slave device 202_b_, and the slave device 202_c_. The PC 2 may acquire the device value from the PLC 1 during the debug processing and display the device value in association with the ladder program.

<Reduction of Congestion of Industrial Wireless Network 204>

1. Concept

As illustrated in FIG. 14, when a large number of slave devices 202 join the industrial wireless network 204, the industrial wireless network 204 is congested, and a communication packet transmitted and received between the PLC 1 and the plurality of target devices 203 is delayed or lost. For example, when a part of the time-series device values set to be collected at a constant update interval is lost, partial missing of the time-series data occurs in the PC 2 that is a programmable indicator or the PLC 1 that is a data utilization unit. In this case, accurate display and accurate analysis may not be possible. Further, when the PC 2 joins the industrial wireless network 204, congestion of the industrial wireless network 204 may be at a more serious level. On the other hand, the slave device 202 has an access point function. For example, the WLAN module 223_a_ may connect to the industrial wireless network 204, and the WLAN module 223_c_ may operate as an access point.

Therefore, in the present embodiment, the congestion of the industrial wireless network 204 is suppressed by separating the industrial wireless network 204 that transfers data between the PLC 1 and the target device 203 from the wireless network accessed by the PC 2. As a result, a delay or the like in data transfer in the industrial wireless system is suppressed, and data can be smoothly displayed on a mobile device such as the PC 2.

2. Example of Construction

Figure 54:
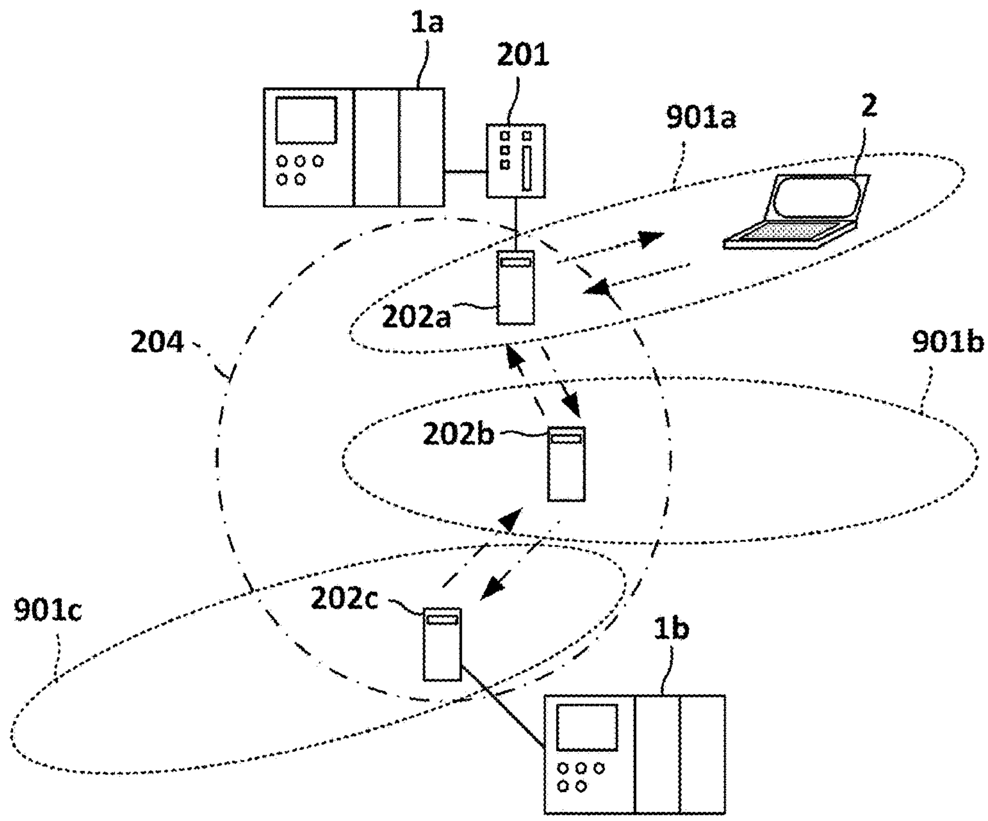
FIG. 54 is a diagram for explaining an example of construction of a plurality of wireless networks.

FIG. 54 is a diagram illustrating an example of construction of two types of wireless networks. Here, the PLC 1 including the data utilization unit is denoted as a PLC 1_a_. The PLC 1_a_ is wire-connected to the master device 201. The master device 201 is wire-connected to the slave device 202_a_ via a network cable 600. The slave device 202_a_, the slave device 202_b_, and the slave device 202_c_ constitute the industrial wireless network 204 which is a wireless mesh network. The PLC 1_a_ collects various data (example: device values) necessary for analysis from a PLC 1_b_ via the master device 201 and the industrial wireless network 204, analyzes the collected data, and stores an analysis result.

Further, the slave device 202_a_, the slave device 202_b_, and the slave device 202_c_ constitute wireless LAN networks 901_a_, 901_b_, and 901_c_, respectively. The PC 2 is connected to any one of the wireless LAN networks 901_a_, 901_b_, and 901_c_, accesses the PLC 1_a_, acquires an analysis result and the like, and displays the analysis result and the like on the display portion 7.

Alternatively, the PC 2 may be connected to any one of the wireless LAN networks 901_a_, 901_b_, and 901_c_, access the PLC 1_b_, acquire real-time data, and display the real-time data on the display portion 7. The PC 2 may be connected to any one of the wireless LAN networks 901_a_, 901_b_, and 901_c_, access the PLC 1_b_, read and edit the ladder program, and transfer and write the ladder program to the PLC 1_b_ again. Further, the PC 2 may be connected to any one of the wireless LAN networks 901_a_, 901_b_, and 901_c_, access the PLC 1_b_, transmit a trial run command to the PLC 1_b_, and execute the debug processing of the ladder program.

Here, the network identification information (SSID) of the wireless LAN networks 901_a_, 901_b_, and 901_c_ may be common or may be different from each other. In a case where it is desired that the specific PC 2 access the specific slave device 202 (example: slave device 202_a_), only the specific SSID is set in the specific PC 2 and the specific slave device 202 (example: slave device 202_a_). As a result, the specific PC 2 can access only the specific slave device 202.

Figure 55:
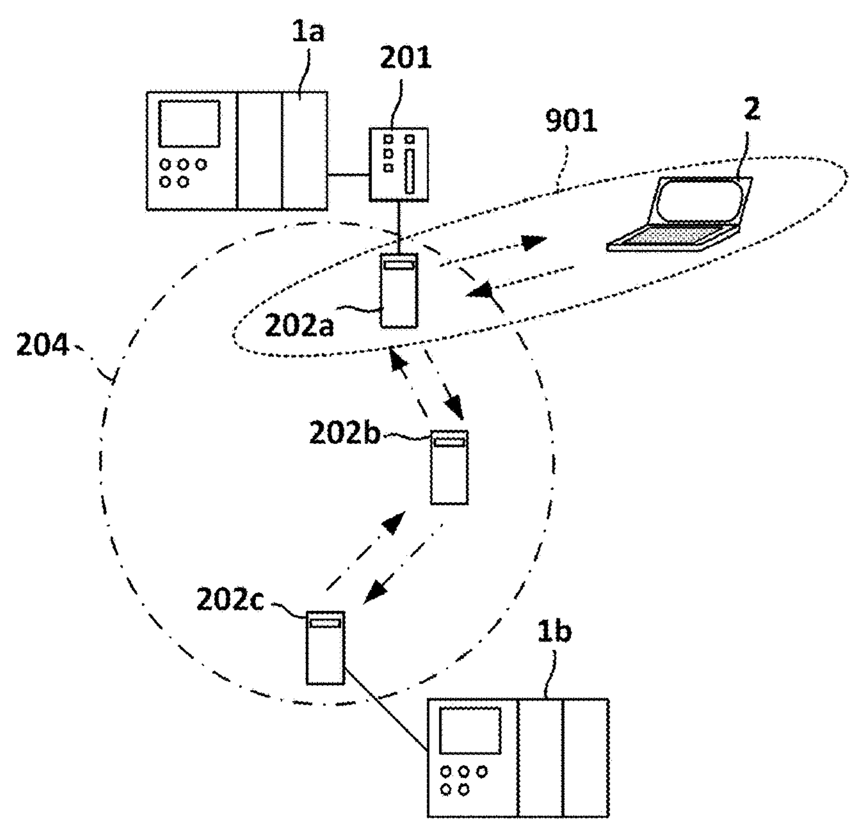
FIG. 55 is a diagram for explaining an example of construction of a plurality of wireless networks.

FIG. 55 is a diagram illustrating an example of construction of two types of wireless networks. In this example, the access point function of the slave device 202_a_ is set to ON (valid). The access point function of each of the slave device 202_b_ and the slave device 202_c_ is set to OFF (invalid). Therefore, only the slave device 202_a_ constructs the wireless LAN network 901. The PC 2 can access only the slave device 202_a_.

Figure 56:
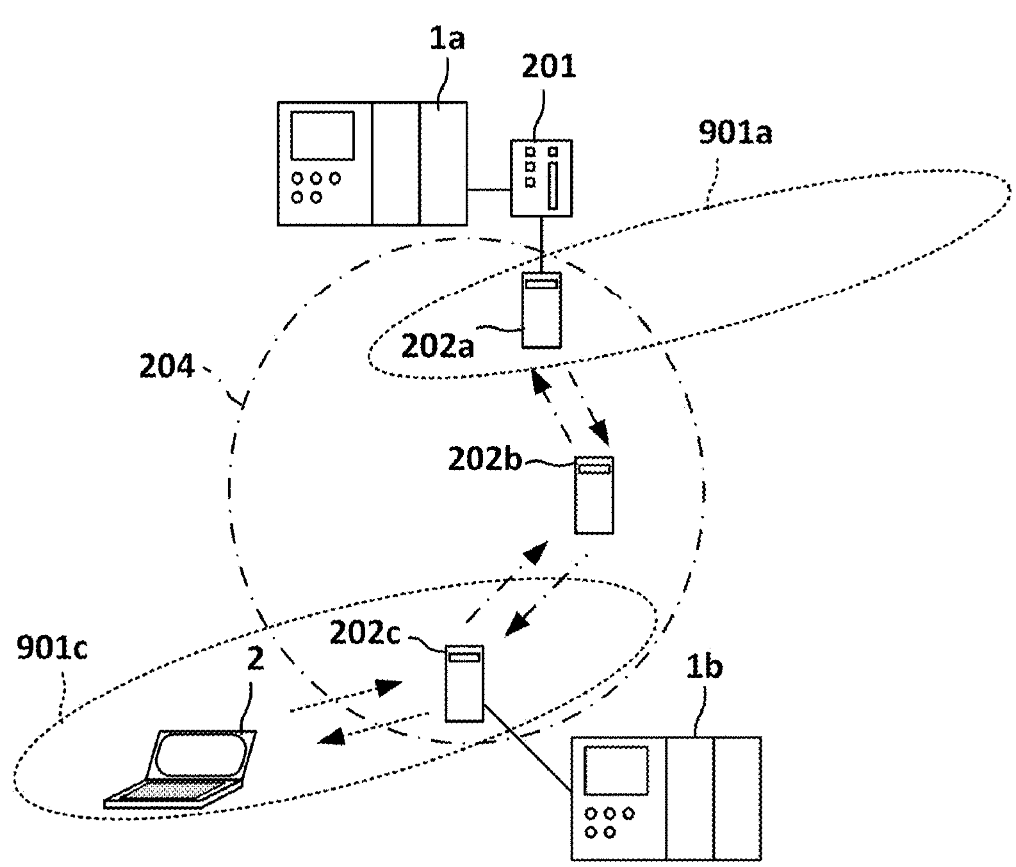
FIG. 56 is a diagram for explaining an example of construction of a plurality of wireless networks.

FIG. 56 is a diagram illustrating an example of construction of two types of wireless networks. In this example, the access point function of each of the slave device 202_a_ and the slave device 202_c_ is set to ON. The access point function of the slave device 202_b_ is set to OFF. The PC 2 exists near the slave device 202_c_, and the reception strength of the radio wave transmitted from the slave device 202_c_ is higher than the reception strength of the radio wave transmitted from the slave device 202_a_. Therefore, the PC 2 accesses the wireless LAN network 901_c_ constructed by the slave device 202_c_.

3. Setting UI

3-1. Common Setting UI

Figure 57:
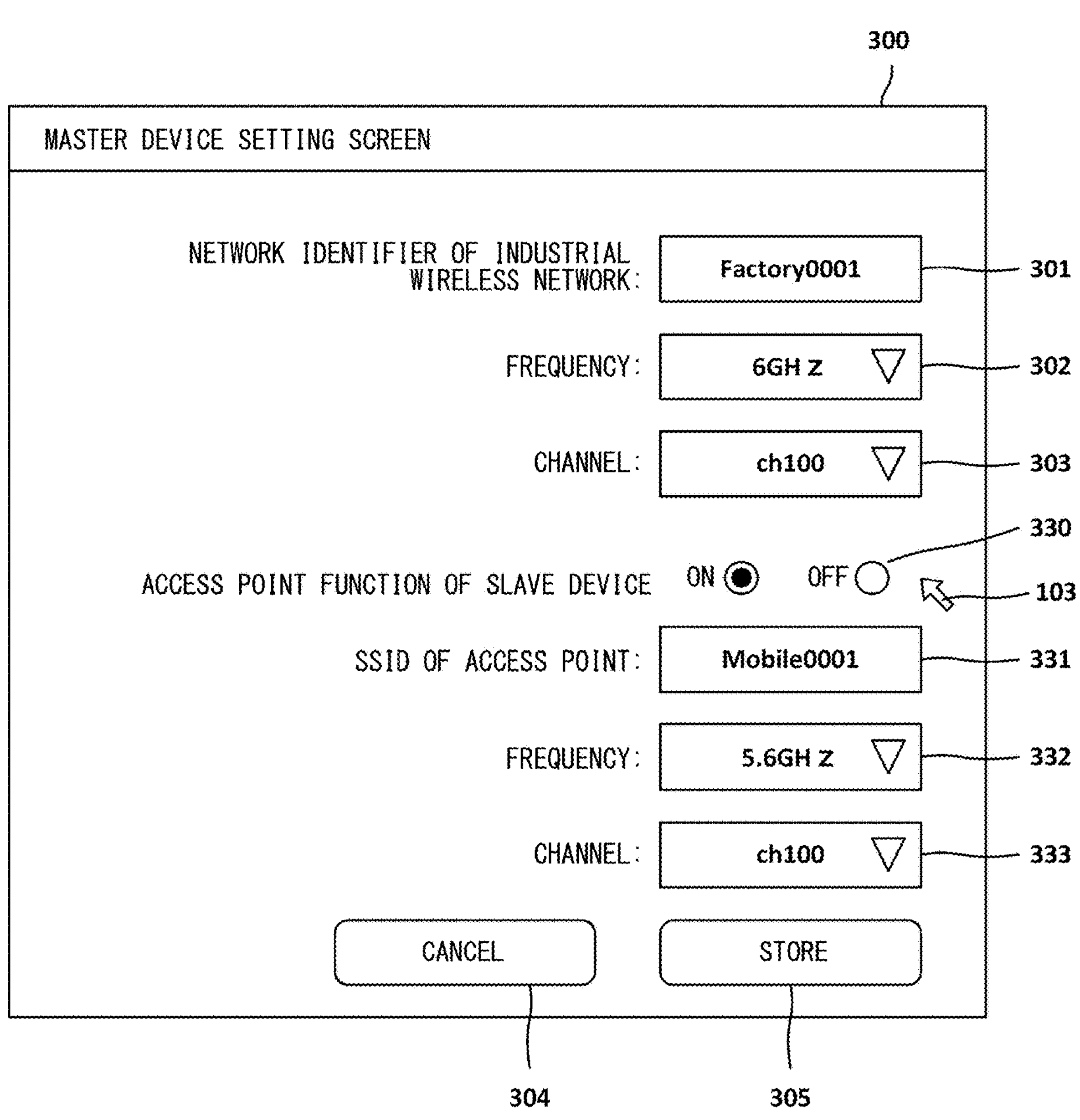
FIG. 57 is a diagram for explaining a setting screen of an access point.

FIG. 57 is an example of a setting screen 300 displayed on the display portion 7 of the PC 2. Note that the same reference numerals are given to the portions already described, and the description thereof is incorporated. The setting screen 300 is provided and displayed on the PC 2 by the screen providing portion 240. In addition, an input operation by the user on the setting screen 300 is received by a user input receiver 249.

In contrast to the setting screen 300 illustrated in FIG. 21, the setting screen 300 illustrated in FIG. 57 includes a switching portion 330 of an access point function, an SSID setting portion 331, a frequency setting portion 332, and a channel setting portion 333. In this example, it is assumed that the access point function is commonly set for all the slave devices 202 joining the industrial wireless network 204.

The switching portion 330 is a radio button for switching on/off of the access point function. When the switching portion 330 selects ON, the operations of the SSID setting portion 331, the frequency setting portion 332, and the channel setting portion 333 are enabled. When OFF is selected in the switching portion 330, the SSID setting portion 331, the frequency setting portion 332, and the channel setting portion 333 are grayed out, and the user may not be able to perform setting.

The SSID setting portion 331 is a text box that receives an input of the SSID of the wireless LAN network constructed by the access point function of the slave device 202. The frequency setting portion 332 is a menu for accepting selection of a frequency band of a wireless LAN network constructed by the access point function of the slave device 202. The channel setting portion 333 is a menu for accepting selection of a channel to be used in the wireless LAN network constructed by the access point function of the slave device 202.

The slave device management portion 231 writes the on/off of the access point function, the SSID, the frequency band (example: 2.4 GHz, 5 GHz (5.2 GHz, 5.3 GHz, 5.6 GHz), 6 GHz), and the channel input through the setting screen 300 in the setting information 254. As described above, all the setting information 254 registered in the slave device list 253 is transferred to and written in the slave device 202. Therefore, all the slave devices 202 construct the wireless LAN network 901 according to the setting information 254.

Although not illustrated in FIG. 57, an encryption key may also be received through the setting screen 300. Similarly, an encryption scheme may also be received through the setting screen 300.

3-2. Individual Setting UI

Figure 58:
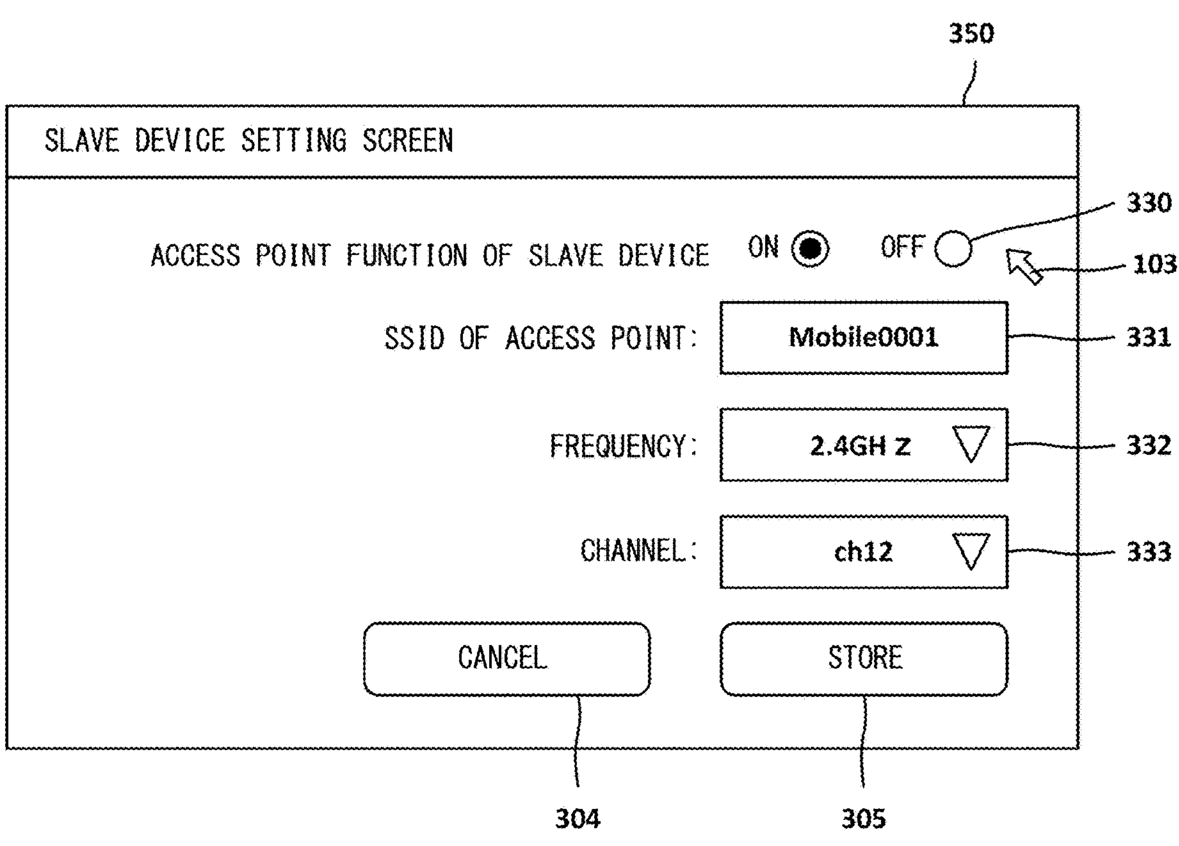
FIG. 58 is a diagram for explaining a setting screen of an access point.

FIG. 58 illustrates a slave device setting screen 350 individually provided by the slave device 202 joining the industrial wireless network 204 or provided by the setting screen management portion 238 of the master device 201. In the former case, the PC 2 accesses the slave device management portion 261 (example: Web browser) of the individual slave device 202 via the master device 201, receives the slave device setting screen 350 from the slave device 202, and displays the screen on the display portion 7. In the latter case, the PC 2 accesses the setting screen management portion 238 (such as a Web browser) of the master device 201, receives the slave device setting screen 350, and displays the slave device setting screen 350 on the display portion 7. When there are a plurality of slave devices 202, the setting screen management portion 238 may first cause the user to select one slave device 202 from the plurality of slave devices 202, and then provide the PC 2 with the slave device setting screen 350 for the selected slave device 202.

As described with reference to FIG. 57, the slave device setting screen 350 includes the switching portion 330 of the access point function, the SSID setting portion 331, the frequency setting portion 332, and the channel setting portion 333. The PC 2 may set the access point function of the slave device 202*a* to ON through the slave device setting screen 350, and may set the access point function of the slave devices 202*b* and 202*c* to OFF through the slave device setting screen 350. As a result, the wireless LAN network 901 illustrated in FIG. 55 is constructed.

Similarly, the PC 2 may set the access point functions of the slave device 202*a* and the slave device 202*c* to ON through the slave device setting screen 350, and may set the access point function of the slave device 202*b* to OFF through the slave device setting screen 350. Thus, the wireless LAN networks 901*a* and 901*b* illustrated in FIG. 56 are constructed.

Although not illustrated in FIG. 58, an encryption key may also be received through the setting screen 300. Similarly, an encryption scheme may also be received through the setting screen 300.

4. Reducing Number of Hops

In the industrial wireless network 204, it is desirable to achieve as low a delay as possible. Therefore, when the industrial wireless network 204 is constructed, the slave device management portion 231 of the master device 201 creates the next hop table so that the number of hops between the plurality of slave devices 202 is as small as possible.

The slave device management portion 231 of the master device 201 monitors whether each slave device 202 is lost by performing keep-alive on all the slave devices 202 registered in the slave device list 253. When detecting that any one of the slave devices 202 is lost, the slave device management portion 231 reconstructs the industrial wireless network 204. That is, the wireless communication path is reconstructed for each slave device 202.

Note that, in the industrial wireless network 204, the slave device 202 located in an upper layer may execute keep-alive for another slave device 202 located in a lower layer. When the network management portion 268 of the slave device 202 located in the upper layer detects the loss of another slave device 202 located in the lower layer, the master device 201 may be requested to reconstruct the industrial wireless network 204. As a result, the industrial wireless network 204 can recover from the wireless failure.

<Collection of Device Value and Collection of State Information>

1. Concept

Figure 59:
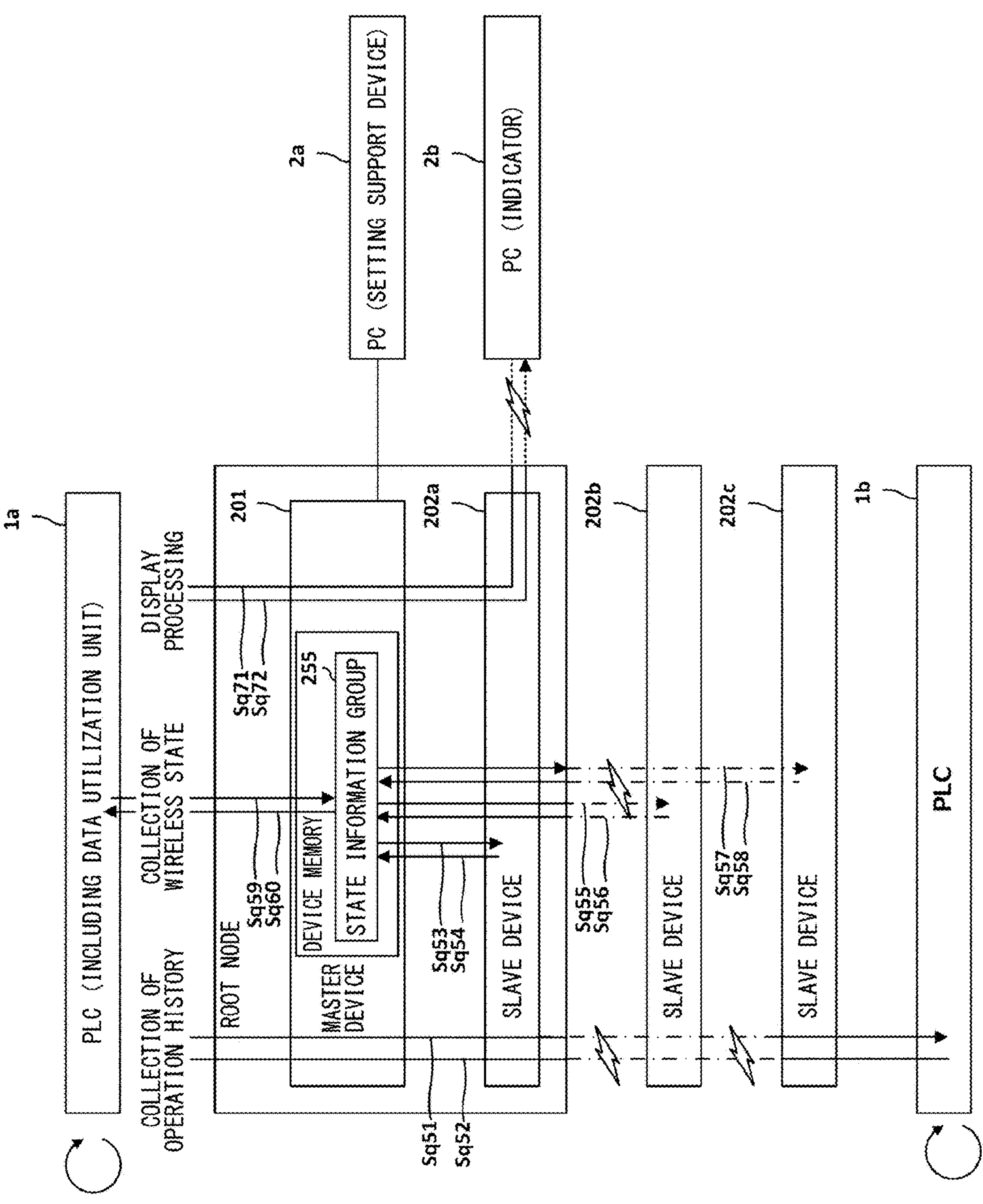
FIG. 59 is a diagram for explaining collection processing and display processing of an operation history of the PLC and an operation history of the wireless network.

FIG. 59 is a diagram for explaining collection processing of an operation history from the target device 203 such as the PLCs 1*a* and 1*b*, collection processing of state information indicating a wireless state from the slave device 202, and displaying of an analysis result in the industrial wireless system 200. As an example, the master device 201 and the slave device 202*a* form a root node. The PLC 1*a* includes a function of collecting device values and an analysis unit (data utilization unit) that executes analysis processing of the collected device values, and is wire-connected to the master device 201. The PLC 1*b* has a function of collecting device values, but may not include an analysis unit (data utilization unit) that executes analysis processing of the collected device values. Alternatively, the PLC 1*b* may not have a function of collecting device values. In any case, the device value of the PLC 1*b* is finally collected by the collection portion 72 of the PLC 1*a*.

A PC 2*a* is a setting support device that sets the PLCs 1*a* and 1*b*, the master device 201, and the slave device 202. A PC 2*b* is an indicator that displays an analysis result and the like. Therefore, the PC 2*b* may be a programmable indicator. The PC 2*a* and the PC 2*b* may be one PC 2. The PC 2*b* is wirelessly connected to the slave device 202*a* via the wireless LAN network 901*a*.

The slave devices 202*a*, 202*b*, and 202*c* constitute the industrial wireless network 204. The slave device 202*b* is a relay node, and in this example, an industrial device is not connected. The PLC 1*b*, which is an industrial device, is connected to the slave device 202*c*.

The PLC 1*a* collects the device value and the like in the PLC 1*a* according to the collection setting set by the PC 2*a*, and also collects the device value and the like from the PLC 1*b*. Further, the PLC 1*a* collects wireless states (individual state information 256) of the slave devices 202*a* to 202*c* via the master device 201. The collection processing of these states may be executed in parallel. As a result, the collection times are indirectly synchronized.

According to FIG. 59, in Sq51, the PLC 1*a* transmits a data request for a device value (such as an operation history) to be collected to the PLC 1*b*. The PLC 1*b* receives a data request from the PLC 1*a* through the industrial wireless network 204.

In Sq52, the PLC 1*b* transmits the operation history (example: device value) collected in the PLC 1*b* to the PLC 1*a* through the industrial wireless network 204. The PLC 1*a* stores the operation history (operation log 76) of each of the PLC 1*a* and the PLC 1*b* in the operation record storage portion 37.

When the PLC 1*a* and the PLC 1*b* construct the PLC link, the PLC 1*a* can directly collect a predetermined device value from the device memory of the PLC 1*b*. The device name in the PLC 1*a* and the device name in the PLC 1*b* are associated with each other by the PLC link, and the device value stored in the device in the PLC 1*b* is also stored in the specific device in the PLC 1*a*. This may be realized by refresh processing executed for each scan. That is, the device value stored in the first device in the PLC 1*a* and the device value stored in the second device in the PLC 1*b* are synchronized for each scan. The first device and the second device are associated with each other by a PLC link.

In Sq53, the master device 201 transmits a data request for the individual state information 256 to the slave device 202*a*. The slave device 202*a* receives the data request from the master device 201 via the wired connection.

In Sq54, the slave device 202*a* reads the individual state information 256 from its own storage device 221 and transmits the individual state information 256 to the master device 201. The master device 201 receives the individual state information 256 of the slave device 202*a*, and stores the individual state information 256 in a predetermined device (device memory) based on the memory map.

In Sq55, the master device 201 transmits a data request for the individual state information 256 to the slave device 202*b*. The slave device 202*b* receives the data request from the master device 201 via the industrial wireless network 204.

In Sq56, the slave device 202*b* reads the individual state information 256 from its own storage device 221 and transmits the individual state information 256 to the master device 201. The master device 201 receives the individual state information 256 of the slave device 202*b*, and stores the individual state information 256 in a predetermined device (device memory) based on the memory map.

In Sq57, the master device 201 transmits a data request for the individual state information 256 to the slave device 202*c*. The slave device 202*c* receives the data request from the master device 201 via the industrial wireless network 204.

In Sq58, the slave device 202*c* reads the individual state information 256 from its own storage device 221 and transmits the individual state information 256 to the master device 201. The master device 201 receives the individual state information 256 of the slave device 202*c*, and stores the individual state information 256 in a predetermined device (device memory) based on the memory map.

In Sq59, the PLC 1*a* transmits a data request for the state information group 255 to the master device 201. The master device 201 receives the data request from the PLC 1*a*.

In Sq60, the master device 201 reads the state information group 255 from the storage device 211 and transmits the state information group 255 to the PLC 1*a*. The PLC 1*a* receives the state information group 255 from the master device 201 and stores the received state information group 255 in the operation record storage portion 37.

Regarding Sq59 and Sq60, the CPU 31 of the PLC 1*a* may directly access the device memory in which the state information group 255 is stored in the storage device 211 of the master device 201. In this case, the CPU 31 can directly collect the state information group 255 from the storage device 211 of the master device 201. The collection portion 72 may access the device memory of the master device 201 through a PLC link.

The PLC 1*a* analyzes the collected operation record 74 (operation history) to create an analysis result 77. As a result, the analysis result can be provided to the PC 2*b* through the Web server 82.

In Sq71, the PC 2*b* or the programmable indicator accesses the slave device 202*a* via the wireless LAN network 901*a*, and transmits a data request (example: http request for requesting a Web page for displaying an analysis result) to the PLC 1*a*. The Web server 82 of the PLC 1*a* receives the data request from the PC 2*b*.

In Sq72, the Web server 82 of the PLC 1*a* transmits the display data corresponding to the data request to the PC 2*b*. The display data is transferred to the PC 2*b* via the master device 201, the slave device 202*a*, and the wireless LAN network 901*a*. When receiving the display data, the PC 2*b* displays the display data of the analysis result by the Web browser 60.

2. Flowchart

2-1. Setting Support Device

Figure 60:
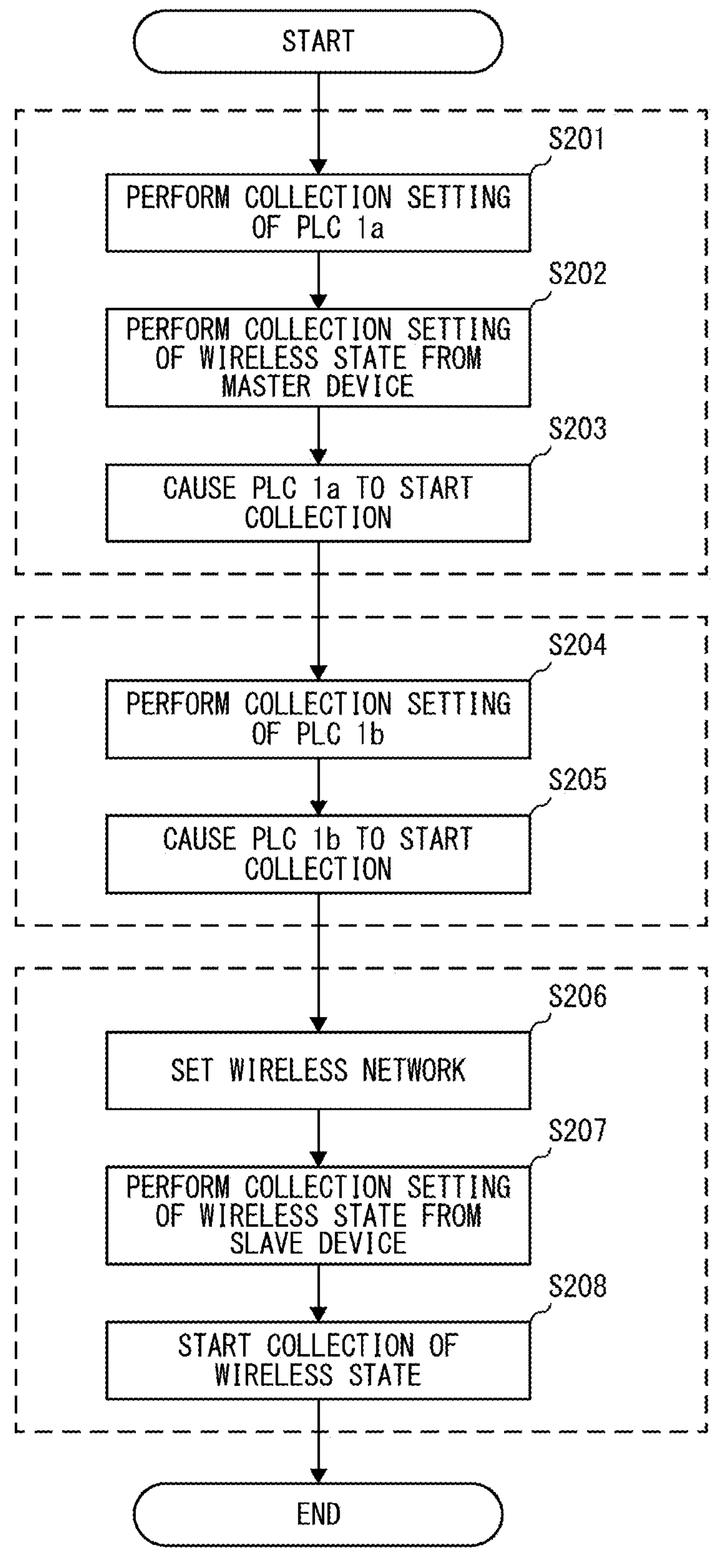
FIG. 60 is a flowchart for explaining collection setting of an operation history.

FIG. 60 illustrates setting processing in the PC 2*a* functioning as the setting support device. S201 to S203 indicate collection setting processing for the PLC 1*a*. S204 to S205 indicate collection setting processing for the PLC 1*b*. S206 and S207 indicate setting processing for the master device 201.

In S201, the CPU 11 executes the collection setting of the operation history in the PLC 1*a* according to the user instruction input from the operation portion 8. For example, a device value (device name) to be collected, a collection timing, and the like are set.

In S202, the CPU 11 executes the collection setting related to the collection of the wireless state from the master device 201 by the PLC 1*a* according to the user instruction input from the operation portion 8. With this setting, the timing and the like at which the PLC 1*a* collects the state information group 255 from the master device 201 are determined.

In S203, the CPU 11 transmits the collection setting to the PLC 1*a* to start the collection. As a result, the operation history in the PLC 1*a* and the wireless states of the slave devices 202*a* to 202*c* are collected.

In S204, the CPU 11 executes the collection setting of the operation history in the PLC 1*b* according to the user instruction input from the operation portion 8. A device value (device name) to be collected, a collection timing, and the like are set. As a result, the operation history is collected inside the PLC 1*b*.

In S205, the CPU 11 transmits the collection setting to the PLC 1*b* to start the collection.

In S206, the CPU 11 performs wireless network setting in accordance with a user instruction input from the operation portion 8. As a result, the setting information 254 for the industrial wireless network 204 and the wireless LAN network 901 is created.

In S207, the CPU 11 executes collection setting for the master device 201 to collect the wireless states (individual state information 256) from the slave devices 202*a* to 202*c* in accordance with a user instruction input from the operation portion 8. This collection setting is also stored in the setting information 254.

In S208, the CPU 11 causes the master device 201 to start wireless state collection. The master device 201 transfers the setting information 254 to the slave devices 202*a* and 202*b*, thereby constructing the industrial wireless network 204 and the wireless LAN network 901. Further, the master device 201 collects the wireless states (individual state information 256) from the slave devices 202*a* to 202*c* according to the collection setting included in the setting information 254. The master device 201 stores the individual state information 256 from the slave devices 202*a* to 202*c* in a predetermined device memory based on the memory map included in the collection setting.

2-2. Collection Processing of Operation History (Device Value) from PLC 1*b* by PLC 1*a*

Figure 61:
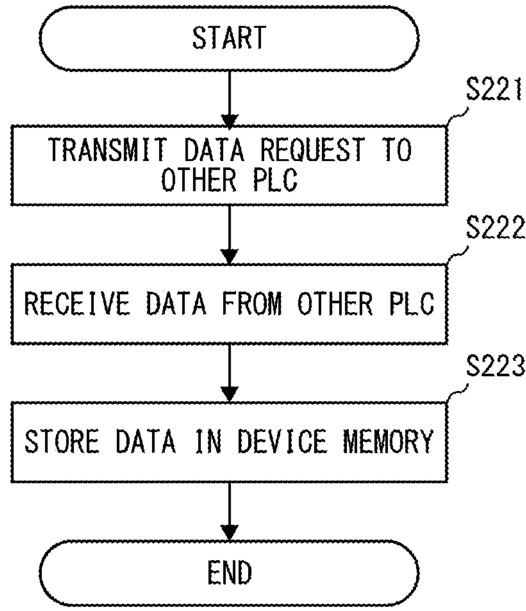
FIG. 61 is a flowchart for explaining collection processing of an operation history of another PLC.

FIG. 61 illustrates collection processing for data of the PLC 1*b* executed by the CPU 31 of the PLC 1*a*.

In S221, the CPU 31 (collection portion 72) of the PLC 1*a* transmits the data request of the operation history (device value) to the other PLC 1*b* according to the collection setting.

In S222, the CPU 31 (collection portion 72) of the PLC 1*a* receives data (operation history or device value) from the PLC 1*b*.

In S223, the CPU 31 (logger 73) of the PLC 1*a* stores the operation history (device value) of the PLC 1*b* in the device memory.

2-3. Data Request for Master Device

Figure 62:
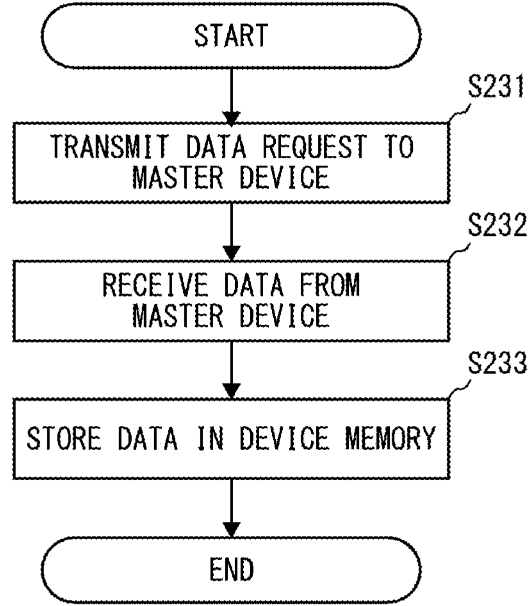
FIG. 62 is a flowchart for explaining collecting processing of an operation history of a wireless network.

FIG. 62 illustrates the collection processing of the wireless states executed by the CPU 31 of the PLC 1*a*. The collection processing illustrated in FIG. 61 and the collection processing illustrated in FIG. 62 may be executed in parallel.

In S231, the CPU 31 (collection portion 72) of the PLC 1*a* transmits a data request related to the state information group 255, which is an aggregate of the individual state information 256 about the slave devices 202*a* to 202*c*, to the master device 201 according to the collection setting.

In S232, the CPU 31 (collection portion 72) of the PLC 1*a* receives data (state information group 255) from the master device 201.

In S233, the CPU 31 (logger 73) of the PLC 1*a* stores the data (state information group 255) in the device memory (operation record storage portion 37) according to the collection setting.

2-4. Collection Processing of Individual State Information 256 by Master Device 201

Figure 63:
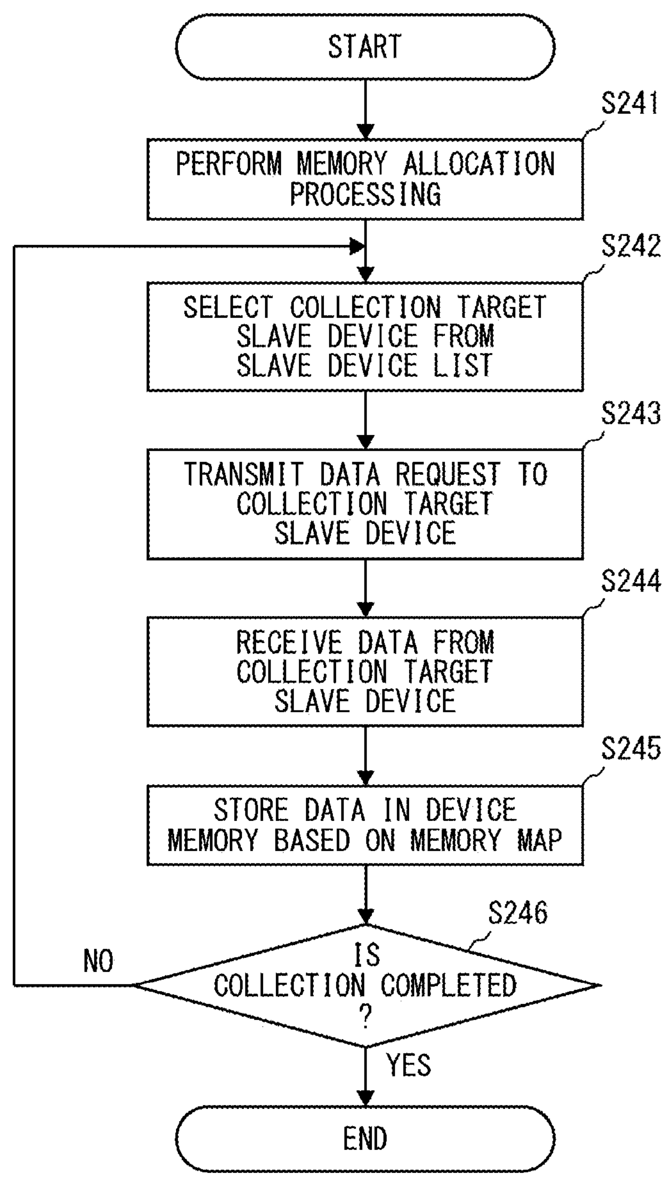
FIG. 63 is a flowchart for explaining collecting processing of state information by the master device.

FIG. 63 illustrates the collection processing executed by the CPU 210 of the master device 201.

In S241, the CPU 210 (memory allocation portion 248) allocates a memory (device memory) for storing the state information group 255 to the storage device 211 based on the memory map in the collection setting included in the setting information 254.

In S242, the CPU 210 (state collection portion 245) selects the slave device 202 to be collected from the plurality of slave devices 202*a* to 202*c* registered in the slave device list 253. This selection may be random or may be performed in accordance with the order of registration in the slave device list 253.

In S243, the CPU 210 (state collection portion 245) transmits a data request for the individual state information 256 to the slave device 202 to be collected.

In S244, the CPU 210 (state collection portion 245) receives data (individual state information 256) from the slave device 202 to be collected.

In S245, the CPU 210 (state collection portion 245) stores data (individual state information 256 of the slave device 202 to be collected) in the device memory based on the memory map.

In S246, the CPU 210 (state collection portion 245) determines whether data collection has been completed for all the slave devices 202*a* to 202*c* registered in the slave device list 253. If not, the CPU 210 returns to S242 and selects the next collection target slave device 202 from the slave device list 253. Hereinafter, the CPU 210 repeats S242 to S246. When the data collection is completed for all the slave devices 202*a* to 202*c*, the CPU 210 ends the collection processing.

2-5. Processing of Creating and Providing Display Data of Analysis Result by PLC 1*a*

Figure 64:
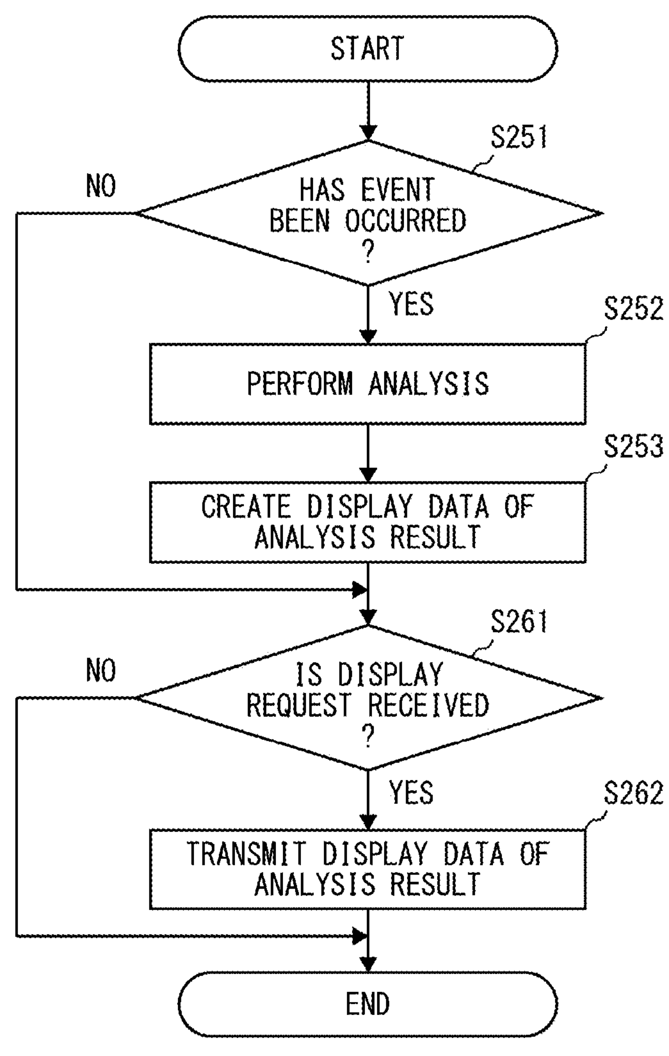
FIG. 64 is a flowchart for explaining analysis processing and display processing an operation history.

FIG. 64 illustrates creation processing and provision processing of the display data of the analysis result executed by the CPU 41*a* of the PLC 1*a*.

In S251, the CPU 41*a* (analyzer 83) determines whether a predetermined event (trouble) has occurred. This event is an event that triggers the start of analysis of the operation history (operation log 76). For example, the predetermined event may be a change of a device value of a predetermined relay device (1-bit device memory) from 0 to 1. When the predetermined event occurs, the CPU 41*a* proceeds from S251 to S252. When the predetermined event has not occurred, the CPU 41*a* proceeds from S251 to S261.

In S252, the CPU 41*a* (analyzer 83) analyzes the operation history (operation log 76) and creates the analysis result 77.

In S253, the CPU 41*a* (analyzer 83) creates display data (examples: HTML file, CSS file, scripts, image data) of the analysis result 77.

In S261, the CPU 41*a* (Web server 82) determines whether a request to display the analysis result has been received from the PC 2*b*. When the display request is received, the CPU 41*a* proceeds from S261 to S262. When the display request is not received, the CPU 41*a* ends the creation processing and the provision processing.

In S261, the CPU 41*a* (Web server 82) transmits the display data (examples: HTML file, CSS file, scripts, image data) of the analysis result 77 to the PC 2*b*. The Web browser 60 of the PC 2*b* displays the analysis result 77 based on the display data (examples: HTML file, CSS file, scripts, image data).

3. User Interface 3-1. Real-Time Monitoring

Figure 65:
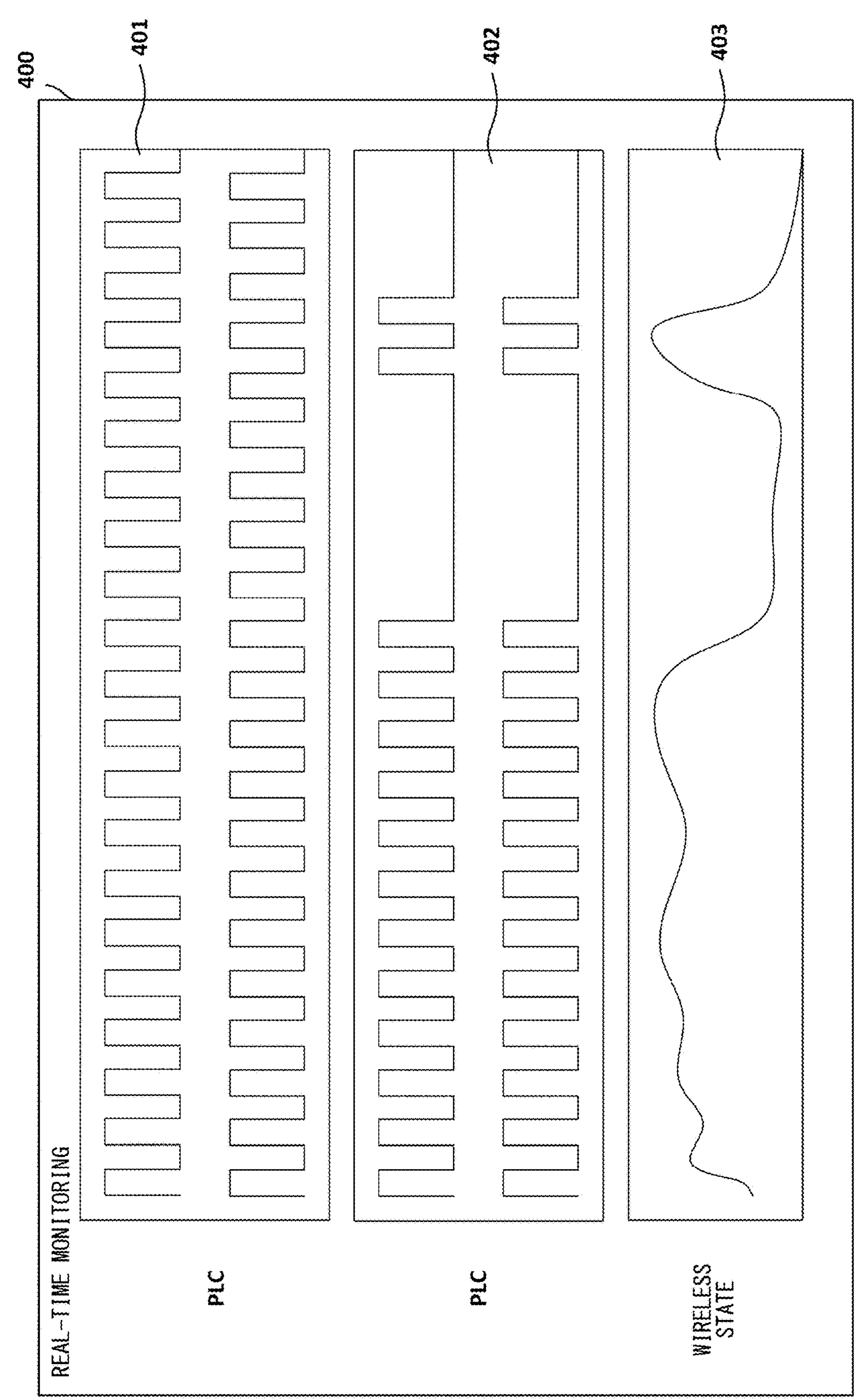
FIG. 65 is a diagram illustrating an example of a user interface for real-time monitoring.

FIG. 65 illustrates an example of real-time data displayed on the display portion 7 or displayed on the programmable indicator when the Web browser 60 executes the Web application 61. Here, the Web application 61 is assumed to be an application that realizes real-time monitoring of a device value and a wireless state.

A real-time monitoring UI 400 is a user interface provided by the Web application 61. A display area 401 displays a graph of device values (time-series data) acquired in real time in the PLC 1*a*. A display area 402 displays a graph of device values (time-series data) acquired in real time from the PLC 1*b* by the PLC 1*a*. A display area 403 is a display area for displaying a wireless state (state information group 255, time-series data) collected in real time by the master device 201.

Here, the device value and the wireless state selected as the display target are collected in real time from the PLC 1*a*, the PLC 1*b*, and the master device 201 by the collection portion 72 of the PLC 1*a*. Therefore, these device values and wireless states are substantially time synchronized.

The user can monitor a change in the device values in the PLC 1*a* and the PLC 1*b* and a change in the wireless states in the industrial wireless network 204 while matching them.

3-2. Analysis Report

Figure 66:
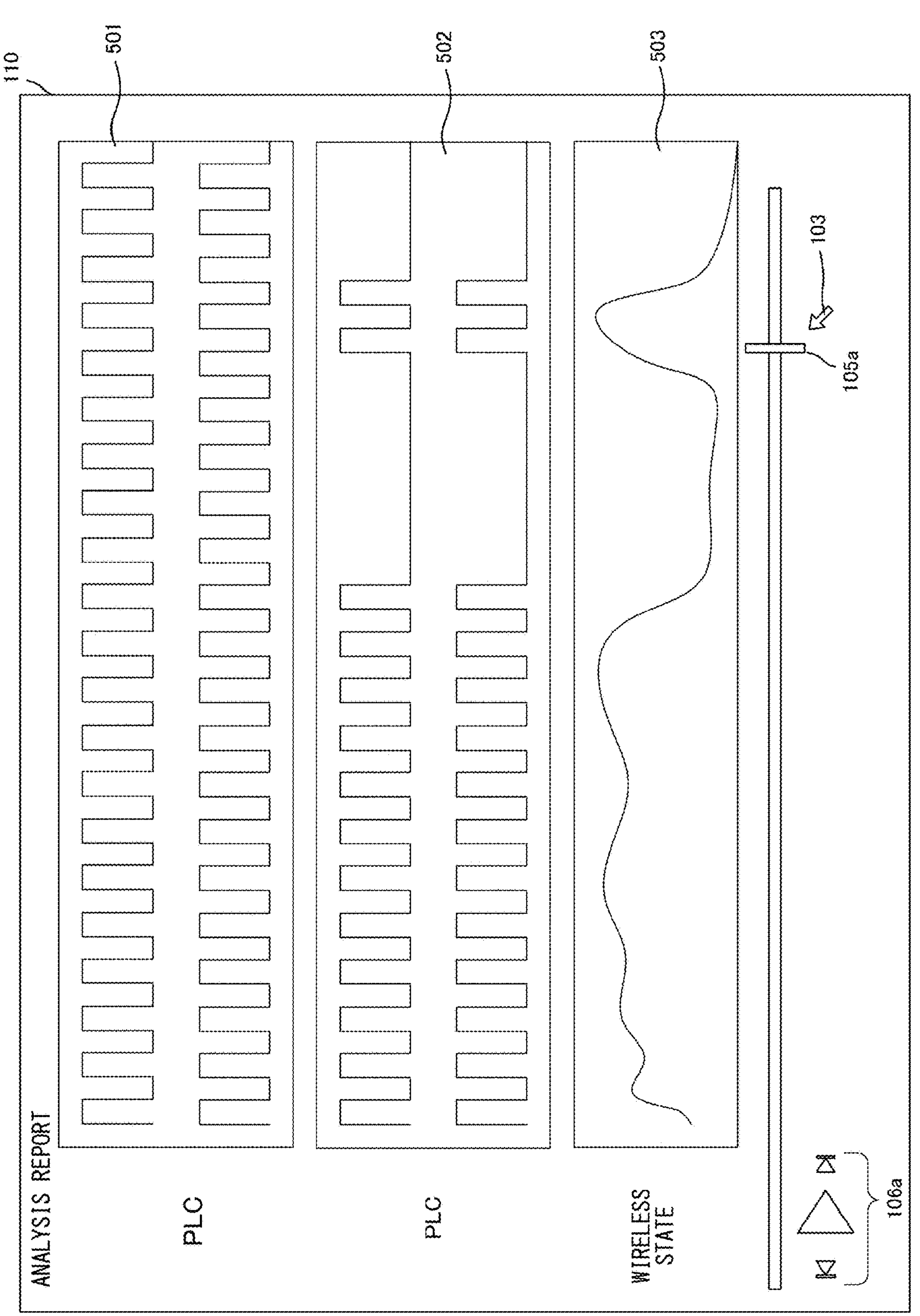
FIG. 66 is a diagram illustrating an example of a user interface for checking an analysis result.

FIG. 66 illustrates an analysis report 110 displayed on the display portion 7 when the Web browser 60 executes the Web application 61. Here, the Web application 61 is assumed to be an application that realizes provision of the analysis result of a device value and a wireless state.

In the analysis report 110, a display area 501 displays a graph of device values (time-series data) collected by the collection portion 72 in the PLC 1*a*. A display area 502 displays a graph of device values (time-series data) collected from the PLC 1*b* by the collection portion 72 of the PLC 1*a*. A display area 503 is a display area for displaying the wireless state (state information group 255, time-series data) collected from the master device 201 by the collection portion 72.

Since the device value and the wireless state are time-series data that can change with time, each device value and each wireless state are associated with time information indicating the collected time by the collection portion 72. The seek bar 105*a* indicates the device value and the reproduction time of the wireless state, and may be operated by the pointer 103 to designate the reproduction time. During reproduction of the operation record (operation history), the seek bar 105*a* moves from left to right in conjunction with the lapse of the reproduction time. A time designation portion 106*a* is a control object for advancing the reproduction time, returning the reproduction time, giving an instruction to start automatic reproduction, or giving an instruction to stop reproduction.

The user can examine a change in the device values in the PLC 1*a* and the PLC 1*b* and a change in the wireless states in the industrial wireless network 204 while matching them. For example, loss occurs in the device values collected from the PLC 1*b*, which is considered to be caused by failure in collection of the device values due to deterioration in wireless communication quality in the industrial wireless network 204. Such data loss caused by the industrial wireless network 204 cannot be identified by the user even by looking only at the device values collected from the PLC 1*b*. However, according to the present embodiment, it would be possible to specify data loss caused by the industrial wireless network 204.

<Technical Idea Derived from Examples>

[Viewpoint A1]

The slave device 202*a* and the master device 201 function as primary wireless nodes wire-connected to a first industrial device (example: PLCs 1, 1*a*) that collects data. The slave devices 202*b* to 202*f* are wire-connected to a second industrial device (examples: target devices 203*b* to 203*f*, PLC 1*b*) that transmits data to the first industrial device, and operate as one or more secondary wireless nodes wirelessly connected to the primary wireless node. The industrial wireless system 200 mediates data communication between the second industrial device that transmits data and the first industrial device that collects data.

The LAN ports 38*e* to 38*h* are examples of wired communication ports wire-connected to the first industrial device. The WLAN modules 223*a* to 223*c* are each an example of a first wireless communication port that wirelessly communicates with a mobile device (example: PC 2, programmable indicator) corresponding to the first industrial device. The WLAN modules 223*a* to 223*c* are an example of a second wireless communication port that wirelessly communicates with one or more secondary wireless nodes. The CPUs 210 and 220 function as a construction portion that constructs a first wireless network (example: wireless LAN network 901) for wireless communication between a mobile device connected via the first wireless communication port and the primary wireless node, and constructs a second wireless network (example: industrial wireless network 204) for wireless communication between one or more secondary wireless nodes connected via the second wireless communication port and the primary wireless node. The CPU 210, the LAN module 212, the CPU 220, and the communication management portions 235 and 265 function as transfer portions that transfer data transmitted from the second industrial device and received via one or more secondary wireless nodes, the second wireless network, and the second wireless communication port to the first industrial device via the wired communication port, and transfer monitoring information (example: individual state information 256, state information group 255, device value) of the second industrial device or the second wireless network transmitted from the first industrial device and received via the wired communication port to the mobile device via the first wireless communication port.

Here, a first radio frequency band (example: 2.4 GHz, 5 GHz) is used in the first wireless network. A second radio frequency band (example: 6 GHz) is used in the second wireless network. The second radio frequency band is a frequency band higher than the first radio frequency band.

As described above, congestion in the industrial wireless network 204 is reduced by constructing the industrial wireless network 204 with a radio frequency band having a wide bandwidth and less congestion among a plurality of radio frequency bands. Also, the mobile device may use another wireless network using another radio frequency band to obtain and display data from an industrial wireless system. The radio frequency band of the wireless network to which the mobile device connects is different from the radio frequency band of the industrial wireless network 204. Therefore, congestion in the industrial wireless network 204 is less likely to occur due to access by the mobile device. That is, it is possible to suppress a delay in data transfer in the industrial wireless system and to smoothly display data on the mobile device.

[Viewpoint A2]

The first radio frequency band may be a 2.4 GHz band, and the second radio frequency band may be a 5 GHz or 6 GHz band. The first radio frequency band may be a 5 GHz band and the second radio frequency band may be a 6 GHz band. Compared with mobile devices, the industrial devices need to transfer more data without delay. Thus, compared with mobile devices, the industrial devices use a wider bandwidth of radio frequency bands. As a result, it is possible to suppress a delay in data transfer in the industrial wireless system and to smoothly display data on the mobile device.

[Viewpoint A3]

The one or more secondary wireless nodes may include a first secondary wireless node (example: slave device 202*b*) in wireless communication with the primary wireless node and a tertiary wireless node (example: slave device 202*c*) in wireless communication with the first secondary wireless node and in communication with the primary wireless node via the first secondary wireless node.

[Viewpoint A4]

The first industrial device may be a programmable logic controller (example: PLC 1). The mobile device may be a mobile computer (example: PC 2) that displays data or monitoring information using a Web browser 60. Here, the monitoring information may be any of a device value of each industrial device, analysis information of the device value, a wireless communication state (example: reception strength of radio waves measured by the slave device 202, communication speed, signal-to-interference noise ratio), and the like.

[Viewpoint A5]

Each of the first industrial device and the second industrial device may be a programmable logic controller (example: PLCs 1*a*, 1*b*). The first industrial device and the second industrial device may construct a PLC link established across the primary wireless node and one or more secondary wireless nodes. The PLC link is a communication link that allows a plurality of PLCs to refer to device values. The user sets the device of the transfer source (example: IP address of the device), the name of the device value of the transfer source, the device of the transfer destination (example: IP address of the device), the name of the device value of the transfer destination, and the transfer timing (example: for each scan, for each constant cycle) in the PLCs 1*a* and 1*b* via the PC 2. Accordingly, the user can transfer the device value between the plurality of PLCs 1*a* and 1*b* without creating the ladder program for transfer. That is, the first industrial device and the second industrial device can transmit and receive data, which is a device value stored in a plurality of device memories as storage areas, at a predetermined cycle via the PLC link. The device value is data sensitive to delay, such as used to control the PLCs 1*a* and 1*b*. Therefore, it is necessary to reduce the delay in the industrial wireless network 204 in which the PLC link is constructed.

[Viewpoint A6]

The first industrial device may be a programmable logic controller, and the second industrial device may be a sensor (example: position sensor that detects arrival of a workpiece, etc.) or a programmable logic controller. The first industrial device may collect data from the second industrial device in real time. The mobile device may be a display device (example: PC 2, programmable indicator) that communicates with the first industrial device via the primary wireless node to display data collected from the second industrial device as a graph in chronological order. When a plurality of pieces of time-series data is plotted in a graph, data delay and loss tend to be problematic. For example, if a part of the time-series data is lost, a part of the graph is lost, and it becomes impossible to analyze an event in that section. Therefore, by separating the industrial wireless network 204 and the wireless LAN network 901, data delay in the industrial wireless network 204 is reduced, and data loss is less likely to occur. As a result, data is smoothly displayed on the mobile device.

[Viewpoint A7]

The first industrial device may be a programmable logic controller (example: PLC 1*a*), and the second industrial device may be a sensor or a programmable logic controller (example: PLC 1*b*). The mobile device may be a display device that collects data from the second industrial device in real time and displays the data collected from the second industrial device as a graph in chronological order. As illustrated in FIG. 52, the mobile device (example: PC 2, programmable indicator) may access the PLC 1*b* without using the PLC 1*a*, acquire data from the PLC 1*b*, and display the data as a graph.

[Viewpoint A8]

The first industrial device may be a programmable logic controller, and the mobile device may be an editing device that edits a ladder program (example: PC 2 on which the project editing portion 50 operates). The second industrial device may be a programmable logic controller (example: PLCs 1, 1*b*) that executes a ladder program. The mobile device (example: PC 2 that executes the debug portion 54) may execute debug processing of displaying data collected from the second industrial device in association with the ladder program (examples: FIG. 7, FIGS. 9 to 11). As described above, the PC 2 that edits and debugs the ladder program may access the PLC 1*b* to be debugged via the wireless LAN network 901 and the industrial wireless network 204.

[Viewpoint A9]

The first industrial device may be a programmable logic controller, and the second industrial device may be a sensor or a programmable logic controller. The first industrial device may include an analyzer (example: analyzer 83) that collects and analyzes data of the second industrial device in real time, a creation portion (example: CPU 41*a*, analyzer 83) that creates display information indicating an analysis result generated by the analyzer, and a server (example: Web server 82) that provides the display information to a mobile device operating as a client.

[Viewpoint A10]

The mobile device may have a Web browser 60. The Web server 82 provides the display information to the Web browser 60.

[Viewpoint A11]

The first industrial device (example: PLCs 1, 1*a*) may further collect state information (example: individual state information 256, state information group 255) indicating a communication state of the second wireless network established between the primary wireless node and one or more secondary wireless nodes, and provide the state information to the mobile device. As a result, the user can grasp the communication state of the industrial wireless network 204.

[Viewpoint A12]

The first wireless network may be a wireless LAN. The second wireless network may be a wireless mesh network.

[Viewpoint A13]

The construction portion (example: CPU 210, slave device management portion 231) constructs the second wireless network such that the number of hops between wireless nodes constructing the second wireless network is reduced. As a result, data delay in the industrial wireless network 204 is further reduced, and data display on the mobile device becomes smooth.

[Viewpoint A14]

The primary wireless node may include a network controller (example: master device 201) and a wireless node (example: slave device 202*a*) wire-connected to the network controller and wirelessly connected to one or more secondary wireless nodes and the mobile device. Such a primary wireless node may be referred to as a root node. Each of the one or more secondary wireless nodes includes a wireless node (example: slave device 202*b* to slave device 202*f*). That is, when the master device 201 is connected to the LAN port 38*i*, the slave device 202 operates as a root node (slave device 202*a*). When nothing is connected to the LAN port 38*i* or the PLC 1 or the like is connected, the slave device 202 operates as a normal wireless node (slave devices 202*b* to 202*f*).

The network controller is configured to distribute setting information (example: setting information 254) from the primary wireless node to each of the one or more secondary wireless nodes to set the wireless nodes to use the first radio frequency band in the first wireless network and the second radio frequency band in the second wireless network. As a result, since the user can save time and effort to individually set the plurality of slave devices 202*a* to 202*f*, usability regarding setting of the industrial wireless network 204 is improved.

[Viewpoint A15]

As illustrated in FIG. 54, each of the primary wireless node and the one or more secondary wireless nodes may operate as an access point to construct the first wireless network. The mobile device may switch from the first wireless network of the primary wireless node to the first wireless network of the one or more secondary wireless nodes and connect to the first industrial device via the one or more secondary wireless nodes and the primary wireless node. As illustrated in FIG. 54, each of the slave devices 202*a* to 202*c* can operate as an access point. In this case, the mobile device (PC 2, programmable indicator) selects and communicates with one slave device 202*a* having a good wireless state among the three slave devices 202*a* to 202*c*. When the reception strength of the radio wave transmitted from the slave device 202*a* decreases and the reception strength of the radio wave received from the slave device 202*b* increases, the mobile device may switch from the wireless LAN network 901*a* to the wireless LAN network 901*b* and connect to the slave device 202*b*. This can stabilize the wireless connection of the mobile device.

[Viewpoint A16]

The SSID of the first wireless network of the primary wireless node and the SSID of the first wireless network of one or more secondary wireless nodes may be common. This can allow the mobile device to maintain a seamless wireless connection. For example, it is possible to be easy to collectively set the plurality of slave devices 202*a* to 202*f* by the setting information 254.

[Viewpoint A17]

The SSID of the first wireless network of the primary wireless node and the SSID of the first wireless network of one or more secondary wireless nodes may be different. As a result, it is also possible to connect a specific mobile device only to a specific slave device 202.

[Viewpoint A18]

The one or more secondary wireless nodes may determine whether to construct their own first wireless network based on the setting information received from the primary wireless nodes. As illustrated in FIGS. 57 and 58, the network management portion 268 of each slave device 202 may turn on/off the access point function based on the setting information 254.

[Viewpoint A19]

The secondary wireless node (example: slave devices 202*b* to 202*f*) includes: a wired communication port (example: LAN port 38*i*) that is wire-connected to the second industrial device; a first wireless communication port (example: WLAN modules 223*a* to 223*c*) that wirelessly communicates with a mobile device corresponding to the first industrial device in the first wireless network; a second wireless communication port (example: WLAN modules 223*a* to 223*c*) that is wirelessly communicates with the primary wireless node in the second wireless network; and a transfer portion (example: CPU 220) that transfers data transmitted from the second industrial device to the first industrial device via the second wireless communication port, the second wireless network, and the primary wireless node and transfers monitoring information of the second industrial device or the second wireless network, which is transmitted from the first industrial device and received via the primary wireless node, the second wireless network, and the second wireless communication port, to a mobile device via the first wireless communication port. A first radio frequency band is used in the first wireless network, a second radio frequency band is used in the second wireless network, and the second radio frequency band may be a higher frequency band than the first radio frequency band.

[Viewpoint A20]

The first radio frequency band may be a 2.4 GHz band or a 5 GHz band. The second radio frequency band may be a 6 GHz band.

[Viewpoint A21]

The secondary wireless node (example: slave device 202*c*) may communicate with the primary wireless node (example: master device 201, slave device 202*a*) via a relay node (example: slave device 202*b*).

[Viewpoint A22]

The industrial wireless system 200 includes a primary wireless node (example: slave device 202*a*) wire-connected to the first industrial device, a secondary wireless node (example: slave device 202*b*) wirelessly connected to the primary wireless node, and a tertiary wireless node (example: slave device 202*c*) wireless connected to the secondary wireless node, and may transfer data transmitted and received between the first industrial device and the second industrial device wire-connected to the secondary wireless node or the tertiary wireless node.

The primary wireless node includes a first wired communication port that is wire-connected to the first industrial device, a first wireless communication port that is wirelessly communicable with the mobile device corresponding to the first industrial device in a first radio frequency band, and a second wireless communication port that wirelessly communicates with the secondary wireless node in a second radio frequency band higher than the first radio frequency band. The secondary wireless node includes a second wired communication port that is wire-connectable to the second industrial device, a third wireless communication port that is wirelessly communicable with the mobile device in the first radio frequency band, and a fourth wireless communication port that wirelessly communicates with the primary wireless node and the tertiary wireless node in the second radio frequency band. The tertiary wireless node includes a third wired communication port that is wire-connectable to the second industrial device, a fifth wireless communication port that is wirelessly communicable with the mobile device in the first radio frequency band, and a sixth wireless communication port that wirelessly communicates with the secondary wireless node in the second radio frequency band.

The primary, secondary, or tertiary wireless nodes construct a first wireless network (example: wireless LAN network 901) that relays data communications performed between the first industrial device and the mobile device. The primary, secondary, and tertiary wireless nodes construct a second wireless communication network (example: industrial wireless network 204) to relay data communications between the first industrial device and the second industrial device. The mobile device wirelessly connects to one of the primary wireless nodes, the secondary wireless node, or the tertiary wireless node via the first wireless network. The mobile device may be configured to display data collected by the first industrial device from the second industrial device and state information indicating a communication state for the second wireless communication network collected from the primary, secondary and tertiary wireless nodes.

[Viewpoint A23]

The primary wireless node may have a wireless unit (example: slave device 202*a*) having a first wireless communication port and a second wireless communication port, and a controller unit (example: master device 201) that controls the primary wireless node, the secondary wireless node, and the tertiary wireless node and is accommodated in a housing independent of the housing of the wireless unit. The controller unit (example: master device 201) has a first wired communication port and a fourth wired communication port wire-connected to the wireless unit of the primary wireless node. The wireless unit (example: slave device 202*a*) has a fifth wired communication port wire-connected to the fourth wired communication port of the controller unit.

[Viewpoint B1]

The master device 201 and the slave device 202*a* are an example of a root node that is a wireless node wire-connected to a first industrial device (example: PLCs 1, 1*a*) that collects data. The slave devices 202*b* to 202*f* are examples of peripheral wireless nodes that are wireless nodes wire-connected to a second industrial device (example: PLC 1*b*) that sends data to the first industrial device. The industrial wireless system 200 mediates data communication between the second industrial device that transmits data and the first industrial device that collects data.

The CPUs 210 and 220 and the network construction portion 269 function as a construction portion that constructs a wireless network including at least a root node wire-connected to a first industrial device that collects data and a peripheral wireless node wire-connected to a second industrial device that sends data toward the first industrial device. The measurement portion 270 functions as a first measurement portion that measures a state related to wireless communication for the root node and generates state information indicating the state related to wireless communication. The CPU 210 and the state collection portion 245 functions as a collection portion that repeatedly collects state information generated by a first measurement portion (example: measurement portion 270 of the slave device 202*a*) and state information indicating a state related to the wireless communication for peripheral wireless nodes measured by the second measurement portion (example: measurement portion 270 of the slave devices 202*b* to 202*f*) provided in the peripheral wireless nodes, and stores the information in a memory (example: a storage area accessible from the PLC 1 in the storage device 211. A storage area (device memory) allocated in the storage device 211 by the memory allocation portion 248 based on a memory map) through which the state information is accessible from the first industrial device. The slave device 202*a*, the CPU 220, and the WLAN modules 223*a* to 223*c* function as a wireless communication portion that communicates with the peripheral wireless nodes via the wireless network constructed by the construction portion, and receives data (example: data and state information of second industrial device) of the peripheral wireless nodes. The LAN ports 38*d* to 38*h* function as a wired communication portion that transfers the data of the second industrial device received by the wireless communication portion to the first industrial device via the wireless network constructed by the construction portion and transmits the state information stored in the memory to the first industrial device.

According to Viewpoint B1, the state information on the wireless network is stored in the memory accessible from the first industrial device that collects data of the second industrial device. As a result, an industrial device that collects data on other industrial devices can also collect state information on a wireless network.

[Viewpoint B2]

The first industrial device (example: PLC 1*a*) and the second industrial device (example: PLC 1*b*) may construct a PLC link via a wireless network. The first industrial device and the second industrial device transmit and receive data, which is a device value stored in a plurality of device memories as storage areas, via the PLC link at a predetermined cycle (example: scan cycle). The PLC 1 repeatedly executes the ladder program. The time required to execute the ladder program once is referred to as a scan cycle, and is not necessarily a constant cycle. The base unit 3 and the extension unit 4 constituting the PLC 1 have a mechanism for exchanging control data and the like with each other using a logically shared device memory. The PLC link is obtained by extending this mechanism among a plurality of PLCs, and data (device value) can be shared among the plurality of PLCs by constructing a correspondence relationship between a device memory (device name) of one PLC and a device memory (device name) of the other PLC in advance. In Viewpoint B2, the PLC link is constructed through the wireless network. The PLC link may also be applied between the PLCs 1 and 1*a* and the master device 201. This means that the state information is stored in the device memory and is shared between the PLCs 1 and 1*a* and the master device 201. In this way, by using the device memory through the PLC link, the PLCs 1 and 1*a* can substantially access a part of the storage device 211 of the master device 201.

[Viewpoint B3]

The first industrial device may specify an event expected to occur in the second industrial device by analyzing the device value of the second industrial device. This would allow for monitoring a sign of a particular event. The analyzer 83 of the PLC 1*a* can specify an event that has occurred in the PLC 1*b* or an event that is expected to occur in the PLC 1*b* in the future by analyzing the operation log 76 acquired from the PLC 1*b*. For example, when the shift amount of the position of the workpiece conveyed on the manufacturing line gradually increases, the analyzer 83 can predict that a positioning error of the workpiece occurs. In addition, the shift amount between the timing at which the workpiece conveyed on the manufacturing line arrives at the processing device and the defined timing may gradually increase. In this case, the analyzer 83 can predict that a conveyance error in which the workpiece does not arrive by the processing start timing of the processing device occurs. As described above, the shift amount exceeding the threshold can be said to be a sign of a conveyance error.

[Viewpoint B4]

The first industrial device may be a programmable logic controller (example: PLC 1*a*), and the second industrial device may be a programmable logic controller (example: PLC 1*b*) or a sensor (example: field device, workpiece detection sensor). The CPU 41*a* and the analyzer 83 function as an analyzer that collects and analyzes data of the second industrial device in real time. The CPU 41*a* and the analyzer 83 may function as a creation portion that creates display information indicating an analysis result. The Web server 82 functions as a server that provides display information to a client terminal (example: PCs 2, 2*b*).

[Viewpoint B5]

The analyzer 83 may further analyze the state information generated by the first measurement portion and the state information measured by the second measurement portion provided in the peripheral wireless node. For example, in a case where the reception strength of the radio wave transmitted by the slave device 202*c* and received by the slave device 202*b* is less than a warning threshold, the analyzer 83 may analyze that the wireless communication performance between the slave device 202*b* and the slave device 202*c* is deteriorated and some countermeasure is necessary. For example, the analyzer 83 may determine, as a countermeasure, to bring the slave device 202*b* and the slave device 202*c* close to each other or to remove radio wave shielding objects between the slave device 202*b* and the slave device 202*c* to secure visibility.

[Viewpoint B6]

The client terminal (example: PC 2, PC 2*b*, programmable indicator) may display data (example: device value) of the second industrial device and state information (example: reception strength of radio wave, radio wave use rate, and communication speed) as a graph in chronological order. As a result, the user can discriminate whether the wireless state of the wireless network has affected the event that has occurred in the second industrial device.

[Viewpoint B7]

The client terminal (example: PC 2, PC 2*b*, programmable indicator) may be an indicator of the first industrial device or the second industrial device. Generally, in a manufacturing line, a programmable indicator that displays a device value in real time is installed in order to grasp an operation state of the PLC 1. Since the display portion of the PLC 1 is small and thus has poor visibility, the device value is displayed on a larger programmable indicator. As a result, the user can monitor the state of the PLC 1 in real time. The operation history or the real-time data of the industrial device and the operation history or the real-time data of the wireless network may be displayed on the programmable indicator. The programmable indicator may be replaced with the PCs 2 and 2*b* equipped with the Web browser 60.

[Viewpoint B8]

The server may be a Web server 82. The client terminal (example: PC 2, PC 2*b*, programmable indicator) may be a computer that executes the Web browser 60 that displays the display information provided from the Web server 82.

[Viewpoint B9]

The client terminal (examples: PC 2, PC 2*a*) may be a programming support device that supports editing by a user of a user program (example: ladder program) executed by the first industrial device and the second industrial device. Note that the user program (example: ladder program) is transferred to and stored in the project storage portion 35, and is executed by the CPU 31.

[Viewpoint B10]

As illustrated in FIG. 54 and the like, the root node or the peripheral wireless node may include an access point that constructs a wireless LAN (example: wireless LAN networks 901*a* to 901*c*). The first industrial device may transmit display information for displaying the state information and the analysis result of the data to a wireless LAN terminal (example: PC 2) connected to the first industrial device via an access point (example: WLAN module 223*a* of the slave device 202*a*). As a result, the user can visually recognize the analysis result and the display information by the wireless LAN terminal.

[Viewpoint B11]

The display information may be information (examples: HTML file, CSS file, scripts, image data) for causing a display device (example: display portion 7) of the wireless LAN terminal to display the state information and the analysis result of the data in chronological order.

[Viewpoint B12]

The wireless LAN terminal may include a program editing assistance device (examples: the PC 2 and the PC 2*a* on which the project editing program 14*a* is operated) that assists the user in editing the user program executed by at least one of the first industrial device and the second industrial device. As described above, the program editing assistance device is also a wireless LAN terminal, thereby improving the degree of freedom in installation of the program editing assistance device.

[Viewpoint B13]

The wireless LAN terminal includes a display device that displays data collected from the second industrial device in real time. As described above, the programmable indicator is also a wireless LAN terminal, thereby improving the degree of freedom in installation of the programmable indicator.

[Viewpoint B14]

The CPUs 210 and 220 and the network construction portion 269 operates as a construction portion that constructs a wireless network including at least a root node wire-connected to a first industrial device that collects data and a peripheral wireless node wire-connected to a second industrial device that sends data toward the first industrial device. The measurement portion 270 operates as a first measurement portion that measures a state related to wireless communication for the root node and generates state information indicating the state related to wireless communication. The state collection portion 245 operates as a collection portion that repeatedly collects the state information generated by the first measurement portion and the state information indicating the state related to the wireless communication with respect to the peripheral wireless node measured by the second measurement portion provided in the peripheral wireless node. The storage device 211 stores state information and operates as a memory accessible from the first industrial device. The WLAN modules 223*a* to 223*c* operate as a wireless communication portion that communicates with the peripheral wireless nodes via the wireless network constructed by the construction portion, and receives data of the peripheral wireless nodes. The LAN module 222 and the LAN port 38*i* of the slave device 202*a* and the LAN module 212 and the LAN ports 38*d* to 38*h* of the master device 201 operate as a wired communication portion that transfers the data of the second industrial device received by the wireless communication portion to the first industrial device via the wireless network constructed by the construction portion and transmits the state information, which is stored in the memory accessed by the first industrial device, to the first industrial device.

[Viewpoint B15]

The PLCs 1 and 1*a* operate as programmable logic controllers connected to an industrial wireless system. The CPU 31 operates as a program execution portion that repeatedly executes the user program. The device portion 34 operates as a device storage portion including a plurality of devices which are storage areas used in the user program executed by the program execution portion. The communication portion 33 and the LAN port 38*a* operate as wired communication ports wire-connected to a root node for constructing a wireless network in an industrial wireless system. The collection portion 72 and the logger 73 operate as an acquisition portion that acquires the log data of the industrial device from the industrial device connected to the programmable logic controller via the wired communication port and the wireless network, and acquires the state information indicating the state related to the wireless network acquired by the root node and the wireless node joining the wireless network and collected by the root node. The analyzer 83 operates as a creation portion that creates log data (example: operation log 76) or display information (examples: HTML file, CSS file, image data, scripts) that displays an analysis result of the log data and the state information. The Web server 82 operates as a server that provides the display information to the client terminal.

What is claimed is:

1. A primary wireless node in an industrial wireless system that includes at least the primary wireless node wire-connected to a first industrial device that collects data and one or more secondary wireless nodes wire-connected to a second industrial device that sends the data toward the first industrial device and wirelessly connected to the primary wireless node, and mediates data communication between the second industrial device that sends the data and the first industrial device that collects the data, the primary wireless node comprising:

a wired communication port that is wire-connected to the first industrial device;

a first wireless communication port that wirelessly communicates with a mobile device corresponding to the first industrial device;

a second wireless communication port that wirelessly communicates with the one or more secondary wireless nodes;

a construction portion that constructs a first wireless network for wireless communication between the mobile device connected via the first wireless communication port and the primary wireless node, and constructs a second wireless network for wireless communication between the one or more secondary wireless nodes connected via the second wireless communication port and the primary wireless node; and a transfer portion that transfers data transmitted from the second industrial device and received via the one or more secondary wireless nodes, the second wireless network, and the second wireless communication port to the first industrial device via the wired communication port, and transfers monitoring information of the second industrial device or the second wireless network transmitted from the first industrial device and received via the wired communication port to the mobile device via the first wireless communication port, wherein a first radio frequency band is used in the first wireless network, a second radio frequency band is used in the second wireless network, and the second radio frequency band is a higher frequency band than the first radio frequency band.

2. The primary wireless node according to claim 1, wherein the first radio frequency band is a 2.4 GHz band or a 5 GHz band, and the second radio frequency band is a 6 GHz band.

3. The primary wireless node according to claim 1, wherein the one or more secondary wireless nodes include:

a first secondary wireless node in wireless communication with the primary wireless node; and a tertiary wireless node in wireless communication with the first secondary wireless node and in communication with the primary wireless node via the first secondary wireless node.

4. The primary wireless node according to claim 1, wherein the first industrial device is a programmable logic controller, and the mobile device is a mobile computer that displays the data or the monitoring information using a Web browser.

5. The primary wireless node according to claim 1, wherein each of the first industrial device and the second industrial device is a programmable logic controller, the first industrial device and the second industrial device construct a PLC link established across the primary wireless node and the one or more secondary wireless nodes, and the first industrial device and the second industrial device transmit and receive the data, which is a device value stored in a plurality of device memories as storage areas, via the PLC link at a predetermined cycle.

6. The primary wireless node according to claim 1, wherein the first industrial device is a programmable logic controller, the second industrial device is a sensor or a programmable logic controller, the first industrial device collects data from the second industrial device in real time, and the mobile device is a display device that communicates with the first industrial device via the primary wireless node and displays data collected from the second industrial device as a graph in chronological order.

7. The primary wireless node according to claim 1, wherein the first industrial device is a programmable logic controller, the second industrial device is a sensor or a programmable logic controller, and the mobile device is a display device that collects data from the second industrial device in real time and displays data collected from the second industrial device as a graph in chronological order.

8. The primary wireless node according to claim 1, wherein the first industrial device is a programmable logic controller, the mobile device is an editing device that edits a ladder program, the second industrial device is a programmable logic controller that executes the ladder program, and the mobile device executes debug processing of displaying data collected from the second industrial device in association with the ladder program.

9. The primary wireless node according to claim 1, wherein the first industrial device is a programmable logic controller, the second industrial device is a sensor or a programmable logic controller, the first industrial device includes:

an analyzer that collects and analyzes the data of the second industrial device in real time;

a creation portion that creates display information indicating an analysis result generated by the analyzer; and a server that provides the display information to the mobile device operating as a client.

10. The primary wireless node according to claim 9, wherein the server includes a Web server, the mobile device includes a Web browser, and the Web server provides the display information to the Web browser.

11. The primary wireless node according to claim 1, wherein the first industrial device further collects state information indicating a communication state of the second wireless network established between the primary wireless node and the one or more secondary wireless nodes, and provides the state information to the mobile device.

12. The primary wireless node according to claim 1, wherein the first wireless network is a wireless LAN, and the second wireless network is a wireless mesh network.

13. The primary wireless node according to claim 1, wherein the construction portion constructs the second wireless network such that a number of hops between wireless nodes constructing the second wireless network is reduced.

14. The primary wireless node according to claim 13, wherein the primary wireless node includes a network controller and a wireless node that is wire-connected to the network controller and wirelessly connected to the one or more secondary wireless nodes and the mobile device, each of the one or more secondary wireless nodes includes a wireless node, and the network controller is configured to distribute setting information from the primary wireless node to each of the one or more secondary wireless nodes to set the wireless nodes to use the first radio frequency band in the first wireless network and the second radio frequency band in the second wireless network.

15. The primary wireless node according to claim 1, wherein the primary wireless node and the one or more secondary wireless nodes each operate as an access point to construct the first wireless network, and the mobile device switches from the first wireless network of the primary wireless node to the first wireless network of the one or more secondary wireless nodes and connects to the first industrial device via the one or more secondary wireless nodes and the primary wireless node.

16. The primary wireless node according to claim 15, wherein an SSID of the first wireless network of the primary wireless node and an SSID of the first wireless network of the one or more secondary wireless nodes are common.

17. The primary wireless node according to claim 15, wherein an SSID of the first wireless network of the primary wireless node and an SSID of the first wireless network of the one or more secondary wireless nodes are different.

18. The primary wireless node according to claim 15, wherein the one or more secondary wireless nodes determine whether to construct the own first wireless network based on setting information received from the primary wireless node.

19. A secondary wireless node in an industrial wireless system that includes at least a primary wireless node wire-connected to a first industrial device that collects data and a secondary wireless node wire-connected to a second industrial device that sends the data toward the first industrial device and wirelessly connected to the primary wireless node, and mediates data communication between the second industrial device that sends the data and the first industrial device that collects the data, the secondary wireless node comprising:

a wired communication port that is wire-connected to the second industrial device;

a first wireless communication port that wirelessly communicates with a mobile device corresponding to the first industrial device in a first wireless network;

a second wireless communication port that wirelessly communicates with the primary wireless node in a second wireless network; and a transfer portion that transfers data transmitted from the second industrial device to the first industrial device via the second wireless communication port, the second wireless network, and the primary wireless node, and transfers monitoring information of the second industrial device or the second wireless network transmitted from the first industrial device and received via the primary wireless node, the second wireless network, and the second wireless communication port to the mobile device via the first wireless communication port, wherein a first radio frequency band is used in the first wireless network, a second radio frequency band is used in the second wireless network, and the second radio frequency band is a higher frequency band than the first radio frequency band.

20. The secondary wireless node according to claim 19, wherein the first radio frequency band is a 2.4 GHz band or a 5 GHz band, and the second radio frequency band is a 6 GHz band.

21. The secondary wireless node according to claim 19, wherein the secondary wireless node communicates with the primary wireless node via a relay node.

22. An industrial wireless system including a primary wireless node wire-connected to a first industrial device, a secondary wireless node wirelessly connected to the primary wireless node, and a tertiary wireless node wirelessly connected to the secondary wireless node, the industrial wireless system transferring data transmitted and received between a second industrial device wire-connected to the secondary wireless node or the tertiary wireless node and the first industrial device, wherein the primary wireless node includes:

a first wired communication port that is wire-connected to the first industrial device;

a first wireless communication port that is wirelessly communicable with a mobile device corresponding to the first industrial device in a first radio frequency band; and a second wireless communication port that wirelessly communicates with the secondary wireless node at a second radio frequency band higher than the first radio frequency band, the secondary wireless node includes:

a second wired communication port that is wire-connectable to the second industrial device;

a third wireless communication port that is wirelessly communicable with the mobile device in the first radio frequency band; and a fourth wireless communication port that wirelessly communicates with the primary wireless node and the tertiary wireless node in the second radio frequency band, the tertiary wireless node includes:

a third wired communication port that is wire-connectable to the second industrial device;

a fifth wireless communication port that is wirelessly communicable with the mobile device in the first radio frequency band; and a sixth wireless communication port that wirelessly communicates with the secondary wireless node in the second radio frequency band, the primary wireless node, the secondary wireless node, or the tertiary wireless node constructs a first wireless network that relays data communication performed between the first industrial device and the mobile device, the primary wireless node, the secondary wireless node, and the tertiary wireless node construct a second wireless communication network for relaying data communication between the first industrial device and the second industrial device, the mobile device wirelessly connects to one of the primary wireless nodes, the secondary wireless node, or the tertiary wireless node via the first wireless network, and the mobile device is configured to display data collected from the second industrial device by the first industrial device, and state information indicating a communication state related to the second wireless communication network collected from the primary wireless node, the secondary wireless node, and the tertiary wireless node.

23. The industrial wireless system according to claim 22, wherein the primary wireless node includes:

a wireless unit that includes the first wireless communication port and the second wireless communication port; and a controller unit that controls the primary wireless node, the secondary wireless node, and the tertiary wireless node, and is accommodated in a housing independent of a housing of the wireless unit, the controller unit includes the first wired communication port and a fourth wired communication port wire-connected to the wireless unit of the primary wireless node, and the wireless unit includes a fifth wired communication port that is wire-connected to the fourth wired communication port of the controller unit.

* * * * *